(12) United States Patent
Lin et al.

(10) Patent No.: US 11,480,765 B2
(45) Date of Patent: Oct. 25, 2022

(54) IMAGING OPTICAL SYSTEM, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Cheng-Yuan Liao, Taichung (TW); Jin Sen Wang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 461 days.

(21) Appl. No.: 16/733,094

(22) Filed: Jan. 2, 2020

(65) Prior Publication Data
US 2021/0132338 A1 May 6, 2021

(30) Foreign Application Priority Data
Nov. 1, 2019 (TW) .................. 108139653

(51) Int. Cl.
| | |
|---|---|
| *G02B 13/00* | (2006.01) |
| *G02B 9/62* | (2006.01) |
| *H04N 5/225* | (2006.01) |
| *G02B 13/04* | (2006.01) |
| *G02B 9/64* | (2006.01) |
| *G02B 13/18* | (2006.01) |
| *G02B 13/02* | (2006.01) |

(52) U.S. Cl.
CPC .......... *G02B 13/0045* (2013.01); *G02B 9/62* (2013.01); *G02B 9/64* (2013.01); *G02B 13/02* (2013.01); *G02B 13/04* (2013.01); *G02B 13/18* (2013.01); *H04N 5/2254* (2013.01)

(58) Field of Classification Search
CPC ...... G02B 13/0045; G02B 9/62; G02B 13/02; G02B 13/04; G02B 13/18; G02B 9/64; H04N 5/2254
USPC .......................... 359/713, 740, 752, 756–762
See application file for complete search history.

(56) References Cited

U.S. PATENT DOCUMENTS

| | | |
|---|---|---|
| 2001/0019444 A1 | 9/2001 | Takada et al. |
| 2003/0214731 A1 | 11/2003 | Hayashide |
| | (Continued) | |

FOREIGN PATENT DOCUMENTS

| | | |
|---|---|---|
| CN | 104656252 A | 5/2015 |
| CN | 206946104 U | 1/2018 |
| | (Continued) | |

OTHER PUBLICATIONS

IN Office Action in Application No. 202034003119 dated Jul. 30, 2021.

*Primary Examiner* — Evelyn A Lester
(74) *Attorney, Agent, or Firm* — Maschoff Brennan

(57) ABSTRACT

An imaging optical system includes six lens elements which are, in order from an object side to an image side: a first lens element, a second lens element, a third lens element, a fourth lens element, a fifth lens element and a sixth lens element. Each of the six lens elements has an object-side surface facing toward the object side and an image-side surface facing toward the image side. At least one of the six lens elements is a freeform lens element, and at least one of the object-side surface and the image-side surface of the at least one freeform lens element is a freeform surface.

30 Claims, 41 Drawing Sheets

(56) References Cited

U.S. PATENT DOCUMENTS

| | | |
|---|---|---|
| 2006/0221459 A1 | 10/2006 | Sagan |
| 2009/0303607 A1 | 12/2009 | Inoue et al. |
| 2016/0124187 A1* | 5/2016 | Chen .................. G02B 13/0045 359/713 |
| 2016/0295182 A1 | 10/2016 | Gao et al. |
| 2016/0320619 A1 | 11/2016 | Watanabe |
| 2017/0227744 A1 | 8/2017 | Sakata |
| 2017/0336604 A1* | 11/2017 | Hsu .................. G02B 13/0045 |
| 2018/0024322 A1* | 1/2018 | Chen .................. H04N 5/2254 359/713 |
| 2018/0252899 A1 | 9/2018 | Lim et al. |
| 2018/0314063 A1 | 11/2018 | Yatsu et al. |
| 2019/0227278 A1 | 7/2019 | Chen et al. |
| 2019/0250380 A1 | 8/2019 | Lin et al. |

FOREIGN PATENT DOCUMENTS

| | | |
|---|---|---|
| CN | 207133565 U | 3/2018 |
| CN | 109100854 A | 12/2018 |
| CN | 109212721 A | 1/2019 |
| CN | 109375348 A | 2/2019 |
| CN | 109471247 A | 3/2019 |
| CN | 109521554 A | 3/2019 |
| CN | 109541783 A | 3/2019 |
| CN | 109656000 A | 4/2019 |
| CN | 209327669 U | 8/2019 |
| CN | 110520776 A | 11/2019 |
| CN | 110531502 A | 12/2019 |
| CN | 110579863 A | 12/2019 |
| CN | 110596864 A | 12/2019 |
| CN | 110673305 A | 1/2020 |
| CN | 210072175 U | 2/2020 |
| CN | 210142232 U | 3/2020 |
| CN | 111323888 A | 6/2020 |
| TW | I663442 B | 6/2019 |
| TW | I671565 B | 9/2019 |
| WO | 2019/184695 A1 | 10/2019 |
| WO | 2021027642 A | 2/2021 |

* cited by examiner ations 108139653, filed on Nov. 1, 2019, which is incorporated by reference herein in its entirety.
IMAGING OPTICAL SYSTEM, IMAGE CAPTURING UNIT AND ELECTRONIC DEVICE

RELATED APPLICATIONS

This application claims priority to Taiwan Application 108139653, filed on Nov. 1, 2019, which is incorporated by reference herein in its entirety.

BACKGROUND

Technical Field

The present disclosure relates to an imaging optical system, an image capturing unit and an electronic device, more particularly to an imaging optical system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical system includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

The fourth lens element has positive refractive power. At least one of the six lens elements is a freeform lens element, and at least one of the object-side surface and the image-side surface of the at least one freeform lens element is a freeform surface.

When an axial distance between the object-side surface of the first lens element and an image surface is TL, a maximum image height of the imaging optical system is ImgH, half of a maximum field of view of the imaging optical system is HFOV, a central thickness of the fifth lens element is CT5, and a sum of axial distances between each of all adjacent lens elements of the imaging optical system is ΣAT, the following conditions are satisfied:

$0.80 < TL/ImgH < 6.0;$ $50.0[\deg.] < HFOV;$ and $0 < CT5/\Sigma AT < 1.1.$

According to another aspect of the present disclosure, an imaging optical system includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

At least one of the six lens elements is a freeform lens element, and at least one of the object-side surface and the image-side surface of the at least one freeform lens element is a freeform surface. Each of at least three of the six lens elements has an Abbe number smaller than 50.0.

When an axial distance between the object-side surface of the first lens element and an image surface is TL, a maximum image height of the imaging optical system is ImgH, and half of a maximum field of view of the imaging optical system is HFOV, the following conditions are satisfied:

$0.80 < TL/ImgH < 6.0;$ and $50.0[\deg.] < HFOV.$

According to another aspect of the present disclosure, an imaging optical system includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

At least one of the six lens elements is a freeform lens element, and at least one of the object-side surface and the image-side surface of the at least one freeform lens element is a freeform surface.

When an axial distance between the object-side surface of the first lens element and an image surface is TL, a maximum image height of the imaging optical system is ImgH, half of a maximum field of view of the imaging optical system is HFOV, a central thickness of the first lens element is CT1, a central thickness of the second lens element is CT2, a central thickness of the fourth lens element is CT4, and a central thickness of the sixth lens element is CT6, the following conditions are satisfied:

$0.80 < TL/ImgH < 6.0;$ $50.0[\deg.] < HFOV;$ $0 < CT2/CT4 < 1.5;$ $0 < CT6/CT4 < 2.0;$ and $0 < CT1/CT4 < 1.5.$ According to another aspect of the present disclosure, an image capturing unit includes one of the aforementioned imaging optical systems and an image sensor, wherein the image sensor is disposed on the image surface of the imaging optical system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
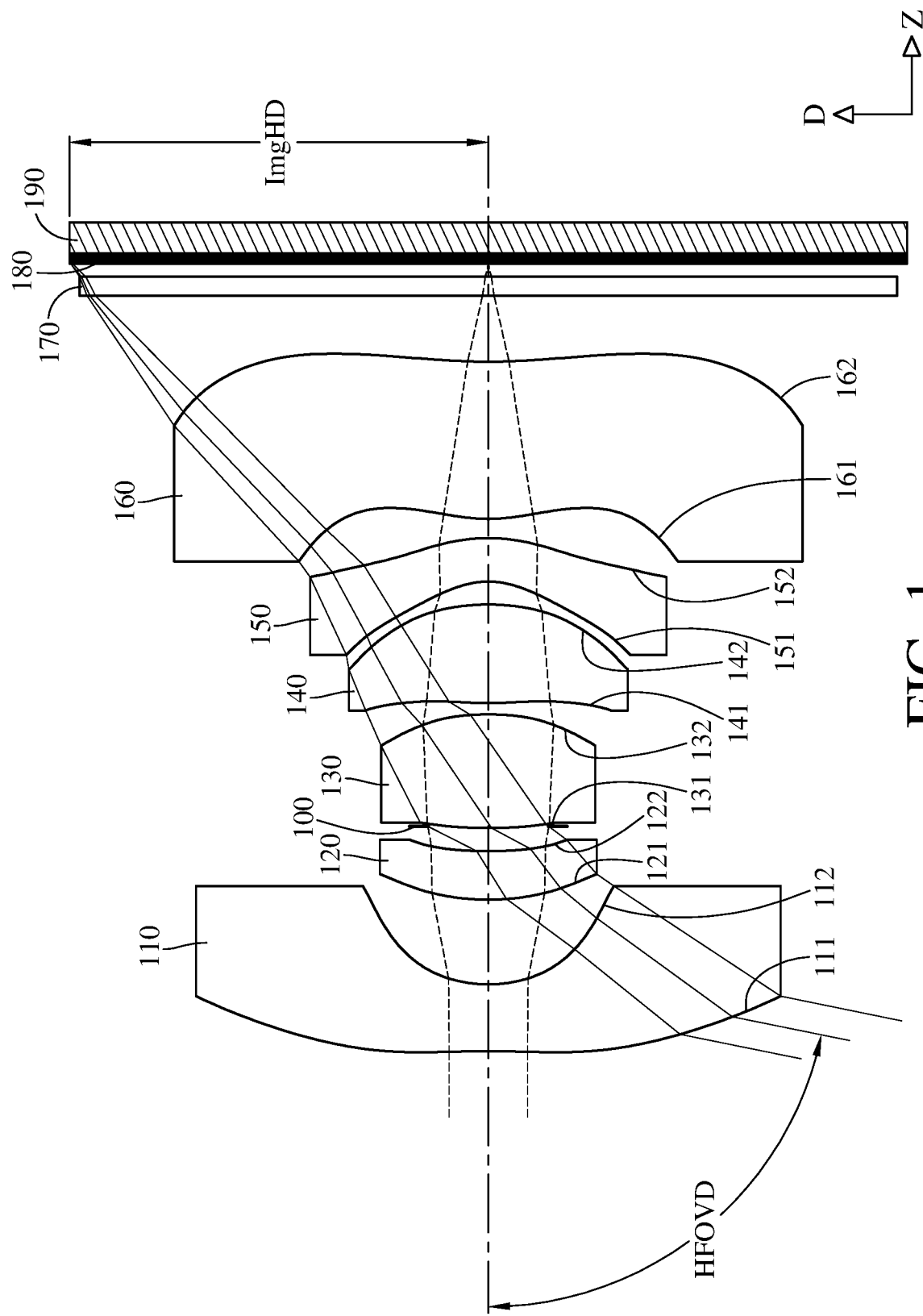
FIG. 1 is a cross-sectional view of an image capturing unit corresponding to a diagonal direction of a photosensitive area of an image sensor according to the 1st embodiment of the present disclosure.

An imaging optical system includes six lens elements. The six lens elements are, in order from an object side to an image side, a first lens element, a second lens element, a third lens element, a fourth lens element, a fifth lens element and a sixth lens element. Each of the six lens elements of the imaging optical system has an object-side surface facing toward the object side and an image-side surface facing toward the image side.

According to the present disclosure, at least one of the six lens elements is a freeform lens element, and at least one of the object-side surface and the image-side surface of the at least one freeform lens element is a freeform surface. Therefore, it is favorable for reducing the size of the imaging optical system and correcting aberrations such as distortion; furthermore, capturing low-distortion images is favorable for the imaging optical system to be applicable to various applications, especially for wide field-of-view designs. In the present disclosure, a freeform surface (FFS) is a non-axisymmetric aspheric surface. Moreover, each of at least two of the object-side surfaces and the image-side surfaces of the six lens elements can be a freeform surface. Therefore, it is favorable for further correcting aberrations. Moreover, at least one of the first lens element and the sixth lens element can be a freeform lens element. Therefore, it is favorable for reducing the influence of non-axisymmetric lens elements on the system assembling, thereby increasing assembling yield rate. Moreover, on a plane which is perpendicular to the optical axis and passes through an intersection point between a freeform surface and the optical axis, an intersection line between the freeform surface and the plane can be a shape which is not a straight line passing through the optical axis. Therefore, it is favorable for increasing the shape variation of the freeform surface so as to further correct aberrations.

The first lens element can have negative refractive power. Therefore, it is favorable for providing a wide field-of-view configuration.

The second lens element can have positive refractive power. Therefore, it is favorable for correcting aberrations generated due to the enlargement of the field of view. The object-side surface of the second lens element can be convex in a paraxial region thereof. Therefore, it is favorable for adjusting the incident direction of light on the second lens element so as to reduce surface reflection, thereby reducing stray light.

The object-side surface of the third lens element can be convex in a paraxial region thereof. Therefore, it is favorable for adjusting the travelling direction of light so as to obtain a balance between the field of view and the size of the imaging optical system.

The fourth lens element can have positive refractive power. Therefore, it is favorable for reducing the total track length. The image-side surface of the fourth lens element can be convex in a paraxial region thereof. Therefore, it is favorable for adjusting the travelling direction of light so as to adjust the size distribution at the object side and image side of the imaging optical system.

The object-side surface of the fifth lens element can be concave in a paraxial region thereof. Therefore, it is favorable for adjusting the incident direction of light on the fifth lens element so as to reduce surface reflection, thereby reducing stray light. The image-side surface of the fifth lens element can be convex in a paraxial region thereof. Therefore, it is favorable for adjusting the travelling direction of light so as to increase image surface area.

The image-side surface of the sixth lens element can be concave in a paraxial region thereof. Therefore, it is favorable for adjusting the back focal length.

Figure 37:
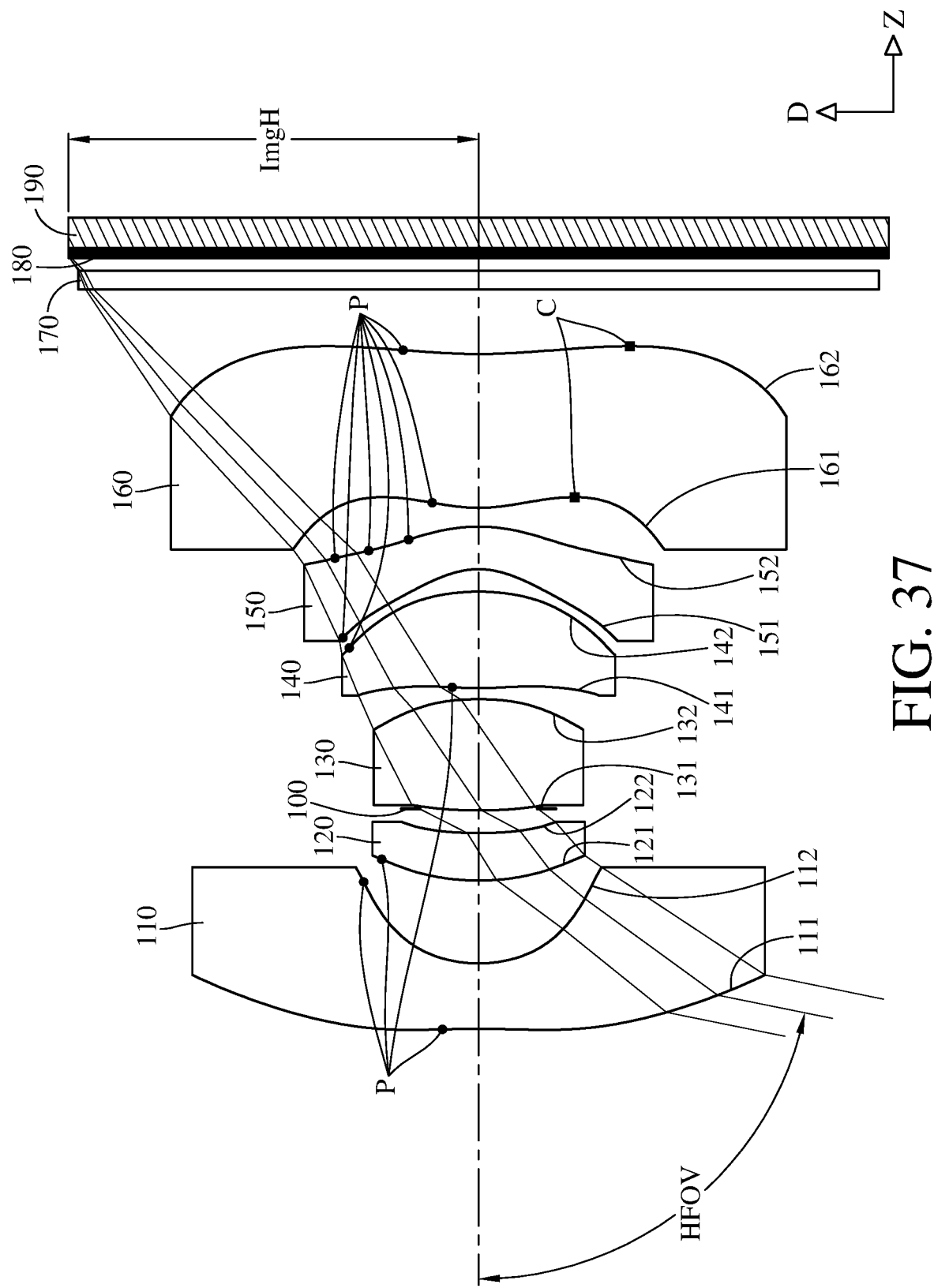
FIG. 37 shows a schematic view of HFOV, ImgH and several inflection points and critical points of the lens elements according to the 1st embodiment of the present disclosure.
Figure 38:
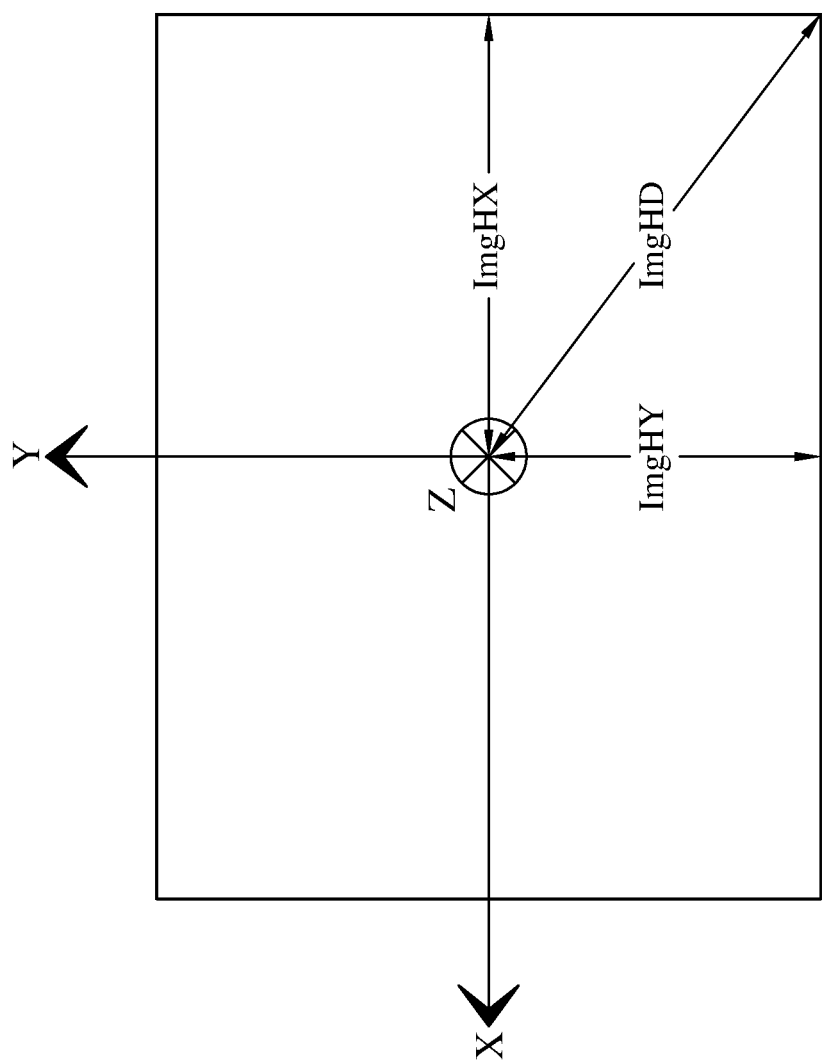
FIG. 38 shows a schematic view of an imaging area of an image sensor and ImgHX, ImgHY and ImgHD according to one embodiment of the present disclosure.

According to the present disclosure, the sixth lens element can have at least one critical point in an off-axis region thereof and in a maximum image height direction. Therefore, it is favorable for correcting off-axis aberrations such as field curvature. Moreover, the image-side surface of the sixth lens element can have at least one critical point in an off-axis region thereof and in the maximum image height direction. Therefore, besides correcting off-axis aberrations such as field curvature, it is also favorable for adjusting the incident angle on the image surface so as to improve the response efficiency of the image sensor. Please refer to FIG. 37, which shows a schematic view of critical points C of the sixth lens element 160 in the off-axis region thereof and in the maximum image height direction according to the 1st embodiment of the present disclosure. The critical points on the object-side surface and the image-side surface of the sixth lens element in FIG. 37 are only exemplary. The other lens surfaces of the six lens elements may also have one or more critical points. Said maximum image height direction is a direction corresponding to a maximum distance between the optical axis and an imaging position on an image sensor. For example, please refer to FIG. 38, which shows a schematic view of an imaging area of an image sensor and ImgHX, ImgHY and ImgHD according to one embodiment of the present disclosure. In FIG. 38, a direction of light travelling into the image sensor on the optical axis is the positive Z-axis direction, a direction corresponding to a length direction of a photosensitive area of the image sensor is the X-axis direction, a direction corresponding to a width direction of the photosensitive area of the image sensor is the Y-axis direction, ImgHX is a maximum distance between the optical axis and the imaging position corresponding to the length direction X of the photosensitive area of the image sensor, ImgHY is a maximum distance between the optical axis and the imaging position corresponding to the width direction Y of the photosensitive area of the image sensor, and ImgHD is a maximum distance between the optical axis and the imaging position corresponding to a diagonal direction of the photosensitive area of the image sensor. In the example of FIG. 38, ImgHD is a maximum image height of the imaging optical system (half of a diagonal length of the effective photosensitive area of the image sensor), so the maximum image height direction can refer to the diagonal direction of the photosensitive area of the image sensor.

According to the present disclosure, at least three of the six lens elements can be axisymmetric, and at least one of the object-side surface and the image-side surface of each of the at least three lens elements can have at least one inflection point in the maximum image height direction (i.e., each of the at least three axisymmetric lens elements can have at least one lens surface having at least one inflection point in the maximum image height direction). Therefore, axisymmetric lens elements are favorable for increasing the molding and assembling yield rate of the lens elements; furthermore, having inflection points on the lens surfaces is favorable for increasing the shape variation of the lens elements so as to improve image quality and reduce the system size. Moreover, at least four of the six lens elements can be axisymmetric, and at least one of the object-side surface and the image-side surface of each of the at least four lens elements can have at least one inflection point in the maximum image height direction. Please refer to FIG. 37, which shows a schematic view of inflection points P of the first lens element 110, the second lens element 120, the fourth lens element 140, the fifth lens element 150 and the sixth lens element 160 in the maximum image height direction according to the 1st embodiment of the present disclosure.

When an axial distance between the object-side surface of the first lens element and an image surface is TL, and the maximum image height of the imaging optical system is ImgH, the following condition is satisfied: 0.80<TL/ImgH<6.0. Therefore, it is favorable for obtaining a balance between the total track length and the image surface size and for adjusting the field of view. Moreover, the following condition can also be satisfied: 1.0<TL/ImgH<4.5. Moreover, the following condition can also be satisfied: 1.2<TL/ImgH<3.5. Please refer to FIG. 37, which shows a schematic view of ImgH according to the 1st embodiment of the present disclosure. In addition, FIG. 37 is a cross-sectional view of the image capturing unit corresponding to the diagonal direction D of the photosensitive area of the image sensor 190, and ImgH in the 1st embodiment is a maximum distance between the optical axis and the imaging position corresponding to the diagonal direction D of the photosensitive area of the image sensor 190, but the present disclosure is not limited thereto.

When half of a maximum field of view of the imaging optical system is HFOV, the following condition is satisfied: 50.0 [deg.]<HFOV. Therefore, it is favorable for obtaining a wide angle configuration. Moreover, the following condition can also be satisfied: 60.0 [deg.]<HFOV. Moreover, the following condition can also be satisfied: 70.0 [deg.]<HFOV. Moreover, the following condition can also be satisfied: HFOV<100.0 [deg.]. Therefore, it is favorable for reducing aberrations such as distortion generated due to overly large field of view. Moreover, the following condition can also be satisfied: HFOV<90.0 [deg.]. Please refer to FIG. 37, which shows a schematic view of HFOV according to the 1st embodiment of the present disclosure. In FIG. 37, HFOV in the 1st embodiment is half of the maximum field of view of the imaging optical system corresponding to the diagonal direction D of the photosensitive area of the image sensor 190, but the present disclosure is not limited thereto.

When a central thickness of the fifth lens element is CT5, and a sum of axial distances between each of all adjacent lens elements of the imaging optical system is ΣAT, the following condition can be satisfied: 0<CT5/ΣAT<1.1. Therefore, it is favorable for adjusting the thickness of the fifth lens element and the distances between each of all adjacent lens elements so as to reduce the system size. Moreover, the following condition can also be satisfied: 0.15<CT5/ΣAT<0.75.

According to the present disclosure, each of at least three of the six lens elements can have an Abbe number smaller than 50.0. Therefore, it is favorable for selecting materials of lens elements so as to correct aberrations such as chromatic aberration. Moreover, each of at least three of the six lens elements can have an Abbe number smaller than 40.0. Moreover, each of at least three of the six lens elements can have an Abbe number smaller than 30.0.

When a central thickness of the second lens element is CT2, and a central thickness of the fourth lens element is CT4, the following condition can be satisfied: 0<CT2/CT4<1.5. Therefore, it is favorable for adjusting the distribution of lens elements so as to reduce the system size. Moreover, the following condition can also be satisfied: 0.10<CT2/CT4<0.90.

When the central thickness of the fourth lens element is CT4, and a central thickness of the sixth lens element is CT6, the following condition can be satisfied: 0<CT6/CT4<2.0. Therefore, it is favorable for adjusting the distribution of lens elements at the image side of the imaging optical system so as to obtain a balance between the size of the image surface and that of the lens elements. Moreover, the following condition can also be satisfied: 0.10<CT6/CT4<1.8.

When a central thickness of the first lens element is CT1, and the central thickness of the fourth lens element is CT4, the following condition can be satisfied: 0<CT1/CT4<1.5. Therefore, it is favorable for adjusting the distribution of lens elements so as to obtain a wide field-of-view configuration. Moreover, the following condition can also be satisfied: 0.10<CT1/CT4<0.80.

When an Abbe number of the fifth lens element is V5, and an Abbe number of the sixth lens element is V6, the following condition can be satisfied: 20.0<V5+V6<100.0. Therefore, it is favorable for the collaboration between the materials of the fifth and sixth lens elements so as to correct aberrations such as chromatic aberration. Moreover, the following condition can also be satisfied: 25.0<V5+V6<90.0. Moreover, the following condition can also be satisfied: 30.0<V5+V6<80.0.

When the central thickness of the first lens element is CT1, and a central thickness of the third lens element is CT3, the following condition can be satisfied: 0.15<CT1/CT3<1.0. Therefore, it is favorable for adjusting the distribution of lens elements at the object side of the imaging optical system so as to obtain a wide field-of-view configuration.

When a sum of central thicknesses of all lens elements of the imaging optical system is ΣCT, and the sum of axial distances between each of all adjacent lens elements of the imaging optical system is ΣAT, the following condition can be satisfied: 1.6<ΣCT/ΣAT<7.0. Therefore, it is favorable for adjusting the distribution of lens elements so as to reduce the system size. Moreover, the following condition can also be satisfied: 2.0<ΣCT/ΣAT<6.5.

When a focal length of the imaging optical system in the maximum image height direction is f, and a composite focal length of the third lens element and the fourth lens element in the maximum image height direction is f34, the following condition can be satisfied: 0.70≤f/f34<2.0. Therefore, it is favorable for the collaboration between the third and fourth lens elements so as to reduce the total track length.

When a focal length of the fourth lens element in the maximum image height direction is f4, and the central thickness of the fourth lens element is CT4, the following condition can be satisfied: 0<f4/CT4<250. Therefore, it is favorable for adjusting the refractive power of the fourth lens element so as to reduce the system size. Moreover, the following condition can also be satisfied: 0.500<f4/CT4<100. Moreover, the following condition can also be satisfied: 1.00<f4/CT4<10.0.

Figure 39:
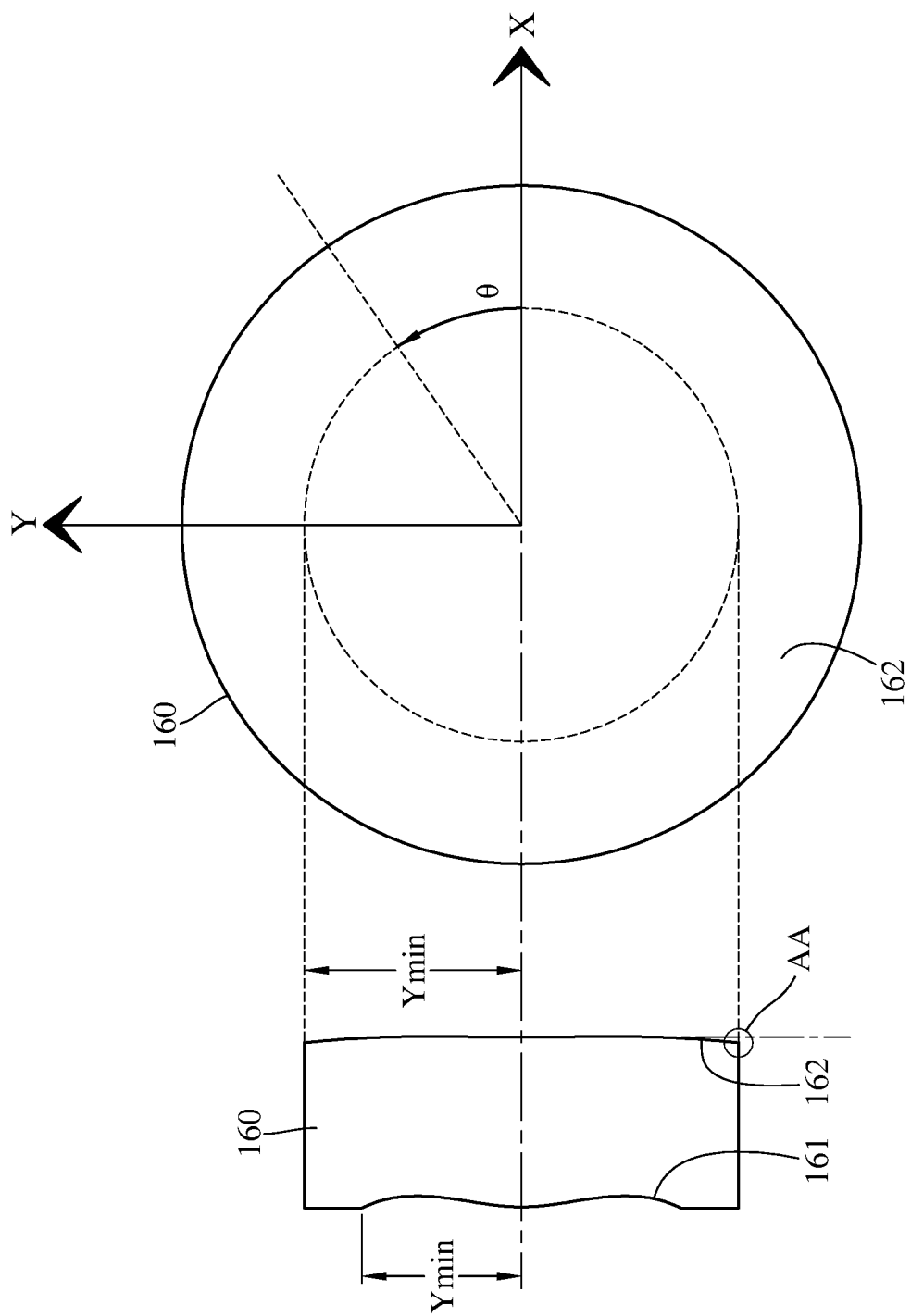
FIG. 39 shows a schematic view of Ymin, a cross-sectional view of the sixth lens element corresponding to the width direction of the photosensitive area of the image sensor and a front view of the image-side surface of the sixth lens element according to the 1st embodiment of the present disclosure.
Figure 40:
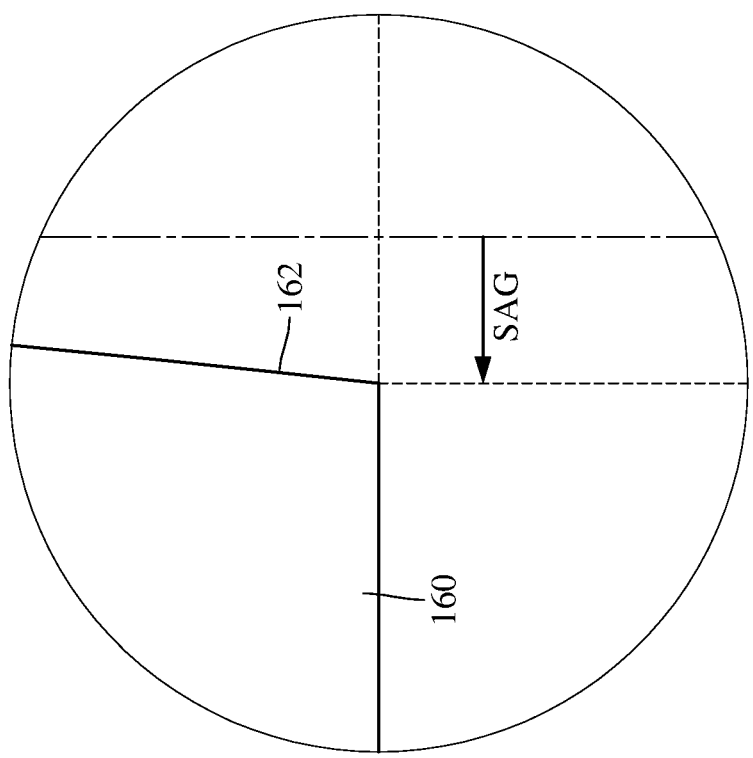
FIG. 40 shows a schematic view of SAG and an enlarged view of the region AA in FIG. 39.
Figure 41:
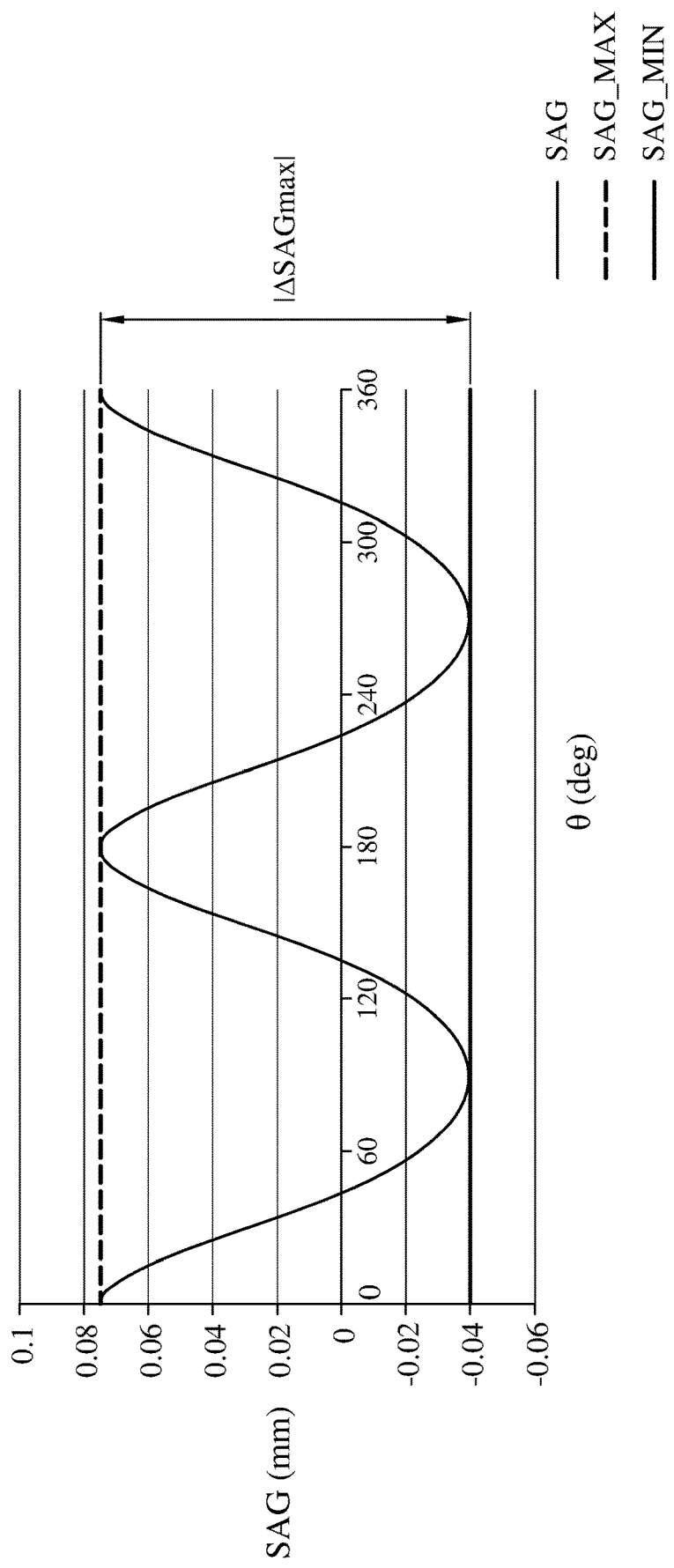
FIG. 41 is a data graph of SAG of all points at a distance of Ymin from the optical axis on the image-side surface of the sixth lens element according to the 1st embodiment of the present disclosure.

According to the present disclosure, a minimum value among distances between the optical axis and an edge of an optically effective area of one freeform surface is Ymin, a displacement in parallel with the optical axis from an intersection point between the freeform surface and the optical axis to a point at a distance of Ymin from the optical axis on the freeform surface is SAG, a maximum value among all the displacements SAG is SAG_MAX, and a minimum value among all the displacements SAG is SAG_MIN. When an absolute difference between SAG_MAX and SAG_MIN is |ΔSAGmax|, the at least one freeform surface of the at least one freeform lens element can satisfy the following condition: 1.0 [um]<|ΔSAGmax|. Therefore, it is favorable for increasing the shape variation of the freeform surface so as to further correct aberrations. Moreover, the following condition can also be satisfied: 2.0 [um]<|ΔSAGmax|. Moreover, the following condition can also be satisfied: 5.0 [um]<|ΔSAGmax|. Please refer to FIG. 39 to FIG. 41. FIG. 39 shows a schematic view of Ymin, a cross-sectional view of the sixth lens element 160 corresponding to the width direction Y of the photosensitive area of the image sensor and a front view of the image-side surface 162 of the sixth lens element 160 according to the 1st embodiment of the present disclosure, FIG. 40 shows a schematic view of SAG and an enlarged view of the region AA in FIG. 39, and FIG. 41 is a data graph of SAG of all points at a distance of Ymin from the optical axis on the image-side surface 162 of the sixth lens element 160 according to the 1st embodiment of the present disclosure. When the displacement from the intersection point between one freeform surface and the optical axis to a point at a distance of Ymin from the optical axis on the same surface is facing towards the image side of the imaging optical system, the value of displacement is positive; when the displacement from the intersection point between the freeform surface and the optical axis to a point at a distance of Ymin from the optical axis on the same surface is facing towards the object side of the imaging optical system, the value of displacement is negative. In FIG. 39, there is a minimum distance Ymin between the optical axis and the edge of the optically effective area of the object-side surface 161 of the sixth lens element 160 in the direction corresponding to the width direction Y of the photosensitive area of the image sensor, and there is a minimum distance Ymin between the optical axis and the edge of the optically effective area of the image-side surface 162 of the sixth lens element 160 in the direction corresponding to the width direction Y of the photosensitive area of the image sensor. As seen in the front view of the image-side surface 162 of the sixth lens element 160, there is a value of displacement SAG at each point at a distance of Ymin from the optical axis on the image-side surface 162 of the sixth lens element 160. FIG. 41 shows the values of displacements SAG of all points at a distance of Ymin from the optical axis on the image-side surface 162 of the sixth lens element 160. In FIG. 41, the horizontal axis represents the angle θ between the positive X-axis and a dotted line as shown in FIG. 39, the angle θ is 0 degree as the dotted line is at the positive X-axis, and the angle θ increases as the dotted line rotates counterclockwise about the Z-axis; the vertical axis represents the displacements SAG corresponding to various angles θ. As seen in FIG. 41, there can be a maximum value SAG_MAX and a minimum value SAG_MIN among all displacements SAG, and the absolute difference between SAG_MAX and SAG_MIN is |ΔSAGmax|.

When the axial distance between the object-side surface of the first lens element and the image surface is TL, the following condition can be satisfied: 2.0 [mm]<TL<10.0 [mm]. Therefore, it is favorable for the imaging optical system to have a proper total length for various applications. Moreover, the following condition can also be satisfied: 3.5 [mm]<TL<8.0 [mm].

When the axial distance between the object-side surface of the first lens element and the image surface is TL, and an entrance pupil diameter of the imaging optical system is EPD, the following condition can be satisfied: 3.0<TL/EPD<11. Therefore, it is favorable for obtaining a balance between the total track length and aperture size of the imaging optical system.

When the central thickness of the third lens element is CT3, and the central thickness of the fifth lens element is CT5, the following condition can be satisfied: 0.20<CT5/CT3<2.0. Therefore, it is favorable for adjusting the distribution of lens elements so as to reduce the system size.

When an axial distance between the third lens element and the fourth lens element is T34, and the central thickness of the fourth lens element is CT4, the following condition can be satisfied: 0<T34/CT4≤0.70. Therefore, it is favorable for the collaboration between the third and fourth lens elements so as to balance the size distribution at the object side and the image side of the imaging optical system.

When a curvature radius of the image-side surface of the third lens element in a paraxial region thereof and in the maximum image height direction is R6, and a curvature radius of the object-side surface of the fourth lens element in a paraxial region thereof and in the maximum image height direction is R7, the following condition can be satisfied: −2.0<R6/R7<0. Therefore, it is favorable for the collaboration between the surface shapes of the third and fourth lens elements so as to correct off-axis aberrations. Moreover, the following condition can also be satisfied: −1.0<R6/R7<0.

When the focal length of the imaging optical system in the maximum image height direction is f, and a composite focal length of the first lens element, the second lens element, the third lens element and the fourth lens element in the maximum image height direction is f1234, the following condition can be satisfied: 0.53<f/f1234<2.0. Therefore, it is favorable for the collaboration among the lens elements so as to reduce the total track length.

When an axial distance between the object-side surface of the first lens element and the image-side surface of the sixth lens element is TD, and an axial distance between the image-side surface of the sixth lens element and the image surface is BL, the following condition can be satisfied: 1.0<TD/BL<30.0. Therefore, it is favorable for adjusting the distribution of lens elements and the back focal length of the imaging optical system so as to obtain a proper size distribution. Moreover, the following condition can also be satisfied: 2.0<TD/BL<20.0. Moreover, the following condition can also be satisfied: 3.0<TD/BL<10.0.

When the axial distance between the object-side surface of the first lens element and the image surface is TL, and the focal length of the imaging optical system in the maximum image height direction is f, the following condition can be satisfied: 1.0<TL/f<8.0. Therefore, it is favorable for obtaining a balance between the field of view and the size of the imaging optical system. Moreover, the following condition can also be satisfied: 1.5<TL/f<6.5. Moreover, the following condition can also be satisfied: 2.0<TL/f<5.0.

When an f-number of the imaging optical system is Fno, the following condition can be satisfied: 1.0<Fno<3.5. Therefore, it is favorable for providing the imaging optical system with proper size of aperture stop so as to obtain a balance between the illuminance and the depth of field. Moreover, the following condition can also be satisfied: 1.5<Fno<3.0.

When the focal length of the imaging optical system in the maximum image height direction is f, and the central thickness of the fifth lens element is CT5, the following condition can be satisfied: 4.0<f/CT5. Therefore, it is favorable for adjusting the refractive power of the fifth lens element so as to correct aberrations.

When the focal length of the imaging optical system in the maximum image height direction is f, and a composite focal length of the fifth lens element and the sixth lens element in the maximum image height direction is f56, the following condition can be satisfied: −2.0<f/f56<0.55. Therefore, it is favorable for the collaboration between the fifth and sixth lens elements so as to obtain a proper back focal length. Moreover, the following condition can also be satisfied: −1.5<f/f56<0.

When a curvature radius of the object-side surface of the fifth lens element in the paraxial region thereof and in the maximum image height direction is R9, and a curvature radius of the image-side surface of the fifth lens element in the paraxial region thereof and in the maximum image height direction is R10, the following condition can be satisfied: 0<R9/R10<20. Therefore, it is favorable for adjusting the shape of the fifth lens element so as to correct off-axis aberrations. Moreover, the following condition can also be satisfied: 0<R9/R10<10.

According to the present disclosure, the aforementioned features and conditions can be utilized in numerous combinations so as to achieve corresponding effects.

According to the present disclosure, the lens elements of the imaging optical system can be made of either glass or plastic material. When the lens elements are made of glass material, the refractive power distribution of the imaging optical system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the imaging optical system can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof. In addition, unless otherwise stated, the aspheric surface in the embodiments refers to an axisymmetric aspheric surface, and the freeform surface refers to a non-axisymmetric aspheric surface.

According to the present disclosure, when the features and parameters (e.g., lens surface shape and refractive power) with non-axisymmetric properties of the imaging optical system are not specifically defined, these features and parameters can be determined in the maximum image height direction.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging optical system, based on the corresponding image sensor, can be flat or curved, especially a curved surface being concave facing towards the object side of the imaging optical system.

According to the present disclosure, an image correction unit, such as a field flattener, can be optionally disposed between the lens element closest to the image side of the imaging optical system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the imaging optical system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical system and thereby provides a wider field of view for the same.

According to the present disclosure, the imaging optical system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
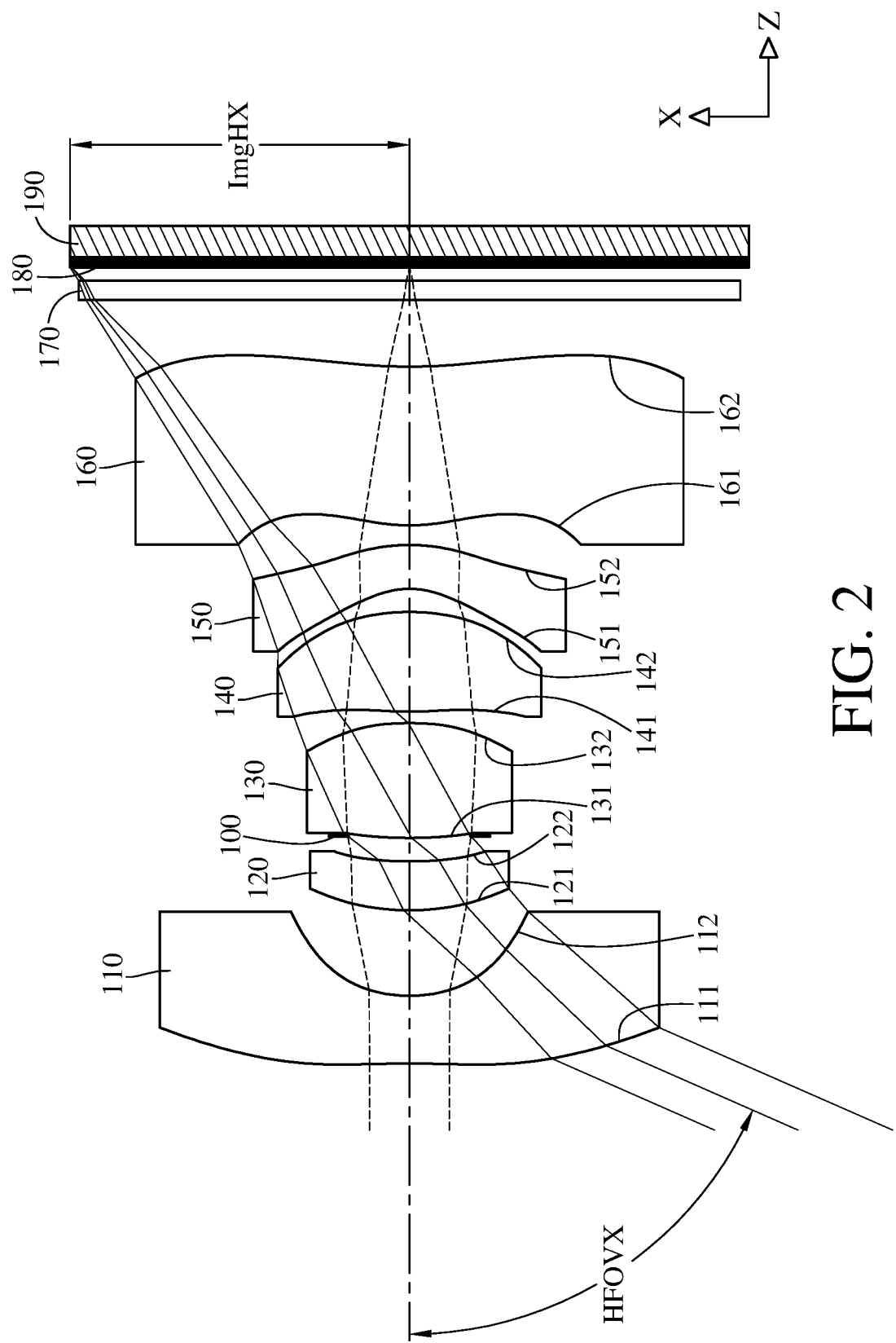
FIG. 2 is a cross-sectional view of the image capturing unit corresponding to a length direction of the photosensitive area of the image sensor according to the 1st embodiment of the present disclosure.
Figure 3:
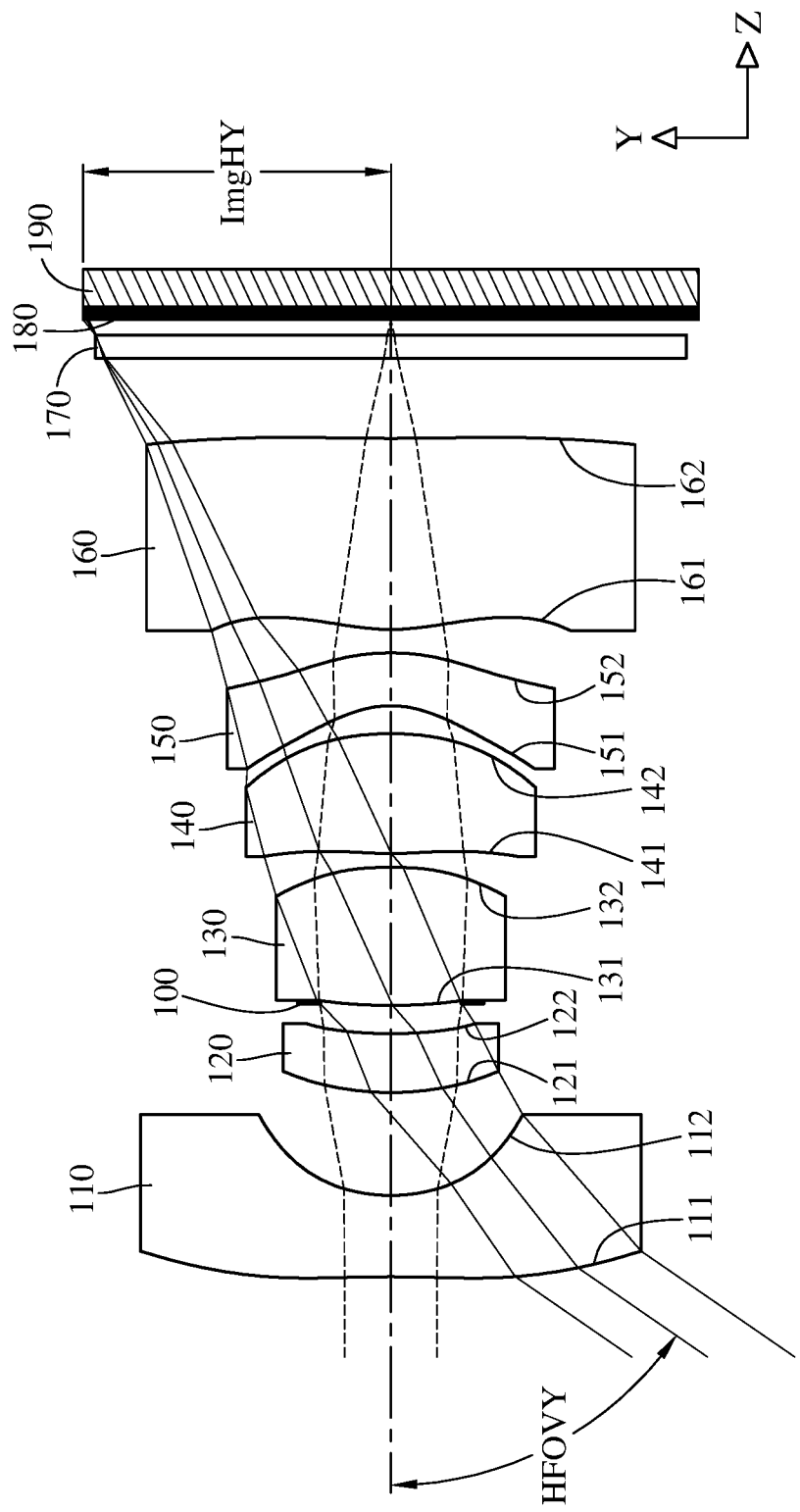
FIG. 3 is a cross-sectional view of the image capturing unit corresponding to a width direction of the photosensitive area of the image sensor according to the 1st embodiment of the present disclosure.
Figure 4:
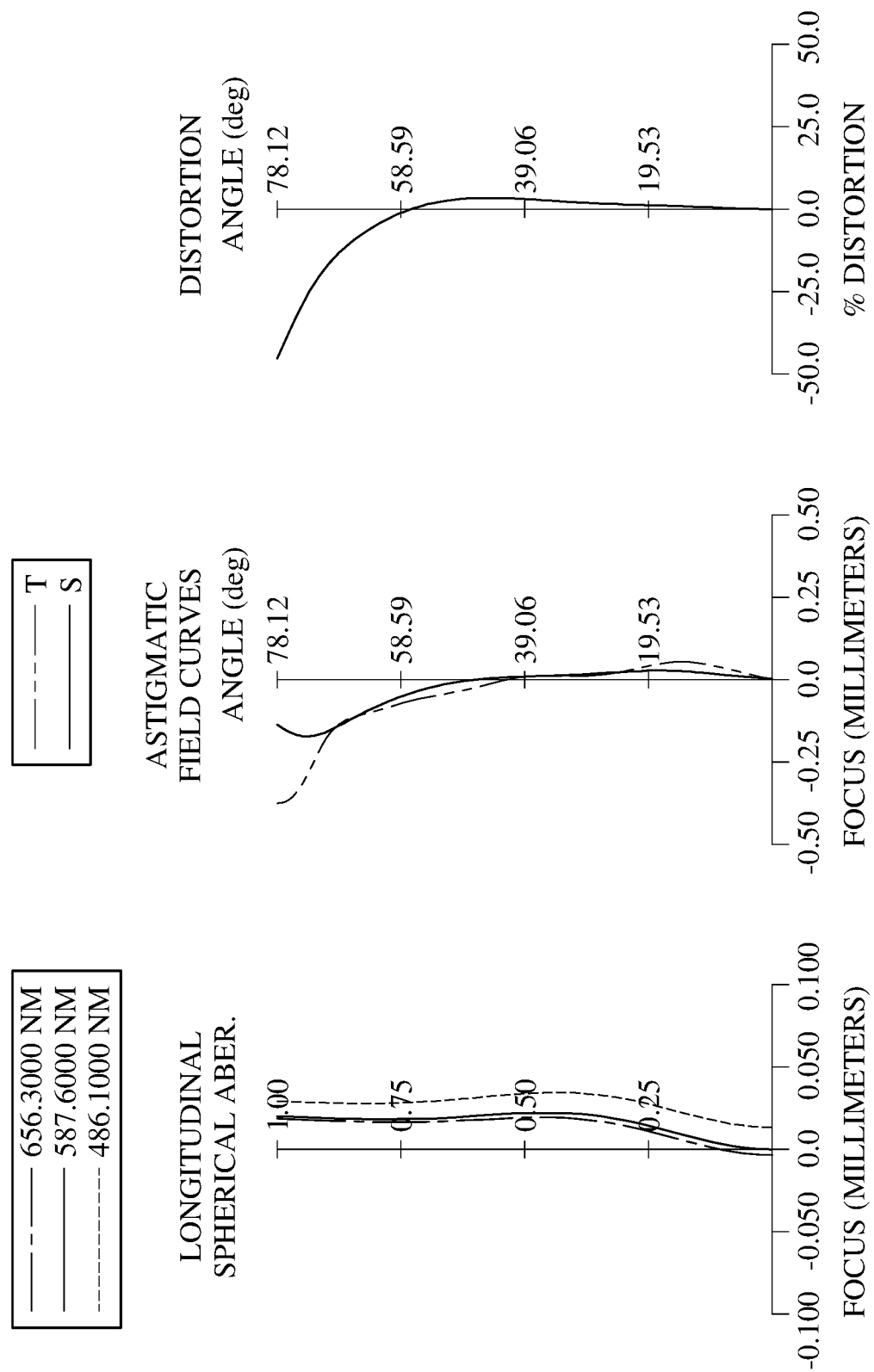
FIG. 4 shows spherical aberration curves, astigmatic field curves and a distortion curve of the image capturing unit according to the 1st embodiment.

FIG. 1 is a cross-sectional view of an image capturing unit corresponding to a diagonal direction of a photosensitive area of an image sensor according to the 1st embodiment of the present disclosure. FIG. 2 is a cross-sectional view of the image capturing unit corresponding to a length direction of the photosensitive area of the image sensor according to the 1st embodiment of the present disclosure. FIG. 3 is a cross-sectional view of the image capturing unit corresponding to a width direction of the photosensitive area of the image sensor according to the 1st embodiment of the present disclosure. FIG. 4 shows, in order from left to right, spherical aberration curves, astigmatic field curves and a distortion curve of the image capturing unit according to the 1st embodiment. In FIG. 1 to FIG. 3, the image capturing unit includes the imaging optical system (its reference numeral is omitted) of the present disclosure and an image sensor 190. The imaging optical system includes, in order from an object side to an image side, a first lens element 110, a second lens element 120, an aperture stop 100, a third lens element 130, a fourth lens element 140, a fifth lens element 150, a sixth lens element 160, a filter 170 and an image surface 180. The imaging optical system includes six lens elements (110, 120, 130, 140, 150 and 160) with no additional lens element disposed between each of the adjacent six lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has one inflection point.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has one inflection point.

The third lens element 130 with positive refractive power has an object-side surface 131 being convex in a paraxial region thereof and an image-side surface 132 being convex in a paraxial region thereof. The third lens element 130 is made of glass material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has one inflection point. The image-side surface 142 of the fourth lens element 140 has one inflection point.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has one inflection point. The image-side surface 152 of the fifth lens element 150 has three inflection points.

The sixth lens element 160 with positive refractive power has an object-side surface 161 being convex in a paraxial region thereof and an image-side surface 162 being concave in a paraxial region thereof. The sixth lens element 160 is made of plastic material and has both the object-side surface 161 and the image-side surface 162 being freeform surfaces. The object-side surface 161 of the sixth lens element 160 has one inflection point. The image-side surface 162 of the sixth lens element 160 has one inflection point. The object-side surface 161 of the sixth lens element 160 has one critical point in an off-axis region thereof. The image-side surface 162 of the sixth lens element 160 has one critical point in an off-axis region thereof.

The filter 170 is made of glass material and located between the sixth lens element 160 and the image surface 180, and will not affect the focal length of the imaging optical system. The image sensor 190 is disposed on or near the image surface 180 of the imaging optical system.

The abovementioned inflection points and critical points of the lens elements refer to the inflection points and critical points on the lens surfaces in a maximum image height direction.

In this embodiment, the first lens element 110, the second lens element 120 the fourth lens element 140 and the fifth lens element 150 are axisymmetric, each of the object-side surfaces 111, 121, 141 and 151 and the image-side surfaces 112, 142 and 152 has at least one inflection point in the maximum image height direction, the object-side surface 161 of the sixth lens element 160 has at least one critical point in the off-axis region thereof and in the maximum image height direction, and the image-side surface 162 of the sixth lens element 160 has at least one critical point in the off-axis region thereof and in the maximum image height direction. In this embodiment, the maximum image height direction corresponds to a diagonal direction D of a photosensitive area of the image sensor 190, but the present disclosure is not limited thereto.

The equation of the (axisymmetric) aspheric surface profiles of the aforementioned aspheric lens elements of the 1st embodiment is expressed as follows:

$$z(r) = \frac{\frac{r^2}{R}}{1+\sqrt{1-(1+k)\left(\frac{r}{R}\right)^2}} + \sum_i (Ai)r^i$$

where z is a displacement in parallel with an optical axis from an intersection point between the aspheric surface and the optical axis to a point at a distance of r from the optical axis on the aspheric surface;

r is a vertical distance from the point on the aspheric surface to the optical axis;

R is the curvature radius in a paraxial region of the aspheric surface;

k is the conic coefficient; and

Ai is the i-th aspheric coefficient, and in the embodiments, i may be, but is not limited to, 4, 6, 8, 10, 12, 14 and 16.

The equation of the freeform surface profiles of the aforementioned freeform lens elements of the 1st embodiment is expressed as follows:

$$z(x, y) = \frac{\frac{x^2}{Rx} + \frac{y^2}{Ry}}{1+\sqrt{1-(1+kx)\left(\frac{x}{Rx}\right)^2 - (1+ky)\left(\frac{y}{Ry}\right)^2}} +$$
$$\sum_i \left(\frac{Axi - Ayi}{2}\left(2\frac{x^2}{x^2+y^2} - 1\right) + \frac{Axi + Ayi}{2}\right)(r(x, y))^i,$$

where, z is a displacement in parallel with the optical axis from an intersection point between the freeform surface and the optical axis to a point at (x, y) on the freeform surface;

r(x, y) is a vertical distance from the point on the freeform surface to the optical axis, and r(x, y)=sqrt($x^2+y^2$);

x is the x-coordinate of the point on the freeform surface;

y is the y-coordinate of the point on the freeform surface;

Rx is the curvature radius in the X-axis direction in a paraxial region of the freeform surface;

Ry is the curvature radius in the Y-axis direction in the paraxial region of the freeform surface;

kx is the conic coefficient in the X-axis direction;

ky is the conic coefficient in the Y-axis direction;

Axi is the i-th freeform coefficient in the X-axis direction, and in the embodiments, i may be, but is not limited to, 4, 6, 8, 10, 12, 16 and 18; and Ayi is the i-th freeform coefficient in the Y-axis direction, and in the embodiments, i may be, but is not limited to, 4, 6, 8, 10, 12, 14, 16 and 18.

In this embodiment, a direction of light travelling into the image surface 180 on the optical axis is the positive Z-axis direction, a direction corresponding to a length direction of a photosensitive area of the image sensor 190 is the X-axis direction, and a direction corresponding to a width direction of the photosensitive area of the image sensor 190 is the Y-axis direction, but the present disclosure is not limited thereto.

In the imaging optical system of the image capturing unit according to the 1st embodiment, when a focal length of the imaging optical system corresponding to the diagonal direction D of the photosensitive area of the image sensor 190 is fD, a focal length of the imaging optical system corresponding to the length direction (the X-axis direction) of the photosensitive area of the image sensor 190 is fX, and a focal length of the imaging optical system corresponding to the width direction (the Y-axis direction) of the photosensitive area of the image sensor 190 is fY, these parameters have the following values: fD=1.33 millimeters (mm), fX=1.34 mm, fY=1.29 mm.

When an f-number of the imaging optical system is Fno, the following condition is satisfied: Fno=2.24.

When half of a maximum field of view of the imaging optical system corresponding to the diagonal direction D of the photosensitive area of the image sensor 190 is HFOVD, half of a maximum field of view of the imaging optical system corresponding to the length direction of the photosensitive area of the image sensor 190 is HFOVX, and half of a maximum field of view of the imaging optical system corresponding to the width direction of the photosensitive area of the image sensor 190 is HFOVY, these parameters have the following values: HFOVD=78.5 degrees (deg.), HFOVX=66.3 deg., HFOVY=55.4 deg.

When a maximum distance between the optical axis and the imaging position of the imaging optical system corresponding to the diagonal direction D of the photosensitive area of the image sensor 190 is ImgHD, a maximum distance between the optical axis and the imaging position of the imaging optical system corresponding to the length direction of the photosensitive area of the image sensor 190 is ImgHX, and a maximum distance between the optical axis and the imaging position of the imaging optical system corresponding to the width direction of the photosensitive area of the image sensor 190 is ImgHY, these parameters have the following values: ImgHD=3.17 mm, ImgHX=2.54 mm, ImgHY=1.90 mm.

When an Abbe number of the fifth lens element 150 is V5, and an Abbe number of the sixth lens element 160 is V6, the following condition is satisfied: V5+V6=70.9.

When a sum of central thicknesses of all lens elements of the imaging optical system is ΣCT, and a sum of axial distances between each of all adjacent lens elements of the imaging optical system is ΣAT, the following condition is satisfied: ΣCT/ΣAT=3.28. In this embodiment, an axial distance between two adjacent lens elements is an axial distance between two adjacent lens surfaces of the two adjacent lens elements; ΣCT is a sum of central thicknesses of the first lens element 110, the second lens element 120, the third lens element 130, the fourth lens element 140, the fifth lens element 150 and the sixth lens element 160; and ΣAT is a sum of axial distances between the first lens element 110 and the second lens element 120, the second lens element 120 and the third lens element 130, the third lens element 130 and the fourth lens element 140, the fourth lens element 140 and the fifth lens element 150, and the fifth lens element 150 and the sixth lens element 160.

When the central thickness of the first lens element 110 is CT1, and the central thickness of the third lens element 130 is CT3, the following condition is satisfied: CT1/CT3=0.59.

When the central thickness of the first lens element 110 is CT1, and the central thickness of the fourth lens element 140 is CT4, the following condition is satisfied: CT1/CT4=0.68.

When the central thickness of the second lens element 120 is CT2, and the central thickness of the fourth lens element 140 is CT4, the following condition is satisfied: CT2/CT4=0.49.

When the central thickness of the fifth lens element 150 is CT5, and the sum of axial distances between each of all adjacent lens elements of the imaging optical system is ΣAT, the following condition is satisfied: CT5/ΣAT=0.27.

When the central thickness of the third lens element 130 is CT3, and the central thickness of the fifth lens element 150 is CT5, the following condition is satisfied: CT5/CT3=0.38.

When the central thickness of the fourth lens element 140 is CT4, and the central thickness of the sixth lens element 160 is CT6, the following condition is satisfied: CT6/CT4=1.59.

When the axial distance between the third lens element 130 and the fourth lens element 140 is T34, and the central thickness of the fourth lens element 140 is CT4, the following condition is satisfied: T34/CT4=0.11.

When an axial distance between the object-side surface 111 of the first lens element 110 and the image-side surface 162 of the sixth lens element 160 is TD, and an axial distance between the image-side surface 162 of the sixth lens element 160 and the image surface 180 is BL, the following condition is satisfied: TD/BL=7.02.

When an axial distance between the object-side surface 111 of the first lens element 110 and the image surface 180 is TL, the following condition is satisfied: TL=5.98 [mm].

When the axial distance between the object-side surface 111 of the first lens element 110 and the image surface 180 is TL, and an entrance pupil diameter of the imaging optical system is EPD, the following condition is satisfied: TL/EPD=10.07.

When the axial distance between the object-side surface 111 of the first lens element 110 and the image surface 180 is TL, and a focal length of the imaging optical system in the maximum image height direction is f, the following condition is satisfied: TL/f=4.50. In this embodiment, the focal length of the imaging optical system in the maximum image height direction (f) refers to the focal length of the imaging optical system corresponding to the diagonal direction D of the photosensitive area of the image sensor 190 (fD).

When the axial distance between the object-side surface 111 of the first lens element 110 and the image surface 180 is TL, and a maximum image height of the imaging optical system is ImgH, the following condition is satisfied: TL/ImgH=1.89. In this embodiment, the maximum image height of the imaging optical system (ImgH) refers to the maximum distance between the optical axis and the imaging position of the imaging optical system corresponding to the diagonal direction D of the photosensitive area of the image sensor 190 (ImgHD).

When a curvature radius of the image-side surface 132 of the third lens element 130 in the paraxial region thereof and in the maximum image height direction is R6, and a curvature radius of the object-side surface 141 of the fourth lens element 140 in the paraxial region thereof and in the maximum image height direction is R7, the following condition is satisfied: R6/R7=−0.95.

When a curvature radius of the object-side surface 151 of the fifth lens element 150 in the paraxial region thereof and in the maximum image height direction is R9, and a curvature radius of the image-side surface 152 of the fifth lens element 150 in the paraxial region thereof and in the maximum image height direction is R10, the following condition is satisfied: R9/R10=0.44.

When the focal length of the imaging optical system in the maximum image height direction is f, and the central thickness of the fifth lens element 150 is CT5, the following condition is satisfied: f/CT5=4.03.

When the focal length of the imaging optical system in the maximum image height direction is f, and a composite focal length of the first lens element 110, the second lens element 120, the third lens element 130 and the fourth lens element 140 in the maximum image height direction is f1234, the following condition is satisfied: f/f1234=1.33.

When the focal length of the imaging optical system in the maximum image height direction is f, and a composite focal length of the third lens element 130 and the fourth lens element 140 in the maximum image height direction is f34, the following condition is satisfied: f/f34=1.04.

When the focal length of the imaging optical system in the maximum image height direction is f, and a composite focal length of the fifth lens element 150 and the sixth lens element 160 in the maximum image height direction is f56, the following condition is satisfied: f/f56=−0.14.

When a focal length of the fourth lens element 140 in the maximum image height direction is f4, and the central thickness of the fourth lens element 140 is CT4, the following condition is satisfied: f4/CT4=2.62.

When half of a maximum field of view of the imaging optical system is HFOV, the following condition is satisfied: HFOV=78.5 [deg.]. In this embodiment, half of the maximum field of view of the imaging optical system (HFOV) refers to half of the maximum field of view of the imaging optical system corresponding to the diagonal direction D of the photosensitive area of the image sensor 190 (HFOVD).

When a minimum value among distances between the optical axis and an edge of an optically effective area of one freeform surface is Ymin, a displacement in parallel with the optical axis from an intersection point between the freeform surface and the optical axis to a point at a distance of Ymin from the optical axis on the freeform surface is SAG, a maximum value among all the displacements SAG is SAG_MAX, a minimum value among all the displacements SAG is SAG_MIN, and an absolute difference between SAG_MAX and SAG_MIN is |ΔSAGmax|, the object-side surface 161 of the sixth lens element 160 satisfies the following condition: |ΔSAGmax|=0.36 [um], and the image-side surface 162 of the sixth lens element 160 satisfies the following condition: |ΔSAGmax|=114.24 [um].

The detailed optical data of the 1st embodiment are shown in Table 1, the aspheric surface data are shown in Table 2 and the freeform surface data are shown in Table 3 below.

TABLE 1

1st Embodiment
fD = 1.33 mm, fX = 1.34 mm, fY = 1.29 mm, Fno = 2.24
HFOVD = 78.5 deg., HFOVX = 66.3 deg., HFOVY = 55.4 deg.
ImgHD = 3.17 mm, ImgHX = 2.54 mm, ImgHY = 1.90 mm

| Surface # | | Curvature Radius | | Thickness | Material | Index | Abbe # | Focal Length | |
|---|---|---|---|---|---|---|---|---|---|
| | | (Y-dir.) | (X-dir.) | | | | | (Y-dir.) | (X-dir.) |
| 0 | Object | Plano | | Infinity | | | | | |
| 1 | Lens 1 | −7.407 | (ASP) | 0.508 | Plastic | 1.545 | 56.1 | −1.69 | |
| 2 | | 1.076 | (ASP) | 0.643 | | | | | |
| 3 | Lens 2 | 1.898 | (ASP) | 0.368 | Plastic | 1.639 | 23.5 | 7.24 | |

TABLE 1-continued

1st Embodiment
fD = 1.33 mm, fX = 1.34 mm, fY = 1.29 mm, Fno = 2.24
HFOVD = 78.5 deg., HFOVX = 66.3 deg., HFOVY = 55.4 deg.
ImgHD = 3.17 mm, ImgHX = 2.54 mm, ImgHY = 1.90 mm

| Surface # | | Curvature Radius (Y-dir.) | Curvature Radius (X-dir.) | | Thickness | Material | Index | Abbe # | Focal Length (Y-dir.) | Focal Length (X-dir.) |
|---|---|---|---|---|---|---|---|---|---|---|
| 4 | | 2.974 | | (ASP) | 0.189 | | | | | |
| 5 | Ape. Stop | | Plano | | −0.013 | | | | | |
| 6 | Lens 3 | 3.433 | | (ASP) | 0.863 | Glass | 1.587 | 59.5 | 2.52 | |
| 7 | | −2.358 | | (ASP) | 0.086 | | | | | |
| 8 | Lens 4 | 2.482 | | (ASP) | 0.749 | Plastic | 1.544 | 56.0 | 1.96 | |
| 9 | | −1.674 | | (ASP) | 0.174 | | | | | |
| 10 | Lens 5 | −0.615 | | (ASP) | 0.330 | Plastic | 1.701 | 14.9 | −1.91 | |
| 11 | | −1.389 | | (ASP) | 0.146 | | | | | |
| 12 | Lens 6 | 1.277 | 1.221 | (FFS) | 1.194 | Plastic | 1.544 | 56.0 | 2.49 | 2.83 |
| 13 | | 14.743 | 3.836 | (FFS) | 0.500 | | | | | |
| 14 | Filter | | Plano | | 0.145 | Glass | 1.517 | 64.2 | — | |
| 15 | | | Plano | | 0.098 | | | | | |
| 16 | Image | | Plano | | — | | | | | |

Note:
Reference wavelength is 587.6 nm (d-line).

TABLE 2

Aspheric Coefficients

| Surface # | 1 | 2 | 3 | 4 | 6 |
|---|---|---|---|---|---|
| k = | 7.7883E+00 | −6.5125E−02 | −1.9005E+00 | −4.6409E+00 | 6.9663E+00 |
| A4 = | 1.6428E−01 | 2.0478E−01 | 7.7000E−02 | 1.4105E−01 | 6.8333E−03 |
| A6 = | −9.9611E−02 | −2.7019E−01 | 3.1863E−02 | 6.9570E−01 | 1.8318E−01 |
| A8 = | 4.1564E−02 | 3.6688E+00 | 3.3691E−01 | −3.9341E+00 | −6.7731E−01 |
| A10 = | −1.1326E−02 | −1.3287E+01 | −1.6127E+00 | 1.2597E+01 | 8.8456E−01 |
| A12 = | 1.9191E−03 | 2.2680E+01 | 1.9650E+00 | −1.9070E+01 | — |
| A14 = | −1.8223E−04 | −1.8178E+01 | −8.1215E−01 | 1.4871E+01 | — |
| A16 = | 7.4365E−06 | 5.3526E+00 | — | — | — |

| Surface # | 7 | 8 | 9 | 10 | 11 |
|---|---|---|---|---|---|
| k = | −5.4446E+00 | −9.0000E+01 | −2.2308E−01 | −1.0467E+00 | −4.1883E+00 |
| A4 = | −9.3211E−01 | −4.2190E−01 | −3.6412E−02 | 8.9394E−01 | −2.9149E−01 |
| A6 = | 2.6999E+00 | 2.0256E−01 | −5.0818E−02 | −1.4263E+00 | 1.1928E+00 |
| A8 = | −4.9124E+00 | 1.4843E+00 | 4.1152E−01 | 2.1523E+00 | −1.6339E+00 |
| A10 = | 4.9993E+00 | −3.6468E+00 | 1.5431E+00 | −2.3214E+00 | 1.1518E+00 |
| A12 = | −2.1411E+00 | 3.3385E+00 | −3.1426E+00 | 1.3264E+00 | −4.4789E−01 |
| A14 = | — | −1.1280E+00 | 2.0634E+00 | −3.6505E−01 | 9.1195E−02 |
| A16 = | — | — | −4.4220E−01 | 4.7744E−02 | −7.5639E−03 |

TABLE 3

Freeform Coefficients

| Surface # | 12 | 13 | Surface # | 12 | 13 |
|---|---|---|---|---|---|
| kx = | −1.1924E+01 | 3.3774E−01 | ky = | −1.3731E+01 | −9.9000E+01 |
| Ax4 = | −2.4337E−01 | −8.7113E−02 | Ay4 = | −2.5065E−01 | −5.9616E−02 |
| Ax6 = | 2.3640E−01 | 4.5472E−02 | Ay6 = | 2.4956E−01 | 4.4498E−02 |
| Ax8 = | −3.4062E−01 | −2.3228E−02 | Ay8 = | −3.4033E−01 | −2.3045E−02 |
| Ax10 = | 3.2275E−01 | 7.7956E−03 | Ay10 = | 3.2285E−01 | 7.7982E−03 |
| Ax12 = | −1.9749E−01 | −1.7109E−03 | Ay12 = | −1.9749E−01 | −1.7107E−03 |
| Ax14 = | 7.1783E−02 | 2.3801E−04 | Ay14 = | 7.1783E−02 | 2.3801E−04 |
| Ax16 = | −1.3751E−02 | −1.9234E−05 | Ay16 = | −1.3751E−02 | −1.9234E−05 |
| Ax18 = | 1.0617E−03 | 6.7946E−07 | Ay18 = | 1.0617E−03 | 6.7946E−07 |

In Table 1, the curvature radius, the thickness and the focal length are shown in millimeters (mm). Surface numbers 0-16 represent the surfaces sequentially arranged from the object side to the image side along the optical axis. The curvature radius and the focal length in the X-axis direction (X-dir.) are given in Table 1 only when the curvature radius and the focal length of the surface in the X-axis direction may be different from that in the Y-axis direction. In Table 2, k represents the conic coefficient of the equation of the aspheric surface profiles. A4-16 represent the axisymmetric aspheric coefficients ranging from the 4th order to the 16th order. In Table 3, kx represents the conic coefficient of the equation of the freeform surface profiles in the X-axis direction, and ky represents the conic coefficient of the equation of the freeform surface profiles in the Y-axis direction. Ax4-18 represent the freeform coefficients ranging from the 4th order to the 18th order in the X-axis direction, and Ay4-18 represent the freeform coefficients ranging from the 4th order to the 18th order in the Y-axis direction. The tables presented below for each embodiment are the corresponding schematic parameter and aberration curves, and the definitions of the tables are the same as Table 1, Table 2 and Table 3 of the 1st embodiment. Therefore, an explanation in this regard will not be provided again.

2nd Embodiment

Figure 5:
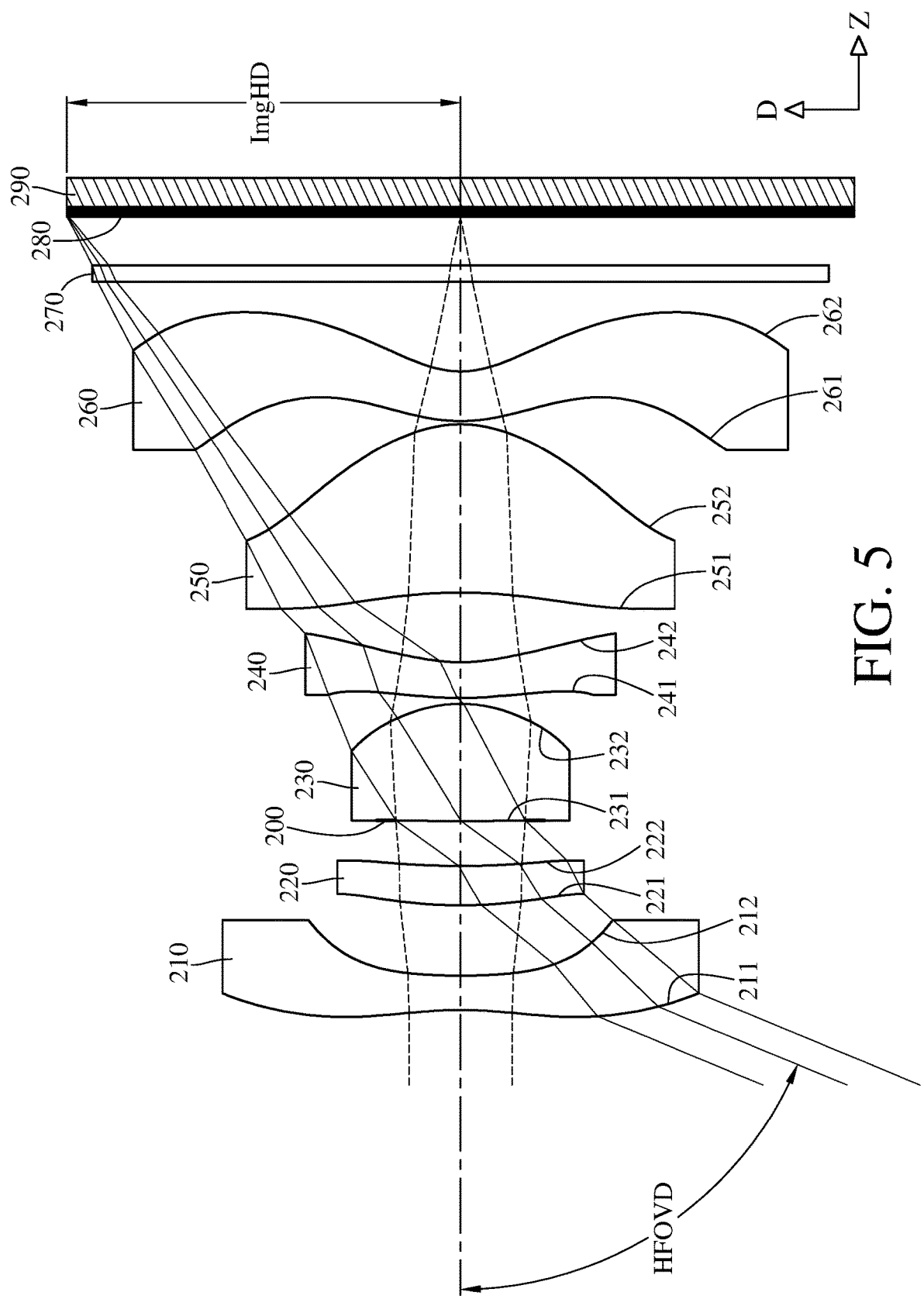
FIG. 5 is a cross-sectional view of an image capturing unit corresponding to a diagonal direction of a photosensitive area of an image sensor according to the 2nd embodiment of the present disclosure.
Figure 6:
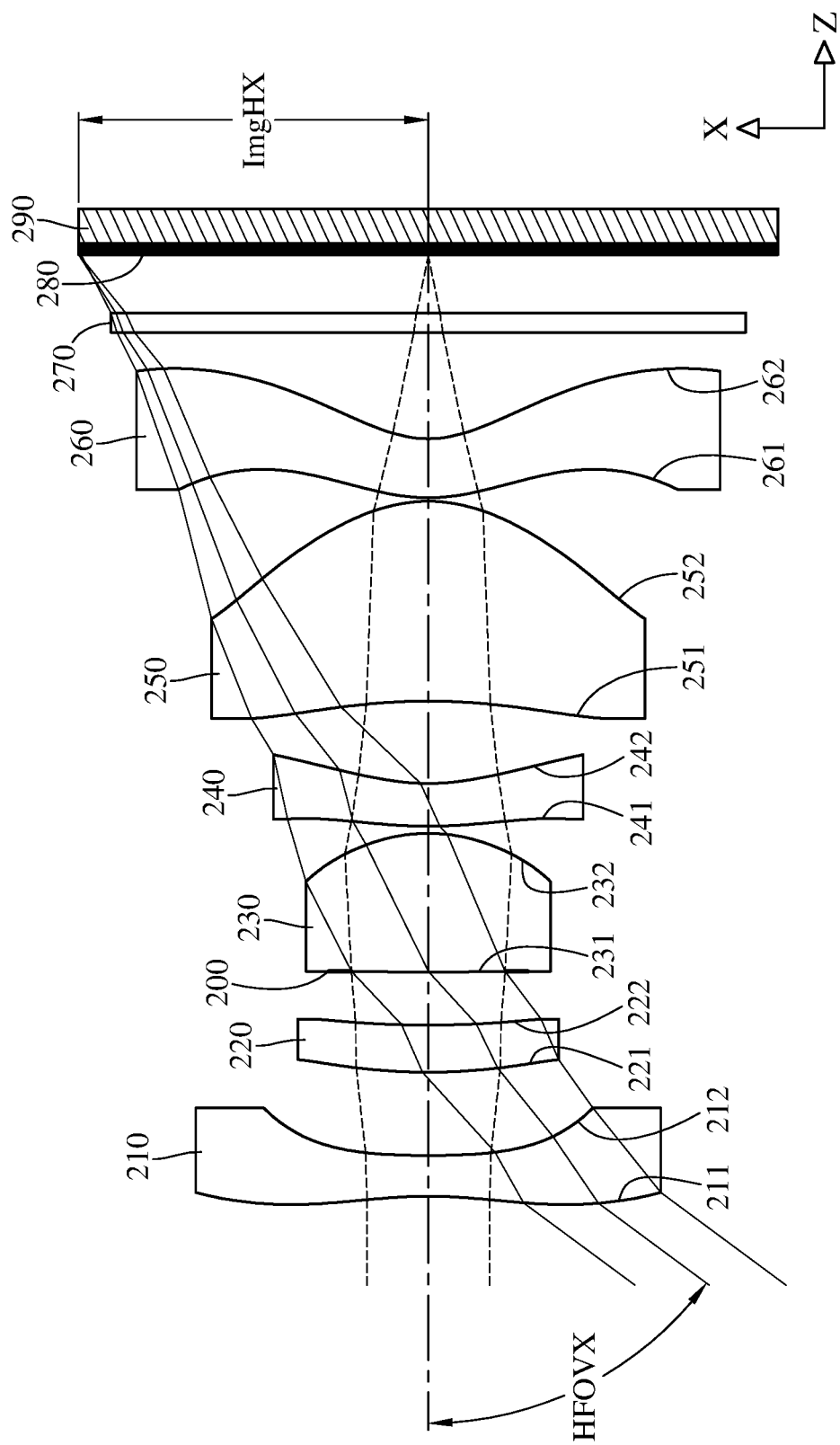
FIG. 6 is a cross-sectional view of the image capturing unit corresponding to a length direction of the photosensitive area of the image sensor according to the 2nd embodiment of the present disclosure.
Figure 7:
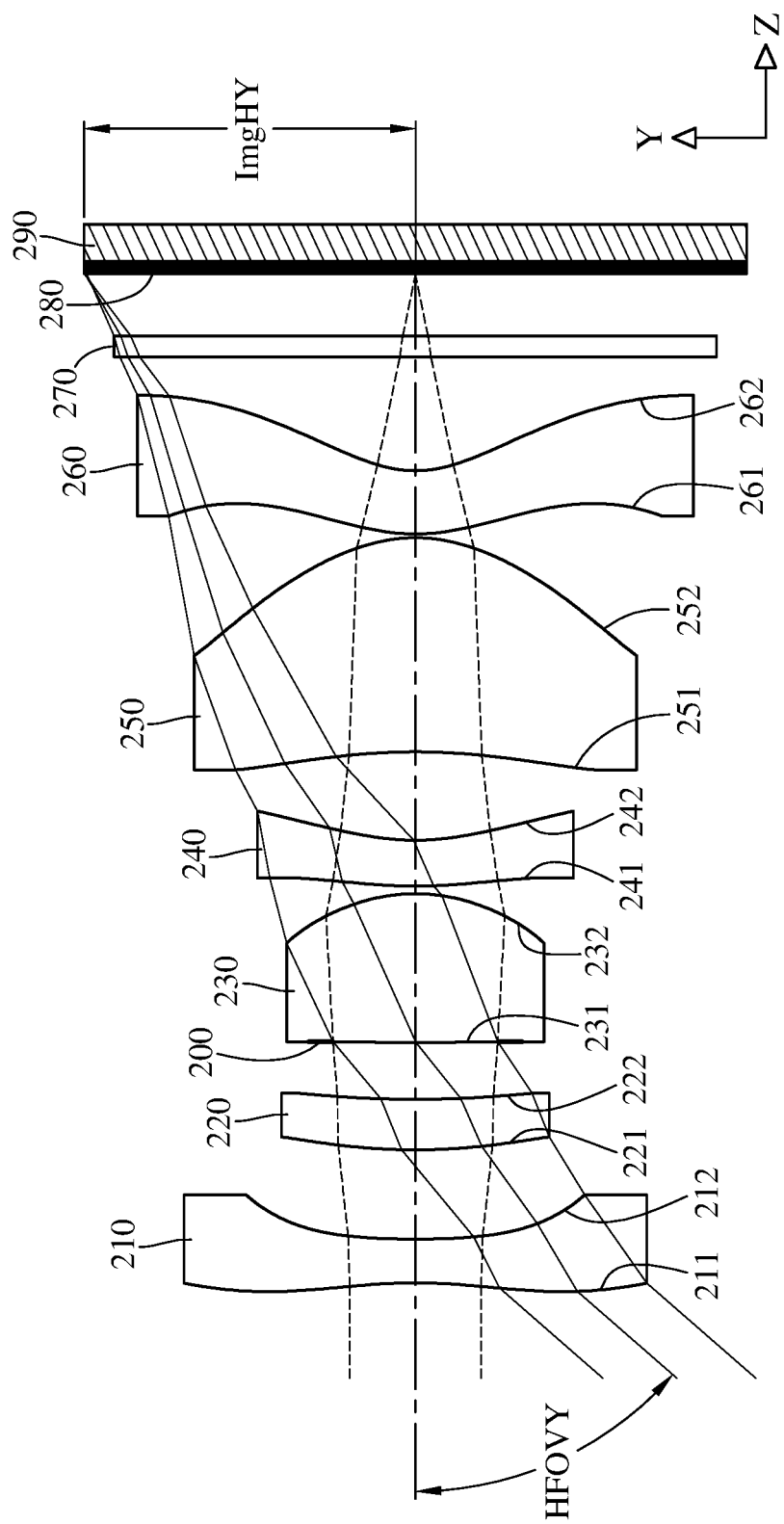
FIG. 7 is a cross-sectional view of the image capturing unit corresponding to a width direction of the photosensitive area of the image sensor according to the 2nd embodiment of the present disclosure.
Figure 8:
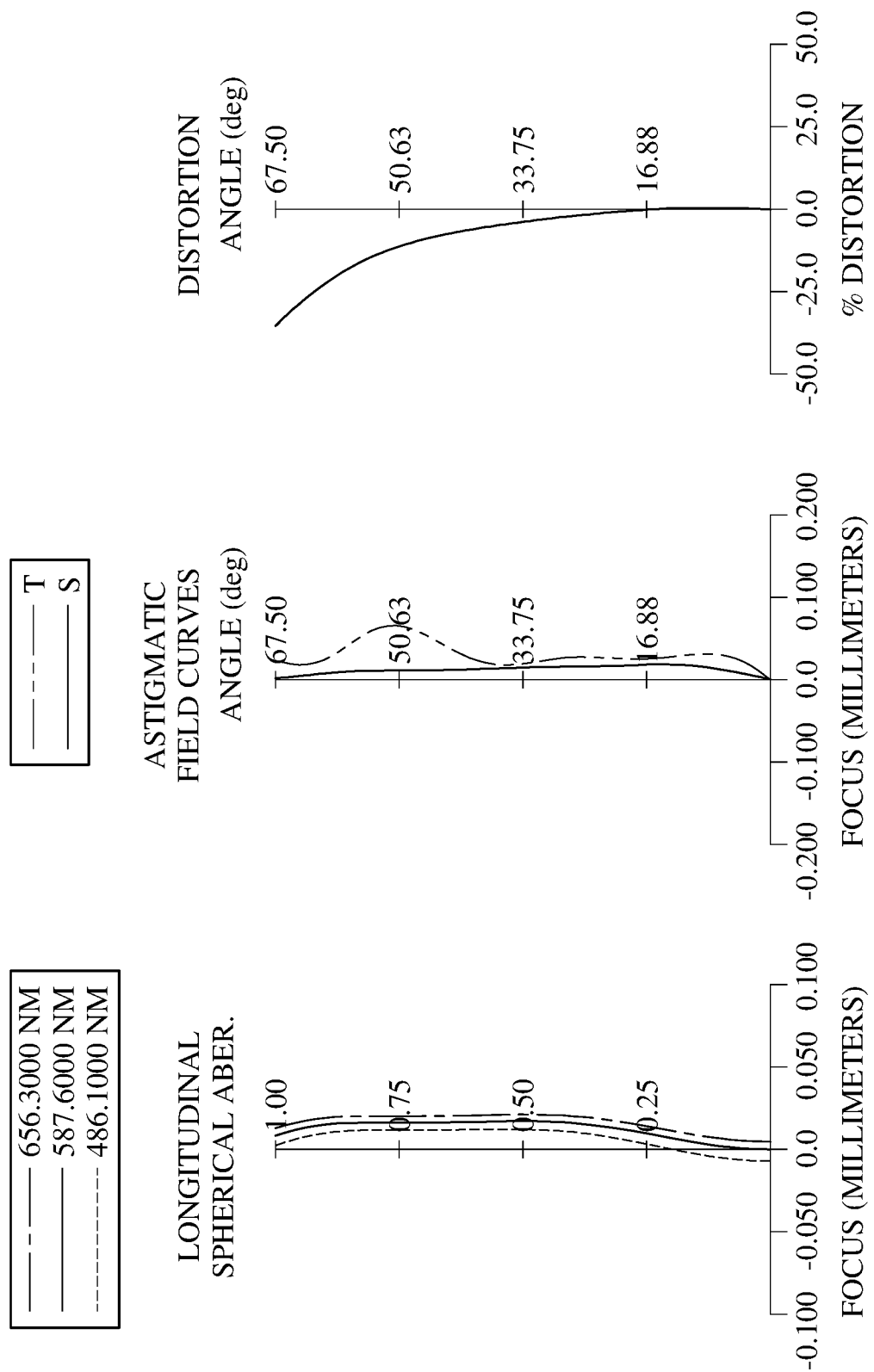
FIG. 8 shows spherical aberration curves, astigmatic field curves and a distortion curve of the image capturing unit according to the 2nd embodiment.

FIG. 5 is a cross-sectional view of an image capturing unit corresponding to a diagonal direction of a photosensitive area of an image sensor according to the 2nd embodiment of the present disclosure. FIG. 6 is a cross-sectional view of the image capturing unit corresponding to a length direction of the photosensitive area of the image sensor according to the 2nd embodiment of the present disclosure. FIG. 7 is a cross-sectional view of the image capturing unit corresponding to a width direction of the photosensitive area of the image sensor according to the 2nd embodiment of the present disclosure. FIG. 8 shows, in order from left to right, spherical aberration curves, astigmatic field curves and a distortion curve of the image capturing unit according to the 2nd embodiment. In FIG. 5 to FIG. 7, the image capturing unit includes the imaging optical system (its reference numeral is omitted) of the present disclosure and an image sensor 290. The imaging optical system includes, in order from an object side to an image side, a first lens element 210, a second lens element 220, an aperture stop 200, a third lens element 230, a fourth lens element 240, a fifth lens element 250, a sixth lens element 260, a filter 270 and an image surface 280. The imaging optical system includes six lens elements (210, 220, 230, 240, 250 and 260) with no additional lens element disposed between each of the adjacent six lens elements.

The first lens element 210 with negative refractive power has an object-side surface 211 being concave in a paraxial region thereof and an image-side surface 212 being concave in a paraxial region thereof. The first lens element 210 is made of plastic material and has both the object-side surface 211 and the image-side surface 212 being freeform surfaces. The object-side surface 211 of the first lens element 210 has one inflection point.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point. The image-side surface 222 of the second lens element 220 has one inflection point.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has one inflection point.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point. The image-side surface 242 of the fourth lens element 240 has one inflection point.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has one inflection point. The image-side surface 252 of the fifth lens element 250 has one inflection point.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has two inflection points. The image-side surface 262 of the sixth lens element 260 has one inflection point. The object-side surface 261 of the sixth lens element 260 has one critical point in an off-axis region thereof. The image-side surface 262 of the sixth lens element 260 has one critical point in an off-axis region thereof.

The filter 270 is made of glass material and located between the sixth lens element 260 and the image surface 280, and will not affect the focal length of the imaging optical system. The image sensor 290 is disposed on or near the image surface 280 of the imaging optical system.

The abovementioned inflection points and critical points of the lens elements refer to the inflection points and critical points on the lens surfaces in a maximum image height direction.

In this embodiment, the second lens element 220, the third lens element 230, the fourth lens element 240, the fifth lens element 250 and the sixth lens element 260 are axisymmetric, each of the object-side surfaces 221, 231, 241, 251 and 261 and the image-side surfaces 222, 242, 252 and 262 has at least one inflection point in the maximum image height direction, the object-side surface 261 of the sixth lens element 260 has at least one critical point in the off-axis region thereof and in the maximum image height direction, and the image-side surface 262 of the sixth lens element 260 has at least one critical point in the off-axis region thereof and in the maximum image height direction. In this embodiment, the maximum image height direction corresponds to a diagonal direction D of a photosensitive area of the image sensor 290.

In this embodiment, the object-side surface 211 of the first lens element 210 satisfies the following condition: |ΔSAGmax|=0.18 [um], and the image-side surface 212 of the first lens element 210 satisfies the following condition: |ΔSAGmax|=0.14 [um].

The detailed optical data of the 2nd embodiment are shown in Table 4, the aspheric surface data are shown in Table 5 and the freeform surface data are shown in Table 6 below.

TABLE 4

2nd Embodiment
fD = 1.68 mm, fX = 1.68 mm, fY = 1.68 mm, Fno = 2.43
HFOVD = 67.5 deg., HFOVX = 53.5 deg., HFOVY = 48.9 deg.
ImgHD = 2.62 mm, ImgHX = 1.97 mm, ImgHY = 1.74 mm

| Surface # | | Curvature Radius | | Thickness | Material | Index | Abbe # | Focal Length | |
|---|---|---|---|---|---|---|---|---|---|
| | | (Y-dir.) | (X-dir.) | | | | | (Y-dir.) | (X-dir.) |
| 0 | Object | Plano | | Infinity | | | | | |
| 1 | Lens 1 | −2.628 | −2.610 (FFS) | 0.230 | Plastic | 1.529 | 58.0 | −3.22 | −3.22 |
| 2 | | 4.999 | 5.053 (FFS) | 0.469 | | | | | |
| 3 | Lens 2 | 3.072 | (ASP) | 0.266 | Plastic | 1.642 | 22.5 | 9.37 | |
| 4 | | 6.067 | (ASP) | 0.302 | | | | | |
| 5 | Ape. Stop | Plano | | −0.004 | | | | | |
| 6 | Lens 3 | 12.254 | (ASP) | 0.782 | Plastic | 1.529 | 58.0 | 1.67 | |
| 7 | | −0.934 | (ASP) | 0.040 | | | | | |
| 8 | Lens 4 | 2.350 | (ASP) | 0.241 | Plastic | 1.679 | 18.4 | −4.27 | |
| 9 | | 1.244 | (ASP) | 0.465 | | | | | |
| 10 | Lens 5 | −2.999 | (ASP) | 1.125 | Plastic | 1.529 | 58.0 | 1.88 | |
| 11 | | −0.843 | (ASP) | 0.020 | | | | | |
| 12 | Lens 6 | 1.016 | (ASP) | 0.332 | Plastic | 1.679 | 18.4 | −2.99 | |
| 13 | | 0.588 | (ASP) | 0.600 | | | | | |
| 14 | Filter | Plano | | 0.110 | Glass | 1.517 | 64.2 | — | |
| 15 | | Plano | | 0.326 | | | | | |
| 16 | Image | Plano | | — | | | | | |

Note:
Reference wavelength is 587.6 nm (d-line).

TABLE 5

Aspheric Coefficients

| Surface # | 3 | 4 | 6 | 7 | 8 |
|---|---|---|---|---|---|
| k = | −1.8198E+01 | −8.9759E+01 | 5.3367E+01 | −3.3061E−01 | 1.6891E+00 |
| A4 = | −1.4618E−02 | 6.2076E−02 | −4.6670E−02 | 1.5471E−01 | −5.2758E−01 |
| A6 = | 2.2517E−01 | 1.0982E−01 | −4.8100E−01 | −7.9955E−01 | 1.2114E+00 |
| A8 = | −4.9791E−01 | −6.0510E−01 | 1.4089E+00 | 8.3625E+00 | −2.2317E+00 |
| A10 = | 1.9845E−01 | 3.5527E−01 | −4.4356E+00 | −4.2239E+01 | 1.7179E+00 |
| A12 = | — | — | — | 1.0344E+02 | 3.2811E−01 |
| A14 = | — | — | — | −1.2637E+02 | −1.3715E+00 |
| A16 = | — | — | — | 6.0666E+01 | 5.7440E−01 |

| Surface # | 9 | 10 | 11 | 12 | 13 |
|---|---|---|---|---|---|
| k = | −2.5131E+00 | 2.5350E+00 | −1.2605E+00 | −6.4812E+00 | −3.1584E+00 |
| A4 = | −5.2284E−01 | 1.7080E−01 | 1.3429E−01 | −9.3570E−02 | −1.9987E−01 |
| A6 = | 1.2061E+00 | −3.6167E−01 | −1.0518E−01 | −1.2122E−01 | 1.1234E−01 |
| A8 = | −1.9541E+00 | 6.3408E−01 | −4.6297E−02 | 1.5698E−01 | −4.1965E−02 |
| A10 = | 2.0097E+00 | −5.7840E−01 | 1.3380E−01 | −8.6674E−02 | 1.0099E−02 |
| A12 = | −1.2599E+00 | 2.8873E−01 | −7.6097E−02 | 2.5509E−02 | −1.5457E−03 |
| A14 = | 4.3786E−01 | −7.4517E−02 | 1.7560E−02 | −3.8420E−03 | 1.3591E−04 |
| A16 = | −6.5043E−02 | 7.7872E−03 | −1.4237E−03 | 2.3276E−04 | −5.1644E−06 |

TABLE 6

Freeform Coefficients

| Surface # | 1 | 2 | Surface # | 1 | 2 |
|---|---|---|---|---|---|
| kx = | −7.2471E−01 | 4.5266E+00 | ky = | −3.6517E−01 | 2.3495E+00 |
| Ax4 = | 2.7456E−01 | 2.1799E−01 | Ay4 = | 2.7616E−01 | 2.2082E−01 |
| Ax6 = | −1.8812E−01 | 6.1839E−02 | Ay6 = | −1.8803E−01 | 5.8936E−02 |
| Ax8 = | 1.0538E−01 | −1.0150E−01 | Ay8 = | 1.0542E−01 | −1.0452E−01 |
| Ax10 = | −4.3439E−02 | 1.1196E−01 | Ay10 = | −4.3417E−02 | 1.1842E−01 |
| Ax12 = | 1.1856E−02 | −5.4513E−02 | Ay12 = | 1.1859E−02 | −5.6120E−02 |
| Ax14 = | −1.8725E−03 | 9.5729E−03 | Ay14 = | −1.8762E−03 | 8.0698E−03 |
| Ax16 = | 1.2934E−04 | — | Ay16 = | 1.2956E−04 | — |

In the 2nd embodiment, the equations of the freeform surface profiles and the axisymmetric aspheric surface profiles of the aforementioned lens elements are the same as the equations of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 4, Table 5 and Table 6 as the following values and satisfy the following conditions:

| 2nd Embodiment | |
|---|---|
| fD [mm] | 1.68 |
| fX [mm] | 1.68 |
| fY [mm] | 1.68 |
| Fno | 2.43 |
| HFOVD [deg.] | 67.5 |
| HFOVX [deg.] | 53.5 |
| HFOVY [deg.] | 48.9 |
| ImgHD [mm] | 2.62 |
| ImgHX [mm] | 1.97 |
| ImgHY [mm] | 1.74 |
| V5 + V6 | 76.4 |
| ΣCT/ΣAT | 2.30 |
| CT1/CT3 | 0.29 |
| CT1/CT4 | 0.95 |
| CT2/CT4 | 1.10 |
| CT5/ΣAT | 0.87 |
| CT5/CT3 | 1.44 |
| CT6/CT4 | 1.38 |
| T34/CT4 | 0.17 |
| TD/BL | 4.12 |
| TL [mm] | 5.30 |
| TL/EPD | 7.69 |
| TL/f | 3.16 |
| TL/ImgH | 2.02 |
| R6/R7 | −0.40 |
| R9/R10 | 3.56 |
| f/CT5 | 1.49 |
| f/f1234 | 0.59 |
| f/f34 | 0.70 |
| f/f56 | 0.47 |
| f4/CT4 | −17.71 |
| HFOV [deg.] | 67.5 |
| |ΔSAGmax| [um] | 0.18; 0.14 |

3rd Embodiment

Figure 9:
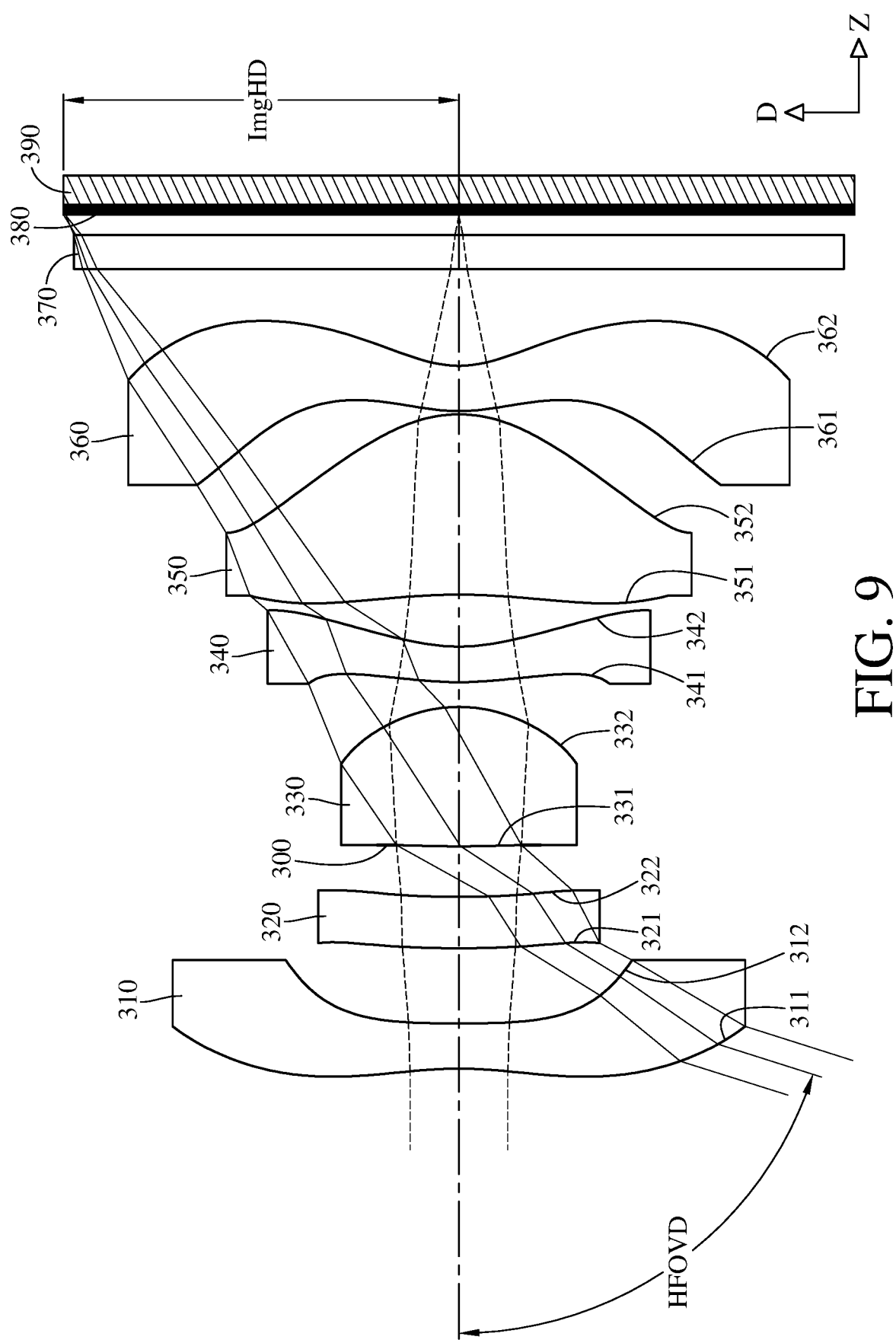
FIG. 9 is a cross-sectional view of an image capturing unit corresponding to a diagonal direction of a photosensitive area of an image sensor according to the 3rd embodiment of the present disclosure.
Figure 10:
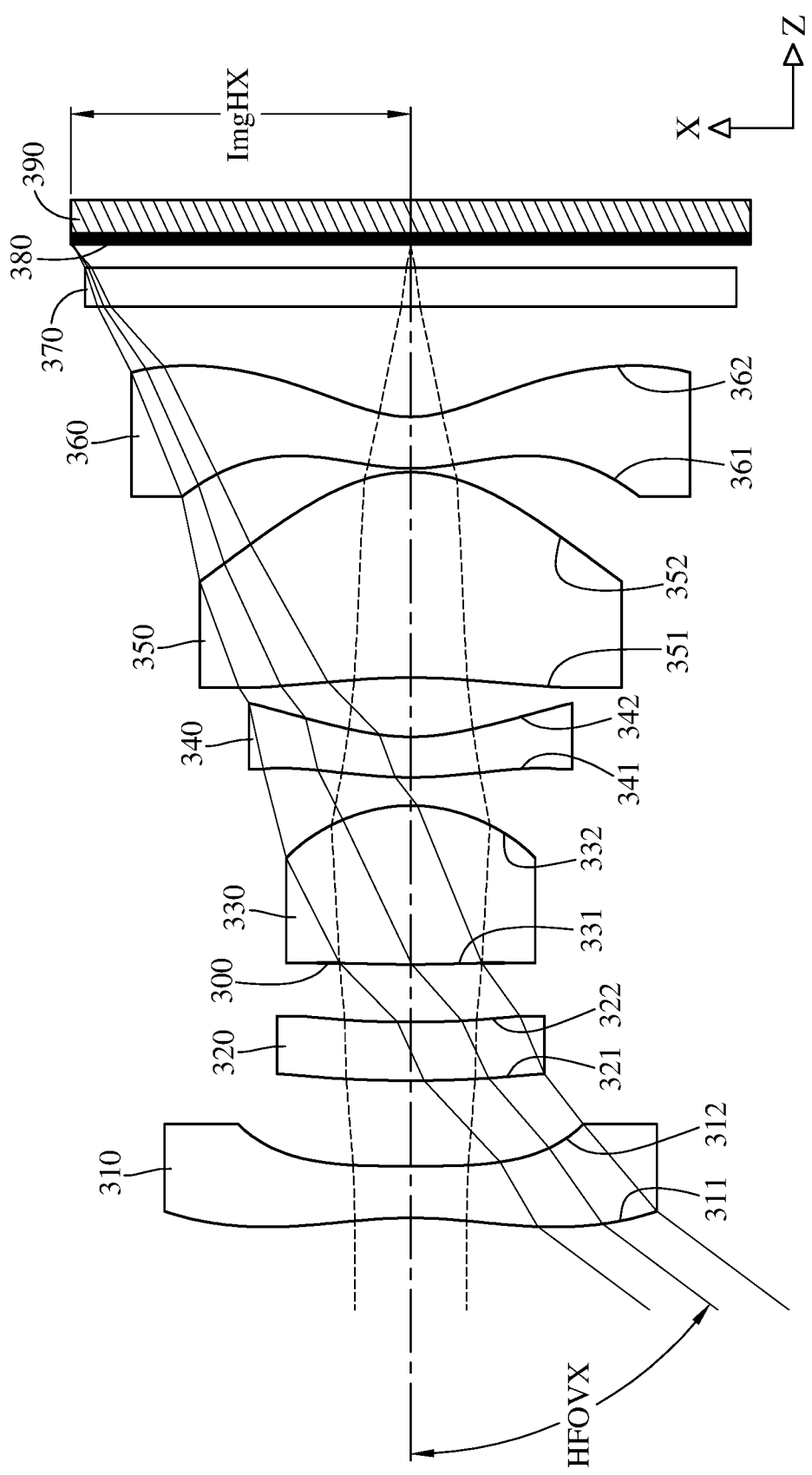
FIG. 10 is a cross-sectional view of the image capturing unit corresponding to a length direction of the photosensitive area of the image sensor according to the 3rd embodiment of the present disclosure.
Figure 11:
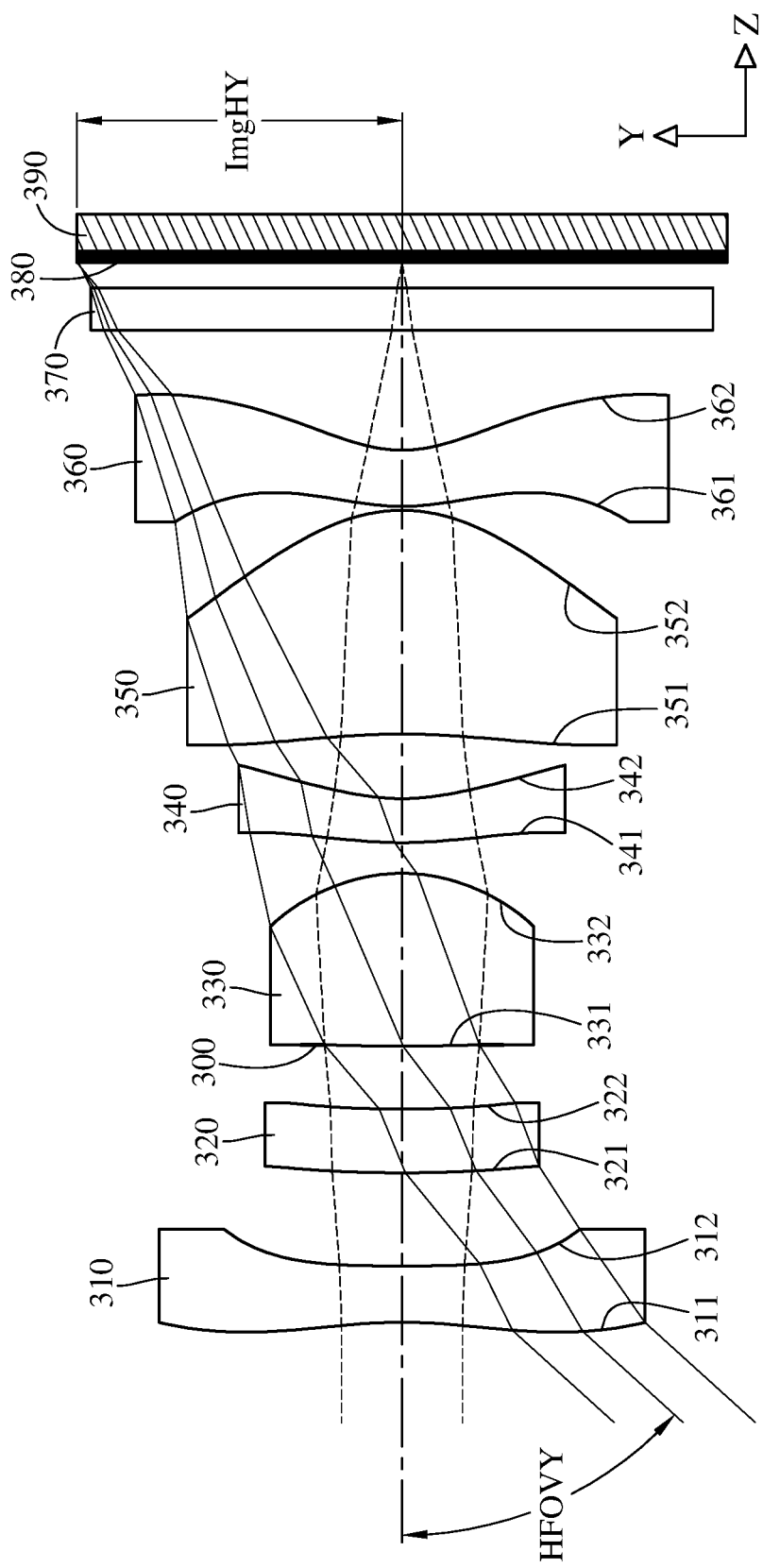
FIG. 11 is a cross-sectional view of the image capturing unit corresponding to a width direction of the photosensitive area of the image sensor according to the 3rd embodiment of the present disclosure.
Figure 12:
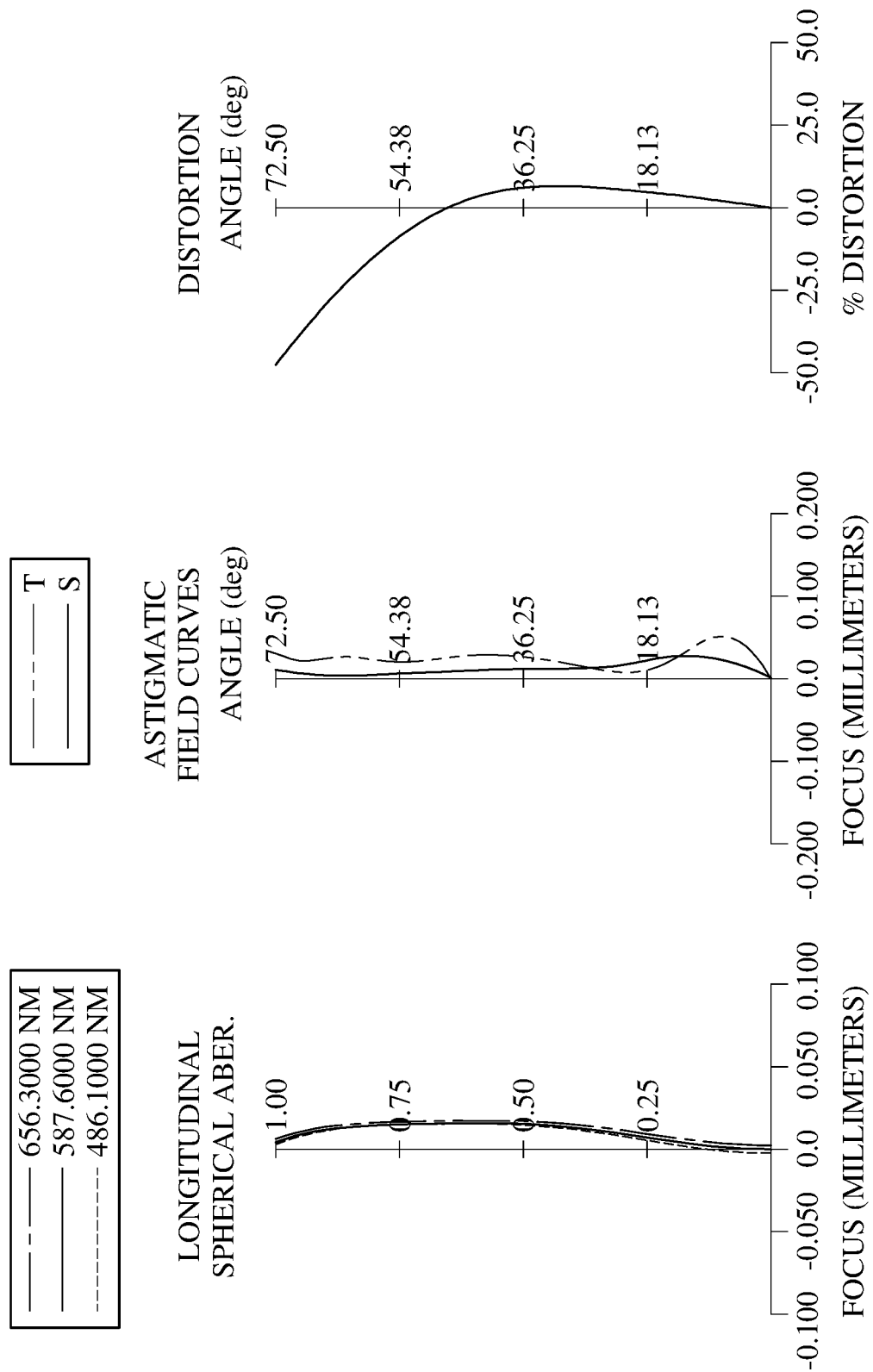
FIG. 12 shows spherical aberration curves, astigmatic field curves and a distortion curve of the image capturing unit according to the 3rd embodiment.

FIG. 9 is a cross-sectional view of an image capturing unit corresponding to a diagonal direction of a photosensitive area of an image sensor according to the 3rd embodiment of the present disclosure. FIG. 10 is a cross-sectional view of the image capturing unit corresponding to a length direction of the photosensitive area of the image sensor according to the 3rd embodiment of the present disclosure. FIG. 11 is a cross-sectional view of the image capturing unit corresponding to a width direction of the photosensitive area of the image sensor according to the 3rd embodiment of the present disclosure. FIG. 12 shows, in order from left to right, spherical aberration curves, astigmatic field curves and a distortion curve of the image capturing unit according to the 3rd embodiment. In FIG. 9 to FIG. 11, the image capturing unit includes the imaging optical system (its reference numeral is omitted) of the present disclosure and an image sensor 390. The imaging optical system includes, in order from an object side to an image side, a first lens element 310, a second lens element 320, an aperture stop 300, a third lens element 330, a fourth lens element 340, a fifth lens element 350, a sixth lens element 360, a filter 370 and an image surface 380. The imaging optical system includes six lens elements (310, 320, 330, 340, 350 and 360) with no additional lens element disposed between each of the adjacent six lens elements.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 being a freeform surface and the image-side surface 312 being aspheric. The object-side surface 311 of the first lens element 310 has one inflection point.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point. The image-side surface 322 of the second lens element 320 has one inflection point.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has one inflection point.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point. The image-side surface 342 of the fourth lens element 340 has one inflection point.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has one inflection point. The image-side surface 352 of the fifth lens element 350 has one inflection point.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 being aspheric and the image-side surface 362 being a freeform surface. The object-side surface 361 of the sixth lens element 360 has two inflection points. The image-side surface 362 of the sixth lens element 360 has one inflection point. The object-side surface 361 of the sixth lens element 360 has one critical point in an off-axis region thereof. The image-side surface 362 of the sixth lens element 360 has one critical point in an off-axis region thereof.

The filter 370 is made of glass material and located between the sixth lens element 360 and the image surface 380, and will not affect the focal length of the imaging optical system. The image sensor 390 is disposed on or near the image surface 380 of the imaging optical system.

The abovementioned inflection points and critical points of the lens elements refer to the inflection points and critical points on the lens surfaces in a maximum image height direction.

In this embodiment, the second lens element 320, the third lens element 330, the fourth lens element 340 and the fifth lens element 350 are axisymmetric, each of the object-side surfaces 321, 331, 341 and 351 and the image-side surfaces 322, 342 and 352 has at least one inflection point in the maximum image height direction, the object-side surface 361 of the sixth lens element 360 has at least one critical point in the off-axis region thereof and in the maximum image height direction, and the image-side surface 362 of the sixth lens element 360 has at least one critical point in the off-axis region thereof and in the maximum image height direction. In this embodiment, the maximum image height direction corresponds to a diagonal direction D of a photosensitive area of the image sensor 390.

In this embodiment, the object-side surface 311 of the first lens element 310 satisfies the following condition: $|\Delta SAGmax|=0.04$ [um], and the image-side surface 362 of the sixth lens element 360 satisfies the following condition: $|\Delta SAGmax|=0.14$ [um].

The detailed optical data of the 3rd embodiment are shown in Table 7, the aspheric surface data are shown in Table 8 and the freeform surface data are shown in Table 9 below.

TABLE 7

3rd Embodiment
fD = 1.47 mm, fX = 1.47 mm, fY = 1.47 mm, Fno = 2.43
HFOVD = 72.4 deg., HFOVX = 53.2 deg., HFOVY = 47.7 deg.
ImgHD = 2.45 mm, ImgHX = 1.83 mm, ImgHY = 1.62 mm

| Surface # | | Curvature Radius (Y-dir.) | Curvature Radius (X-dir.) | | Thickness | Material | Index | Abbe # | Focal Length (Y-dir.) | Focal Length (X-dir.) |
|---|---|---|---|---|---|---|---|---|---|---|
| 0 | Object | | Plano | | Infinity | | | | | |
| 1 | Lens 1 | −2.465 | −2.470 | (FFS) | 0.281 | Plastic | 1.545 | 56.1 | −3.75 | −3.76 |
| 2 | | 12.491 | | (ASP) | 0.465 | | | | | |
| 3 | Lens 2 | 7.088 | | (ASP) | 0.318 | Plastic | 1.669 | 19.5 | −147.48 | |
| 4 | | 6.494 | | (ASP) | 0.320 | | | | | |
| 5 | Ape. Stop | | Plano | | −0.007 | | | | | |
| 6 | Lens 3 | 6.906 | | (ASP) | 0.863 | Plastic | 1.544 | 56.0 | 1.48 | |
| 7 | | −0.872 | | (ASP) | 0.153 | | | | | |
| 8 | Lens 4 | 2.071 | | (ASP) | 0.220 | Plastic | 1.669 | 19.5 | −4.03 | |
| 9 | | 1.121 | | (ASP) | 0.322 | | | | | |
| 10 | Lens 5 | −3.344 | | (ASP) | 1.116 | Plastic | 1.544 | 56.0 | 1.67 | |
| 11 | | −0.797 | | (ASP) | 0.020 | | | | | |
| 12 | Lens 6 | 1.116 | | (ASP) | 0.280 | Plastic | 1.669 | 19.5 | −2.93 | −2.90 |
| 13 | | 0.640 | 0.638 | (FFS) | 0.600 | | | | | |
| 14 | Filter | | Plano | | 0.210 | Glass | 1.517 | 64.2 | — | |
| 15 | | | Plano | | 0.125 | | | | | |
| 16 | Image | | Plano | | — | | | | | |

Note:
Reference wavelength is 587.6 nm (d-line).

TABLE 8

Aspheric Coefficients

| Surface # | 2 | 3 | 4 | 6 | 7 |
|---|---|---|---|---|---|
| k = | −9.0000E+01 | −6.9146E+00 | −9.0000E+01 | −8.1559E+01 | −6.8467E−01 |
| A4 = | 2.1635E−01 | 1.3413E−02 | 1.6633E−01 | −7.5936E−02 | 8.3892E−02 |
| A6 = | 2.3296E−01 | 1.2530E−01 | −1.9023E−01 | −4.7881E−01 | −6.7654E−01 |
| A8 = | −7.1529E−01 | −3.9641E−01 | −3.1155E−01 | 5.6147E−01 | 7.3318E+00 |
| A10 = | 9.5428E−01 | 1.9394E−01 | 2.9287E−01 | −4.5811E+00 | −4.0838E+01 |
| A12 = | −5.2113E−01 | — | — | — | 1.0717E+02 |
| A14 = | 9.3978E−02 | — | — | — | −1.3998E+02 |
| A16 = | — | — | — | — | 7.1639E+01 |

| Surface # | 8 | 9 | 10 | 11 | 12 |
|---|---|---|---|---|---|
| k = | 1.9488E−01 | −2.3877E+00 | −1.4876E−01 | −1.3449E+00 | −1.2895E+01 |
| A4 = | −6.0320E−01 | −6.0430E−01 | 1.8946E−01 | 8.8579E−03 | −3.1761E−01 |
| A6 = | 1.3554E+00 | 1.4660E+00 | −2.6609E−01 | 3.0014E−01 | 9.3458E−02 |
| A8 = | −1.9991E+00 | −2.3107E+00 | 3.8219E−01 | −5.4822E−01 | 7.3745E−02 |
| A10 = | 6.0894E−01 | 2.2219E+00 | −3.7198E−01 | 5.2202E−01 | −1.2103E−01 |
| A12 = | 1.6222E+00 | −1.2648E+00 | 2.4973E−01 | −2.8505E−01 | 7.0512E−02 |
| A14 = | −1.8842E+00 | 3.8566E−01 | −1.0052E−01 | 8.4546E−02 | −1.8798E−02 |
| A16 = | 5.3821E−01 | −4.8138E−02 | 1.7279E−02 | −1.0367E−02 | 1.9130E−03 |

TABLE 9

| | Freeform Coefficients | | | | |
|---|---|---|---|---|---|
| Surface # | 1 | 13 | Surface # | 1 | 13 |
| kx = | −8.1489E−01 | −4.1984E+00 | ky = | −8.1489E−01 | −4.2088E+00 |
| Ax4 = | 3.0330E−01 | −2.4544E−01 | Ay4 = | 3.0441E−01 | −2.4542E−01 |
| Ax6 = | −2.4001E−01 | 1.8148E−01 | Ay6 = | −2.4090E−01 | 1.8213E−01 |
| Ax8 = | 1.5445E−01 | −8.9325E−02 | Ay8 = | 1.5470E−01 | −8.9677E−02 |
| Ax10 = | −6.6621E−02 | 2.6821E−02 | Ay10 = | −6.6613E−02 | 2.6853E−02 |
| Ax12 = | 1.7827E−02 | −4.8054E−03 | Ay12 = | 1.7815E−02 | −4.7906E−03 |
| Ax14 = | −2.6800E−03 | 4.6954E−04 | Ay14 = | −2.6806E−03 | 4.6501E−04 |
| Ax16 = | 1.7524E−04 | −1.9374E−05 | Ay16 = | 1.7565E−04 | −1.8967E−05 |

In the 3rd embodiment, the equations of the freeform surface profiles and the axisymmetric aspheric surface profiles of the aforementioned lens elements are the same as the equations of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 7, Table 8 and Table 9 as the following values and satisfy the following conditions:

| 3rd Embodiment | |
|---|---|
| fD [mm] | 1.47 |
| fX [mm] | 1.47 |
| fY [mm] | 1.47 |
| Fno | 2.43 |
| HFOVD [deg.] | 72.4 |
| HFOVX [deg.] | 53.2 |
| HFOVY [deg.] | 47.7 |
| ImgHD [mm] | 2.45 |
| ImgHX [mm] | 1.83 |
| ImgHY [mm] | 1.62 |
| V5 + V6 | 75.4 |
| ΣCT/ΣAT | 2.42 |
| CT1/CT3 | 0.33 |
| CT1/CT4 | 1.28 |
| CT2/CT4 | 1.45 |
| CT5/ΣAT | 0.88 |
| CT5/CT3 | 1.29 |
| CT6/CT4 | 1.27 |
| T34/CT4 | 0.70 |
| TD/BL | 4.65 |
| TL [mm] | 5.29 |
| TL/EPD | 8.75 |
| TL/f | 3.60 |
| TL/ImgH | 2.16 |
| R6/R7 | −0.42 |
| R9/R10 | 4.20 |
| f/CT5 | 1.32 |
| f/f1234 | 0.62 |
| f/f34 | 0.76 |
| f/f56 | 0.48 |
| f4/CT4 | −18.30 |
| HFOV [deg.] | 72.4 |
| |ΔSAGmax| [um] | 0.04; 0.14 |

4th Embodiment

Figure 13:
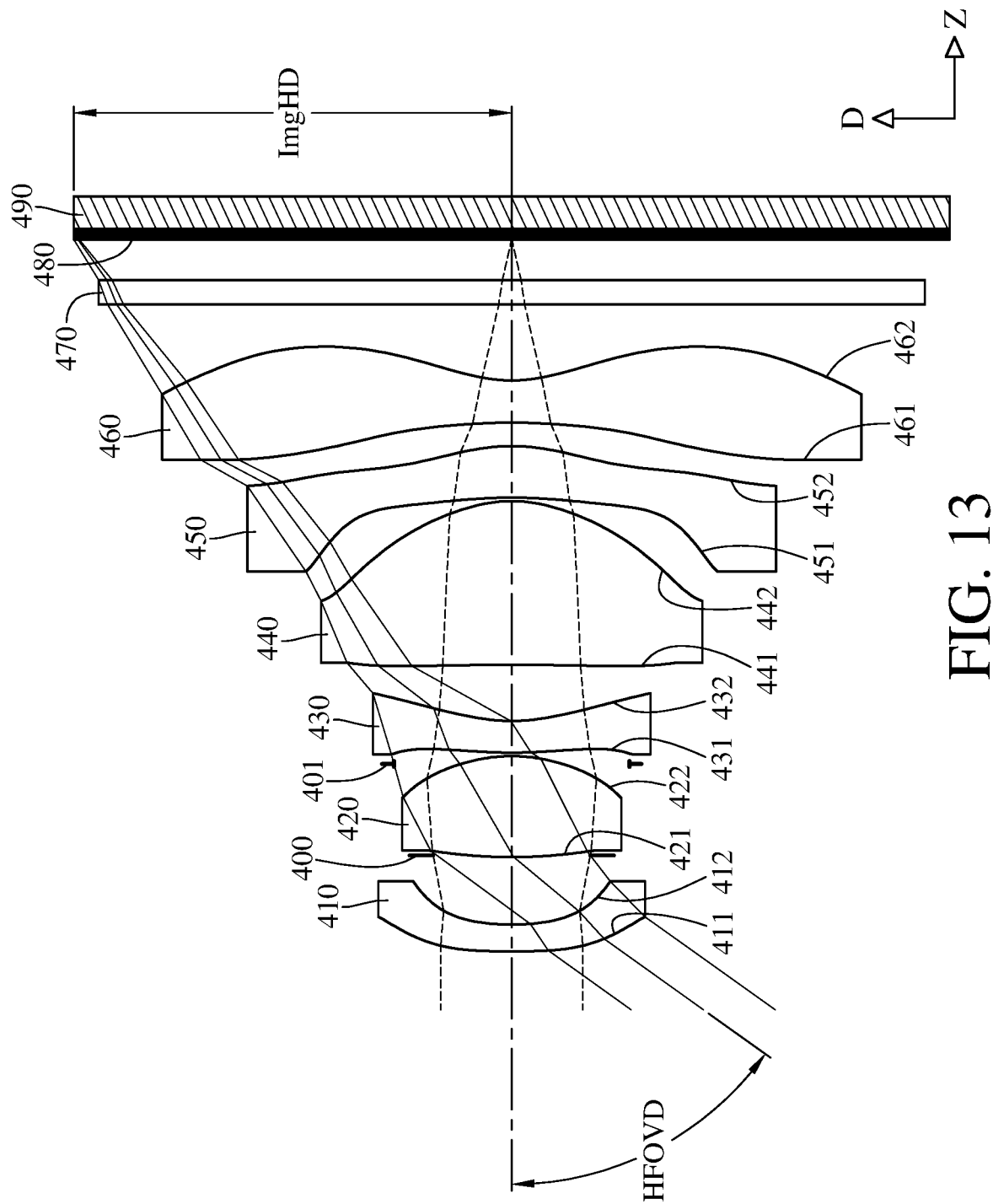
FIG. 13 is a cross-sectional view of an image capturing unit corresponding to a diagonal direction of a photosensitive area of an image sensor according to the 4th embodiment of the present disclosure.
Figure 14:
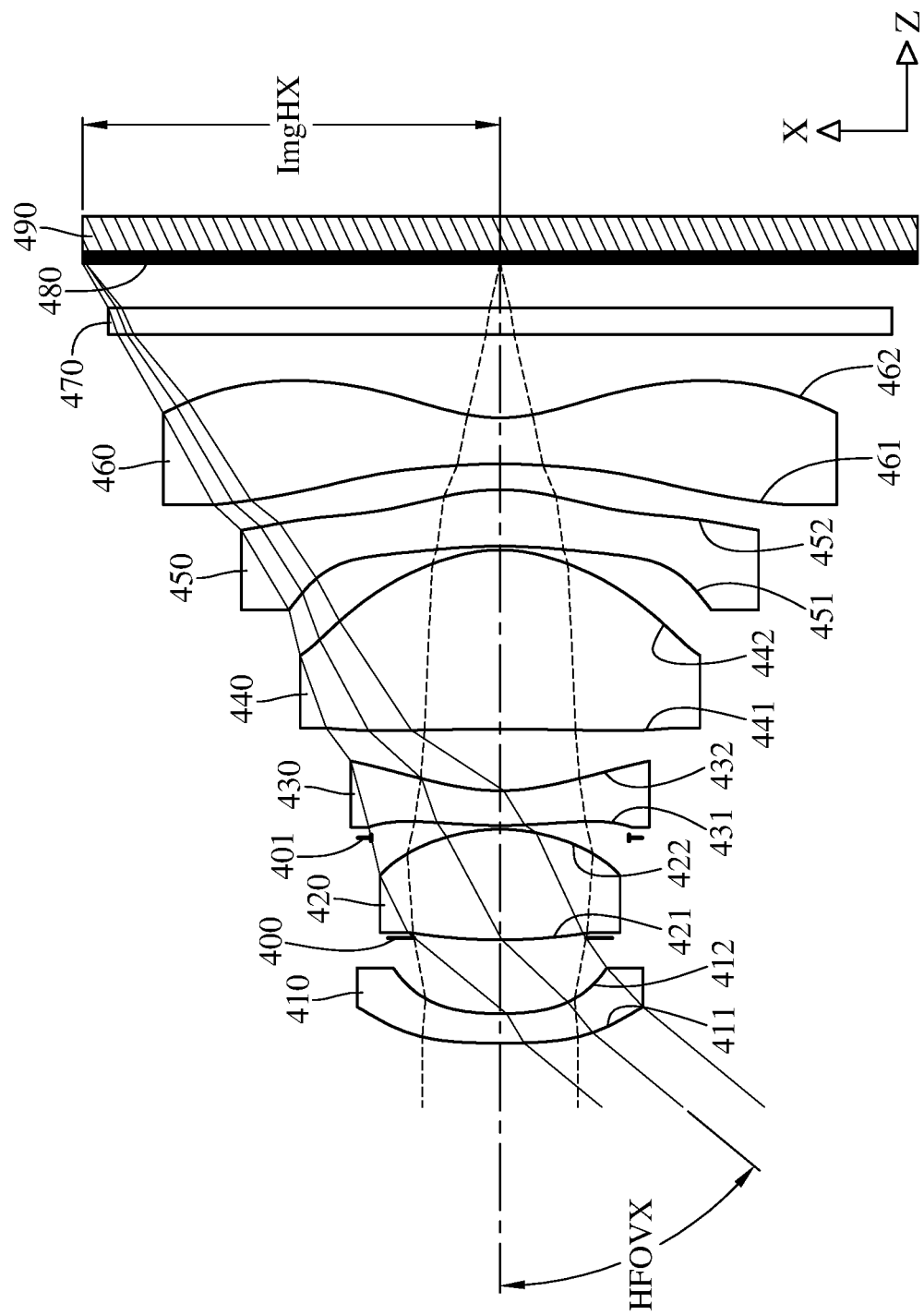
FIG. 14 is a cross-sectional view of the image capturing unit corresponding to a length direction of the photosensitive area of the image sensor according to the 4th embodiment of the present disclosure.
Figure 15:
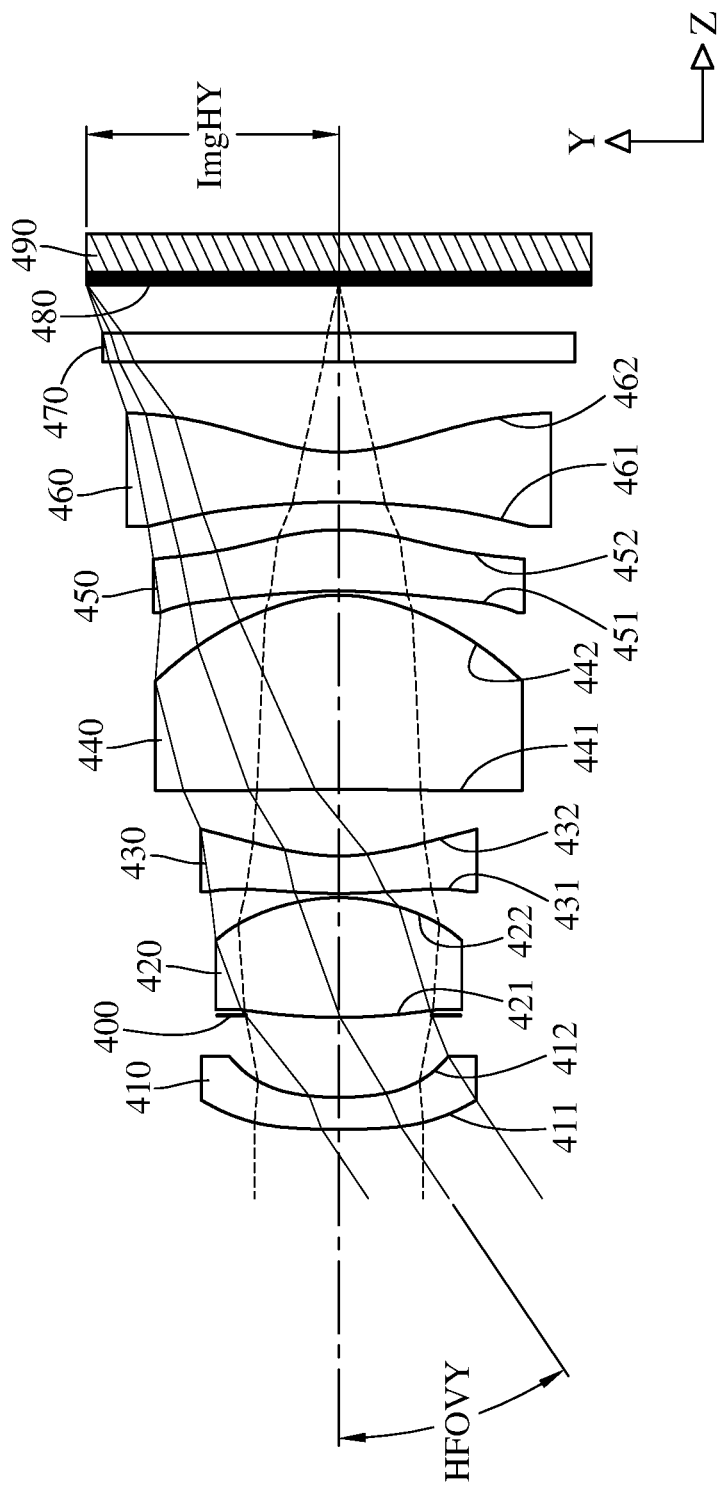
FIG. 15 is a cross-sectional view of the image capturing unit corresponding to a width direction of the photosensitive area of the image sensor according to the 4th embodiment of the present disclosure.
Figure 16:
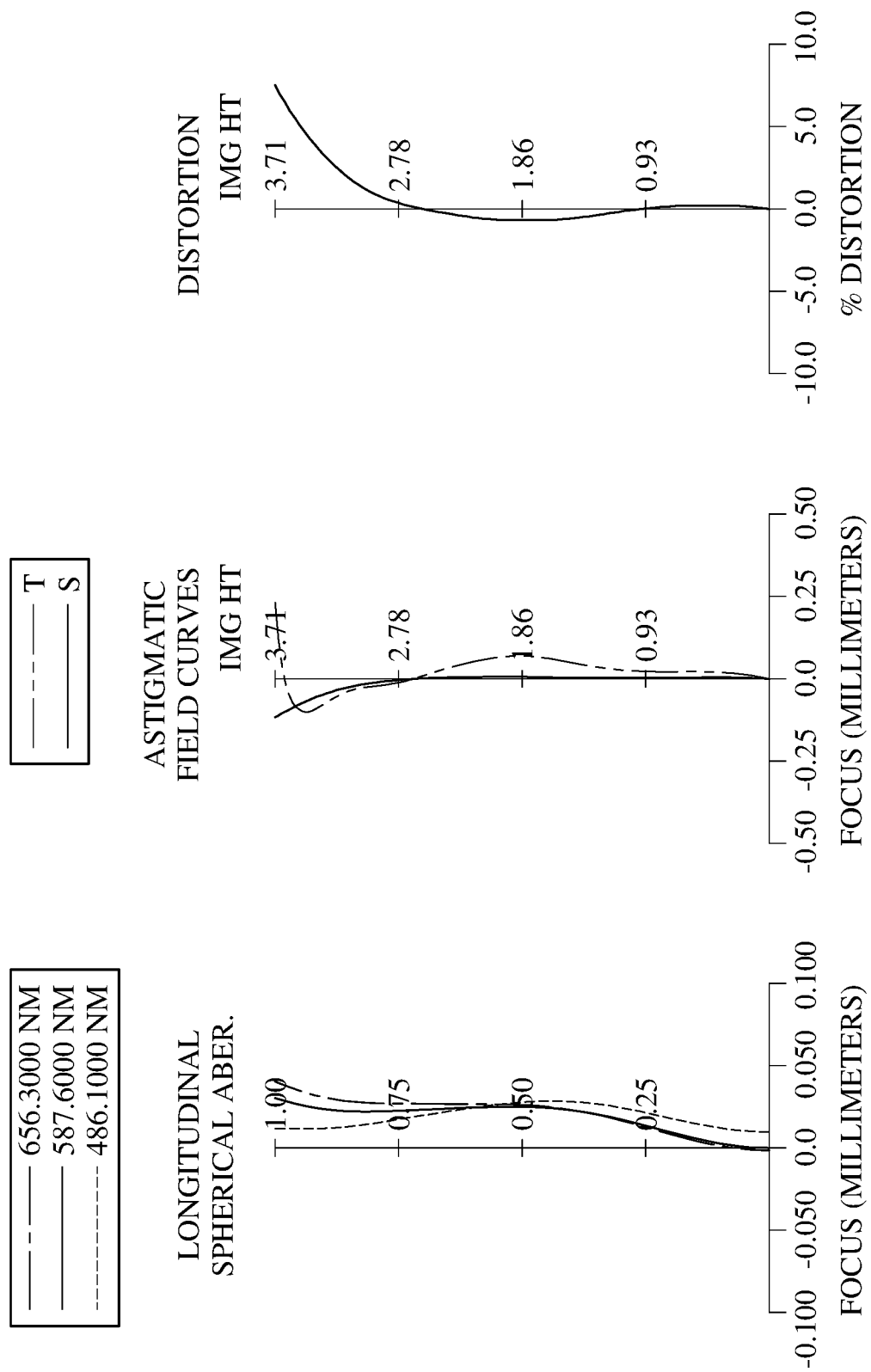
FIG. 16 shows spherical aberration curves, astigmatic field curves and a distortion curve of the image capturing unit according to the 4th embodiment.

FIG. 13 is a cross-sectional view of an image capturing unit corresponding to a diagonal direction of a photosensitive area of an image sensor according to the 4th embodiment of the present disclosure. FIG. 14 is a cross-sectional view of the image capturing unit corresponding to a length direction of the photosensitive area of the image sensor according to the 4th embodiment of the present disclosure. FIG. 15 is a cross-sectional view of the image capturing unit corresponding to a width direction of the photosensitive area of the image sensor according to the 4th embodiment of the present disclosure. FIG. 16 shows, in order from left to right, spherical aberration curves, astigmatic field curves and a distortion curve of the image capturing unit according to the 4th embodiment. In FIG. 13 to FIG. 15, the image capturing unit includes the imaging optical system (its reference numeral is omitted) of the present disclosure and an image sensor 490. The imaging optical system includes, in order from an object side to an image side, a first lens element 410, an aperture stop 400, a second lens element 420, a stop 401, a third lens element 430, a fourth lens element 440, a fifth lens element 450, a sixth lens element 460, a filter 470 and an image surface 480. The imaging optical system includes six lens elements (410, 420, 430, 440, 450 and 460) with no additional lens element disposed between each of the adjacent six lens elements.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has one inflection point.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has one inflection point.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has two inflection points.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has one inflection point.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has one inflection point. The image-side surface 452 of the fifth lens element 450 has three inflection points.

The sixth lens element 460 with negative refractive power has an object-side surface 461 being concave in a paraxial region thereof and an image-side surface 462 being concave in a paraxial region thereof. The sixth lens element 460 is made of plastic material and has both the object-side surface 461 and the image-side surface 462 being freeform surfaces. The object-side surface 461 of the sixth lens element 460 has one inflection point. The image-side surface 462 of the sixth lens element 460 has one inflection point. The object-side surface 461 of the sixth lens element 460 has one critical point in an off-axis region thereof. The image-side surface 462 of the sixth lens element 460 has one critical point in an off-axis region thereof.

The filter 470 is made of glass material and located between the sixth lens element 460 and the image surface 480, and will not affect the focal length of the imaging optical system. The image sensor 490 is disposed on or near the image surface 480 of the imaging optical system.

The abovementioned inflection points and critical points of the lens elements refer to the inflection points and critical points on the lens surfaces in a maximum image height direction.

In this embodiment, the first lens element 410, the second lens element 420, the third lens element 430, the fourth lens element 440 and the fifth lens element 450 are axisymmetric, each of the object-side surfaces 411, 421, 431, 441 and 451 and the image-side surfaces 432, 442 and 452 has at least one inflection point in the maximum image height direction, the object-side surface 461 of the sixth lens element 460 has at least one critical point in the off-axis region thereof and in the maximum image height direction, and the image-side surface 462 of the sixth lens element 460 has at least one critical point in the off-axis region thereof and in the maximum image height direction. In this embodiment, the maximum image height direction corresponds to a diagonal direction D of a photosensitive area of the image sensor 490.

In this embodiment, the object-side surface 461 of the sixth lens element 460 satisfies the following condition: |ΔSAGmax|=1.96 [um], and the image-side surface 462 of the sixth lens element 460 satisfies the following condition: |ΔSAGmax|=6.55 [um].

The detailed optical data of the 4th embodiment are shown in Table 10, the aspheric surface data are shown in Table 11 and the freeform surface data are shown in Table 12 below.

TABLE 10

4th Embodiment
fD = 2.71 mm, fX = 2.71 mm, fY = 2.71 mm, Fno = 2.23
HFOVD = 54.4 deg., HFOVX = 50.5 deg., HFOVY = 33.9 deg.
ImgHD = 3.71 mm, ImgHX = 3.23 mm, ImgHY = 1.82 mm

| Surface # | | Curvature Radius | | Thickness | Material | Index | Abbe # | Focal Length | |
|---|---|---|---|---|---|---|---|---|---|
| | | (Y-dir.) | (X-dir.) | | | | | (Y-dir.) | (X-dir.) |
| 0 | Object | | Plano | Infinity | | | | | |
| 1 | Lens 1 | 11.554 | (ASP) | 0.230 | Plastic | 1.544 | 55.9 | −5.79 | |
| 2 | | 2.458 | (ASP) | 0.591 | | | | | |
| 3 | Ape. Stop | | Plano | −0.014 | | | | | |
| 4 | Lens 2 | 4.453 | (ASP) | 0.864 | Plastic | 1.544 | 54.8 | 2.00 | |
| 5 | | −1.344 | (ASP) | −0.067 | | | | | |
| 6 | Stop | | Plano | 0.097 | | | | | |
| 7 | Lens 3 | 3.956 | (ASP) | 0.271 | Plastic | 1.620 | 24.8 | −4.06 | |
| 8 | | 1.498 | (ASP) | 0.481 | | | | | |
| 9 | Lens 4 | −21.609 | (ASP) | 1.401 | Plastic | 1.544 | 55.9 | 2.14 | |
| 10 | | −1.129 | (ASP) | 0.030 | | | | | |
| 11 | Lens 5 | −3.831 | (ASP) | 0.441 | Plastic | 1.662 | 20.0 | 3.71 | |
| 12 | | −1.565 | (ASP) | 0.202 | | | | | |
| 13 | Lens 6 | −3.816 | −3.816 (FFS) | 0.360 | Plastic | 1.669 | 19.4 | −1.39 | −1.39 |
| 14 | | 1.282 | 1.282 (FFS) | 0.650 | | | | | |
| 15 | Filter | | Plano | 0.210 | Glass | 1.517 | 64.2 | — | |
| 16 | | | Plano | 0.346 | | | | | |
| 17 | Image | | Plano | — | | | | | |

Note:
Reference wavelength is 587.6 nm (d-line).
An effective radius of the stop 401 (Surface 6) is 1.007 mm.

TABLE 11

Aspheric Coefficients

| Surface # | 1 | 2 | 4 | 5 | 7 |
|---|---|---|---|---|---|
| k = | −7.5936E+01 | 2.0747E+00 | −7.7563E+00 | −2.7468E+00 | 7.7768E+00 |
| A4 = | 3.2416E−01 | 4.3577E−01 | 2.6477E−02 | 7.0402E−02 | −2.0247E−01 |
| A6 = | −3.2100E−01 | −2.1781E−01 | 4.5355E−02 | −5.5707E−01 | 2.7835E−01 |
| A8 = | 3.8881E−01 | 2.9385E−01 | −6.1140E−01 | 1.4560E+00 | −5.5958E−01 |

TABLE 11-continued

| Aspheric Coefficients | | | | | |
|---|---|---|---|---|---|
| A10 = | −3.6731E−01 | −2.5527E−01 | 2.5146E+00 | −3.0300E+00 | 6.1291E−01 |
| A12 = | 2.2400E−01 | 1.3405E+00 | −5.9830E+00 | 3.8225E+00 | −4.0873E−01 |
| A14 = | −8.8974E−02 | −2.4330E+00 | 7.1774E+00 | −2.6234E+00 | 1.2187E−01 |
| A16 = | 1.6408E−02 | 1.3752E+00 | −3.4760E+00 | 7.3363E−01 | — |

| Surface # | 8 | 9 | 10 | 11 | 12 |
|---|---|---|---|---|---|
| k = | −1.1919E+01 | 9.5281E+01 | −1.0627E+00 | −2.8473E+01 | −1.0602E+01 |
| A4 = | 7.2759E−03 | 9.1526E−03 | 2.9574E−01 | 6.3343E−02 | −7.4620E−02 |
| A6 = | 1.3182E−02 | 3.7866E−02 | −5.6117E−01 | −1.6314E−01 | 2.3441E−01 |
| A8 = | −4.8514E−02 | −1.5585E−01 | 7.7417E−01 | 3.3157E−01 | −2.1255E−01 |
| A10 = | 4.0438E−02 | 3.4113E−01 | −7.8098E−01 | −4.0376E−01 | 1.0431E−01 |
| A12 = | −1.7169E−02 | −4.3983E−01 | 5.4073E−01 | 2.8131E−01 | −3.1947E−02 |
| A14 = | 3.6461E−03 | 3.4842E−01 | −2.4602E−01 | −1.1882E−01 | 6.3006E−03 |
| A16 = | — | −1.6577E−01 | 6.9637E−02 | 2.9854E−02 | −7.7729E−04 |
| A18 = | — | 4.3405E−02 | −1.0978E−02 | −4.0564E−03 | 5.4435E−05 |
| A20 = | — | −4.8128E−03 | 7.2855E−04 | 2.2771E−04 | −1.6474E−06 |

TABLE 12

| Freeform Coefficients | | | | | |
|---|---|---|---|---|---|
| Surface # | 13 | 14 | Surface # | 13 | 14 |
| kx = | −9.9000E+01 | −1.0076E+00 | ky = | −9.7283E+01 | −1.0140E+00 |
| Ax4 = | 2.2734E−02 | −2.6218E−01 | Ay4 = | 2.1384E−02 | −2.6430E−01 |
| Ax6 = | −9.8028E−02 | 1.3058E−01 | Ay6 = | −9.7732E−02 | 1.3116E−01 |
| Ax8 = | 8.1024E−02 | −4.9863E−02 | Ay8 = | 8.1154E−02 | −4.9894E−02 |
| Ax10 = | −3.3260E−02 | 1.3572E−02 | Ay10 = | −3.3263E−02 | 1.3578E−02 |
| Ax12 = | 8.0359E−03 | −2.5448E−03 | Ay12 = | 8.0350E−03 | −2.5443E−03 |
| Ax14 = | −1.1949E−03 | 3.1680E−04 | Ay14 = | −1.1949E−03 | 3.1683E−04 |
| Ax16 = | 1.0766E−04 | −2.4774E−05 | Ay16 = | 1.0765E−04 | −2.4775E−05 |
| Ax18 = | −5.3973E−06 | 1.0952E−06 | Ay18 = | −5.3973E−06 | 1.0949E−06 |
| Ax20 = | 1.1560E−07 | −2.0795E−08 | Ay20 = | 1.1564E−07 | −2.0858E−08 |

In the 4th embodiment, the equations of the freeform surface profiles and the axisymmetric aspheric surface profiles of the aforementioned lens elements are the same as the equations of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 10, Table 11 and Table 12 as the following values and satisfy the following conditions:

| 4th Embodiment | |
|---|---|
| fD [mm] | 2.71 |
| fX [mm] | 2.71 |
| fY [mm] | 2.71 |
| Fno | 2.23 |
| HFOVD [deg.] | 54.4 |
| HFOVX [deg.] | 50.5 |
| HFOVY [deg.] | 33.9 |
| ImgHD [mm] | 3.71 |
| ImgHX [mm] | 3.23 |
| ImgHY [mm] | 1.82 |
| V5 + V6 | 39.4 |
| ΣCT/ΣAT | 2.70 |
| CT1/CT3 | 0.85 |
| CT1/CT4 | 0.16 |
| CT2/CT4 | 0.62 |
| CT5/ΣAT | 0.33 |
| CT5/CT3 | 1.63 |
| CT6/CT4 | 0.26 |
| T34/CT4 | 0.34 |

-continued

| 4th Embodiment | |
|---|---|
| TD/BL | 4.05 |
| TL [mm] | 6.09 |
| TL/EPD | 5.01 |
| TL/f | 2.25 |
| TL/ImgH | 1.64 |
| R6/R7 | −0.07 |
| R9/R10 | 2.45 |
| f/CT5 | 6.15 |
| f/f1234 | 1.43 |
| f/f34 | 1.01 |
| f/f56 | −1.11 |
| f4/CT4 | 1.53 |
| HFOV [deg.] | 54.4 |
| |ΔSAGmax| [um] | 1.96; 6.55 |

5th Embodiment

Figure 17:
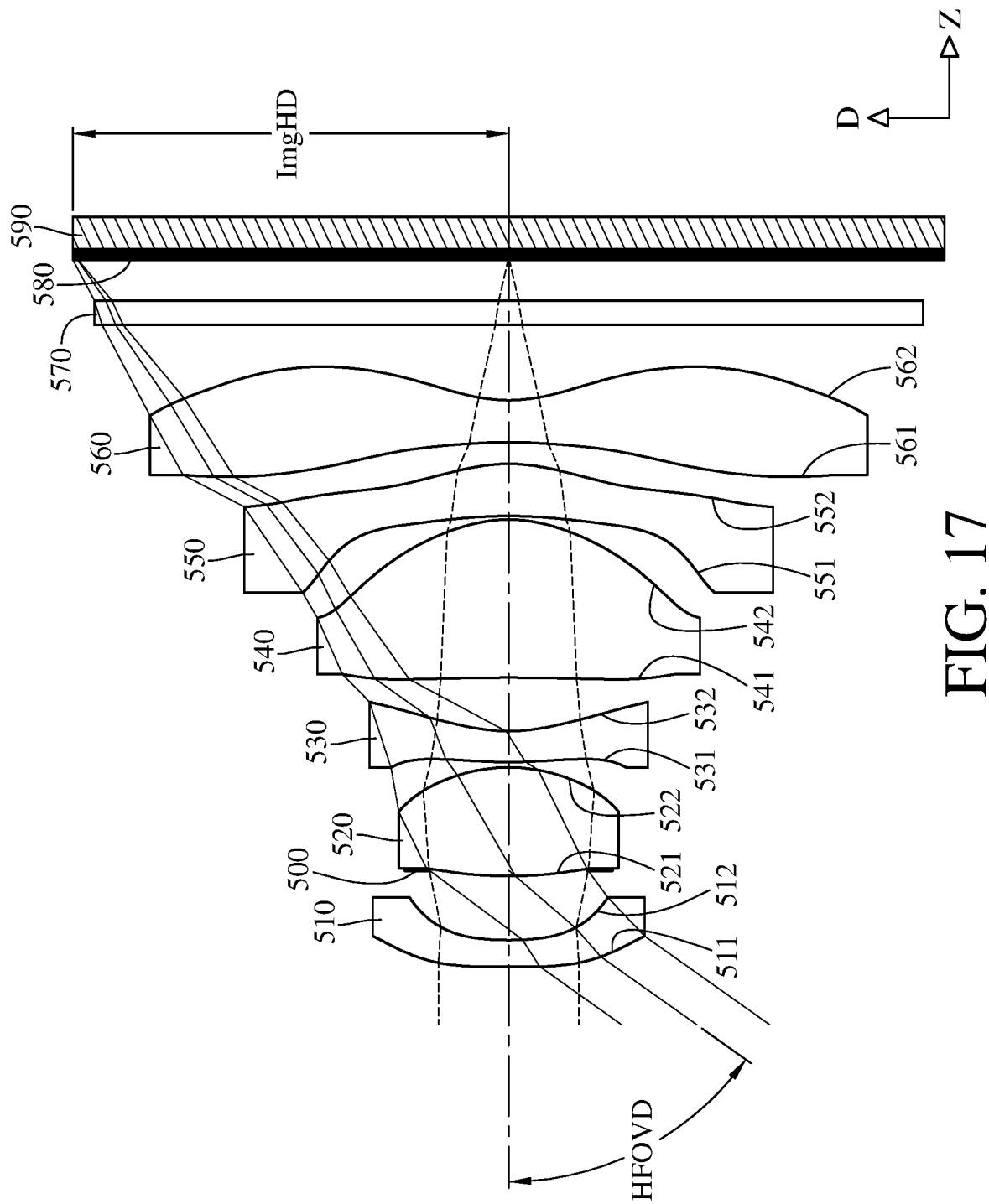
FIG. 17 is a cross-sectional view of an image capturing unit corresponding to a diagonal direction of a photosensitive area of an image sensor according to the 5th embodiment of the present disclosure.
Figure 18:
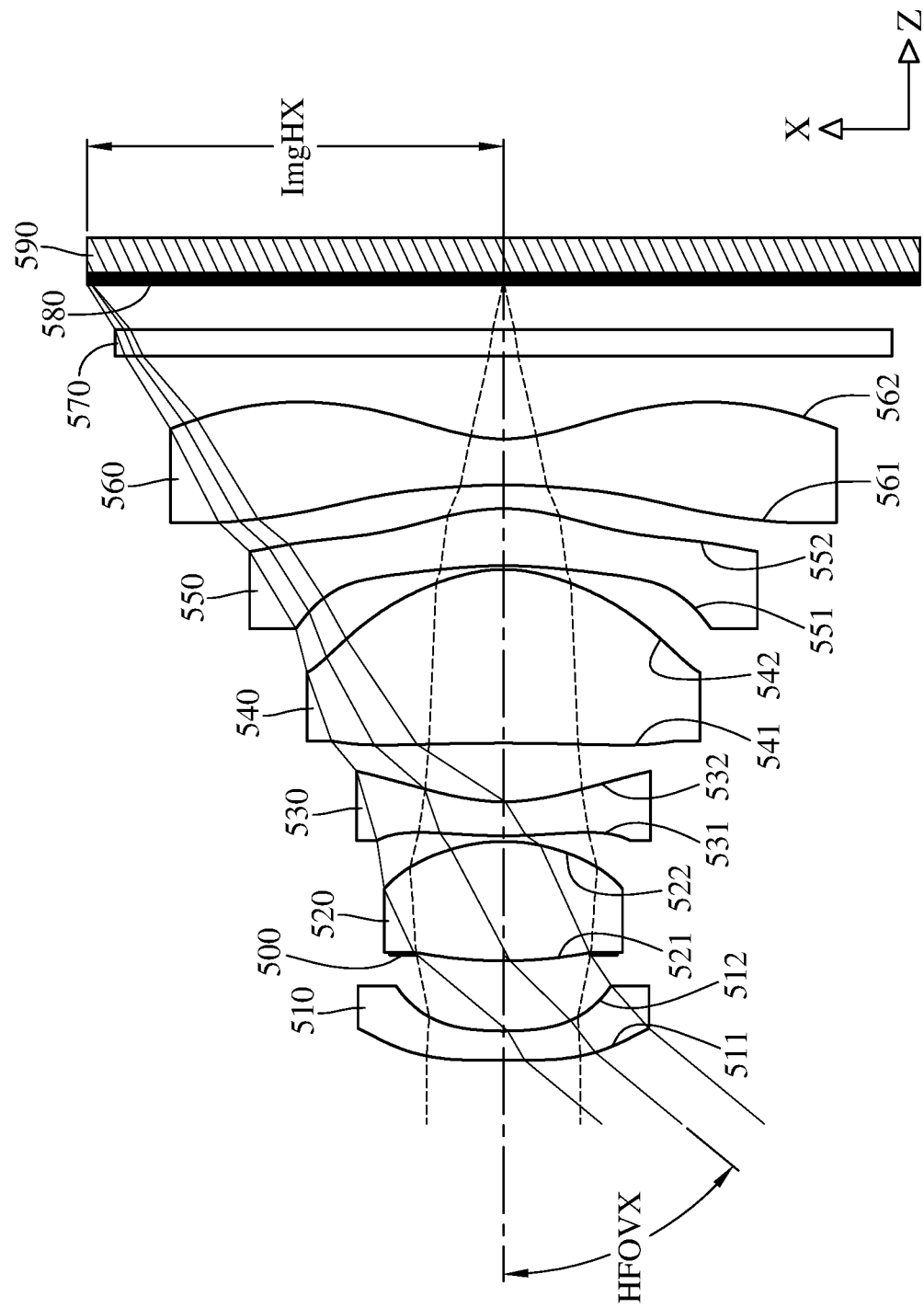
FIG. 18 is a cross-sectional view of the image capturing unit corresponding to a length direction of the photosensitive area of the image sensor according to the 5th embodiment of the present disclosure.
Figure 19:
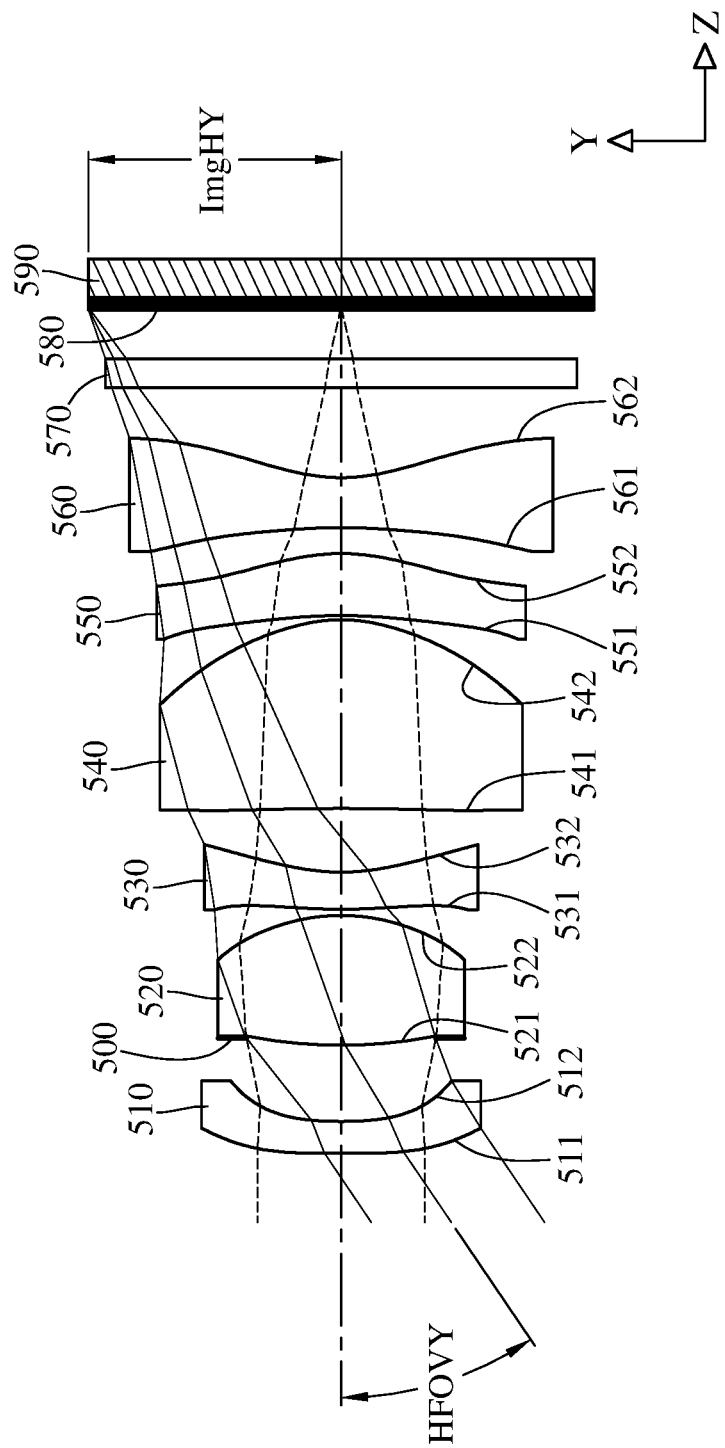
FIG. 19 is a cross-sectional view of the image capturing unit corresponding to a width direction of the photosensitive area of the image sensor according to the 5th embodiment of the present disclosure.
Figure 20:
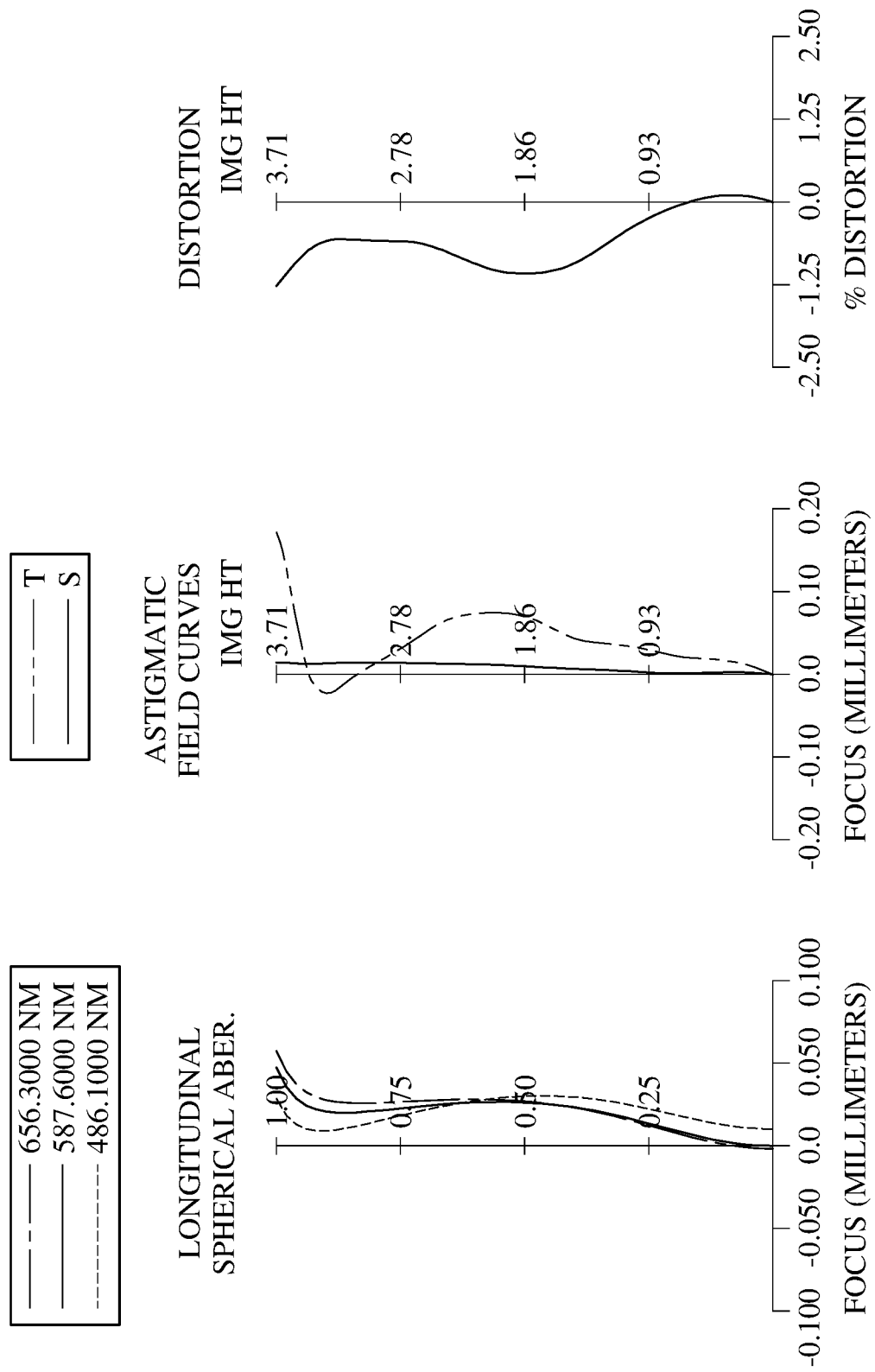
FIG. 20 shows spherical aberration curves, astigmatic field curves and a distortion curve of the image capturing unit according to the 5th embodiment.

FIG. 17 is a cross-sectional view of an image capturing unit corresponding to a diagonal direction of a photosensitive area of an image sensor according to the 5th embodiment of the present disclosure. FIG. 18 is a cross-sectional view of the image capturing unit corresponding to a length direction of the photosensitive area of the image sensor according to the 5th embodiment of the present disclosure. FIG. 19 is a cross-sectional view of the image capturing unit corresponding to a width direction of the photosensitive area of the image sensor according to the 5th embodiment of the present disclosure. FIG. 20 shows, in order from left to right, spherical aberration curves, astigmatic field curves and a distortion curve of the image capturing unit according to the 5th embodiment. In FIG. 17 to FIG. 19, the image capturing unit includes the imaging optical system (its reference numeral is omitted) of the present disclosure and an image sensor 590. The imaging optical system includes, in order from an object side to an image side, a first lens element 510, an aperture stop 500, a second lens element 520, a third lens element 530, a fourth lens element 540, a fifth lens element 550, a sixth lens element 560, a filter 570 and an image surface 580. The imaging optical system includes six lens elements (510, 520, 530, 540, 550 and 560) with no additional lens element disposed between each of the adjacent six lens elements.

The first lens element 510 with negative refractive power has an object-side surface 511 being concave in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has two inflection points.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has one inflection point.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has one inflection point. The image-side surface 532 of the third lens element 530 has two inflection points.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has two inflection points. The image-side surface 542 of the fourth lens element 540 has one inflection point.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has one inflection point. The image-side surface 552 of the fifth lens element 550 has three inflection points.

The sixth lens element 560 with negative refractive power has an object-side surface 561 being concave in a paraxial region thereof and an image-side surface 562 being concave in a paraxial region thereof. The sixth lens element 560 is made of plastic material and has both the object-side surface 561 and the image-side surface 562 being freeform surfaces. The object-side surface 561 of the sixth lens element 560 has two inflection points. The image-side surface 562 of the sixth lens element 560 has one inflection point. The object-side surface 561 of the sixth lens element 560 has one critical point in an off-axis region thereof. The image-side surface 562 of the sixth lens element 560 has one critical point in an off-axis region thereof.

The filter 570 is made of glass material and located between the sixth lens element 560 and the image surface 580, and will not affect the focal length of the imaging optical system. The image sensor 590 is disposed on or near the image surface 580 of the imaging optical system.

The abovementioned inflection points and critical points of the lens elements refer to the inflection points and critical points on the lens surfaces in a maximum image height direction.

In this embodiment, the first lens element 510, the second lens element 520, the third lens element 530, the fourth lens element 540 and the fifth lens element 550 are axisymmetric, each of the object-side surfaces 511, 521, 531, 541 and 551 and the image-side surfaces 532, 542 and 552 has at least one inflection point in the maximum image height direction, the object-side surface 561 of the sixth lens element 560 has at least one critical point in the off-axis region thereof and in the maximum image height direction, and the image-side surface 562 of the sixth lens element 560 has at least one critical point in the off-axis region thereof and in the maximum image height direction. In this embodiment, the maximum image height direction corresponds to a diagonal direction D of a photosensitive area of the image sensor 590.

In this embodiment, the object-side surface 561 of the sixth lens element 560 satisfies the following condition: |ΔSAGmax|=0.33 [um], and the image-side surface 562 of the sixth lens element 560 satisfies the following condition: |ΔSAGmax|=1.44 [um].

The detailed optical data of the 5th embodiment are shown in Table 13, the aspheric surface data are shown in Table 14 and the freeform surface data are shown in Table 15 below.

TABLE 13

5th Embodiment
fD = 2.70 mm, fX = 2.70 mm, fY = 2.70 mm, Fno = 2.23
HFOVD = 54.6 deg., HFOVX = 50.4 deg., HFOVY = 34.1 deg.
ImgHD = 3.71 mm, ImgHX = 3.23 mm, ImgHY = 1.82 mm

| | | Curvature Radius | | | | | | Focal Length | |
|---|---|---|---|---|---|---|---|---|---|
| Surface # | | (Y-dir.) | (X-dir.) | | Thickness | Material | Index | Abbe # | (Y-dir.) | (X-dir.) |
| 0 | Object | | Plano | | Infinity | | | | | |
| 1 | Lens 1 | −100.000 | | (ASP) | 0.230 | Plastic | 1.545 | 56.1 | −5.26 | |
| 2 | | 2.951 | | (ASP) | 0.601 | | | | | |
| 3 | Ape. Stop | | Plano | | −0.050 | | | | | |
| 4 | Lens 2 | 3.665 | | (ASP) | 0.937 | Plastic | 1.544 | 56.0 | 1.92 | |
| 5 | | −1.326 | | (ASP) | 0.045 | | | | | |

TABLE 13-continued

5th Embodiment
fD = 2.70 mm, fX = 2.70 mm, fY = 2.70 mm, Fno = 2.23
HFOVD = 54.6 deg., HFOVX = 50.4 deg., HFOVY = 34.1 deg.
ImgHD = 3.71 mm, ImgHX = 3.23 mm, ImgHY = 1.82 mm

| Surface # | | Curvature Radius (Y-dir.) | (X-dir.) | | Thickness | Material | Index | Abbe # | Focal Length (Y-dir.) | (X-dir.) |
|---|---|---|---|---|---|---|---|---|---|---|
| 6 | Lens 3 | 3.961 | | (ASP) | 0.267 | Plastic | 1.614 | 26.0 | −3.83 | |
| 7 | | 1.438 | | (ASP) | 0.461 | | | | | |
| 8 | Lens 4 | −16.355 | | (ASP) | 1.363 | Plastic | 1.544 | 56.0 | 2.13 | |
| 9 | | −1.115 | | (ASP) | 0.030 | | | | | |
| 10 | Lens 5 | −3.483 | | (ASP) | 0.448 | Plastic | 1.660 | 20.4 | 3.46 | |
| 11 | | −1.449 | | (ASP) | 0.188 | | | | | |
| 12 | Lens 6 | −3.509 | −3.509 | (FFS) | 0.360 | Plastic | 1.669 | 19.5 | −1.36 | −1.36 |
| 13 | | 1.276 | 1.276 | (FFS) | 0.650 | | | | | |
| 14 | Filter | | | Plano | 0.210 | Glass | 1.517 | 64.2 | — | |
| 15 | | | | Plano | 0.352 | | | | | |
| 16 | Image | | | Plano | — | | | | | |

Note:
Reference wavelength is 587.6 nm (d-line).

TABLE 14

| Aspheric Coefficients | | | | | |
|---|---|---|---|---|---|
| Surface # | 1 | 2 | 4 | 5 | 6 |
| k = | 0.0000E+00 | 3.4005E+00 | −5.3341E+00 | −2.5719E+00 | 4.3820E+00 |
| A4 = | 3.7257E−01 | 5.0942E−01 | 3.8749E−02 | 4.4129E−02 | −2.2731E−01 |
| A6 = | −3.9643E−01 | −3.2219E−01 | 4.1321E−02 | −4.0146E−01 | 3.2610E−01 |
| A8 = | 3.8537E−01 | 1.7930E−01 | −8.0017E−01 | 9.1591E−01 | −5.9981E−01 |
| A10 = | −2.0921E−01 | 5.6645E−01 | 3.6944E+00 | −1.8435E+00 | 5.3413E−01 |
| A12 = | −2.5866E−02 | −3.0309E−01 | −9.5018E+00 | 2.1435E+00 | −2.6593E−01 |
| A14 = | 9.5124E−02 | −1.0444E+00 | 1.2483E+01 | −1.2538E+00 | 5.2367E−02 |
| A16 = | −4.6759E−02 | 9.6550E−01 | −6.8420E+00 | 2.4593E−01 | — |
| A18 = | 7.7662E−03 | — | — | — | — |
| Surface # | 7 | 8 | 9 | 10 | 11 |
| k = | −9.5213E+00 | −3.6679E+01 | −1.0693E+00 | −2.3070E+01 | −9.6908E+00 |
| A4 = | −3.8308E−02 | 1.8073E−02 | 3.3201E−01 | 8.0779E−02 | −8.2601E−02 |
| A6 = | 1.2513E−01 | −1.5923E−02 | −6.5936E−01 | −2.2443E−01 | 2.2754E−01 |
| A8 = | −2.0569E−01 | −4.3349E−03 | 9.3164E−01 | 4.0696E−01 | −1.9869E−01 |
| A10 = | 1.6350E−01 | 7.7891E−02 | −9.6779E−01 | −4.5115E−01 | 9.7765E−02 |
| A12 = | −6.5974E−02 | −1.3842E−01 | 6.9681E−01 | 2.9445E−01 | −3.0929E−02 |
| A14 = | 1.1089E−02 | 1.2948E−01 | −3.3198E−01 | −1.1666E−01 | 6.4300E−03 |
| A16 = | — | −6.9630E−02 | 9.8917E−02 | 2.7165E−02 | −8.4699E−04 |
| A18 = | — | 2.0162E−02 | −1.6492E−02 | −3.3409E−03 | 6.3904E−05 |
| A20 = | — | −2.4372E−03 | 1.1625E−03 | 1.6294E−04 | −2.0996E−06 |

TABLE 15

| Freeform Coefficients | | | | | |
|---|---|---|---|---|---|
| Surface # | 12 | 13 | Surface # | 12 | 13 |
| kx = | −9.8879E+01 | −1.0185E+00 | ky = | −9.5695E+01 | −1.0188E+00 |
| Ax4 = | 2.4125E−02 | −2.6278E−01 | Ay4 = | 2.4530E−02 | −2.6364E−01 |
| Ax6 = | −9.8085E−02 | 1.3070E−01 | Ay6 = | −9.8245E−02 | 1.3097E−01 |
| Ax8 = | 8.1023E−02 | −4.9849E−02 | Ay8 = | 8.1081E−02 | −4.9853E−02 |
| Ax10 = | −3.3261E−02 | 1.3573E−02 | Ay10 = | −3.3264E−02 | 1.3573E−02 |
| Ax12 = | 8.0359E−03 | −2.5448E−03 | Ay12 = | 8.0354E−03 | −2.5449E−03 |
| Ax14 = | −1.1948E−03 | 3.1680E−04 | Ay14 = | −1.1949E−03 | 3.1679E−04 |
| Ax16 = | 1.0766E−04 | −2.4775E−05 | Ay16 = | 1.0766E−04 | −2.4776E−05 |
| Ax18 = | −5.3973E−06 | 1.0951E−06 | Ay18 = | −5.3972E−06 | 1.0952E−06 |
| Ax20 = | 1.1559E−07 | −2.0796E−08 | Ay20 = | 1.1562E−07 | −2.0788E−08 |

In the 5th embodiment, the equations of the freeform surface profiles and the axisymmetric aspheric surface profiles of the aforementioned lens elements are the same as the equations of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 13, Table 14 and Table 15 as the following values and satisfy the following conditions:

| 5th Embodiment | |
|---|---|
| fD [mm] | 2.70 |
| fX [mm] | 2.70 |
| fY [mm] | 2.70 |
| Fno | 2.23 |
| HFOVD [deg.] | 54.6 |
| HFOVX [deg.] | 50.4 |
| HFOVY [deg.] | 34.1 |
| ImgHD [mm] | 3.71 |
| ImgHX [mm] | 3.23 |
| ImgHY [mm] | 1.82 |
| V5 + V6 | 39.9 |
| ΣCT/ΣAT | 2.83 |
| CT1/CT3 | 0.86 |
| CT1/CT4 | 0.17 |
| CT2/CT4 | 0.69 |
| CT5/ΣAT | 0.35 |
| CT5/CT3 | 1.68 |
| CT6/CT4 | 0.26 |
| T34/CT4 | 0.34 |
| TD/BL | 4.03 |
| TL [mm] | 6.09 |
| TL/EPD | 5.04 |
| TL/f | 2.26 |
| TL/ImgH | 1.64 |
| R6/R7 | −0.09 |
| R9/R10 | 2.40 |
| f/CT5 | 6.02 |
| f/f1234 | 1.44 |
| f/f34 | 0.98 |
| f/f56 | −1.11 |
| f4/CT4 | 1.56 |
| HFOV [deg.] | 54.6 |
| |ΔSAGmax| [um] | 0.33; 1.44 |

6th Embodiment

Figure 21:
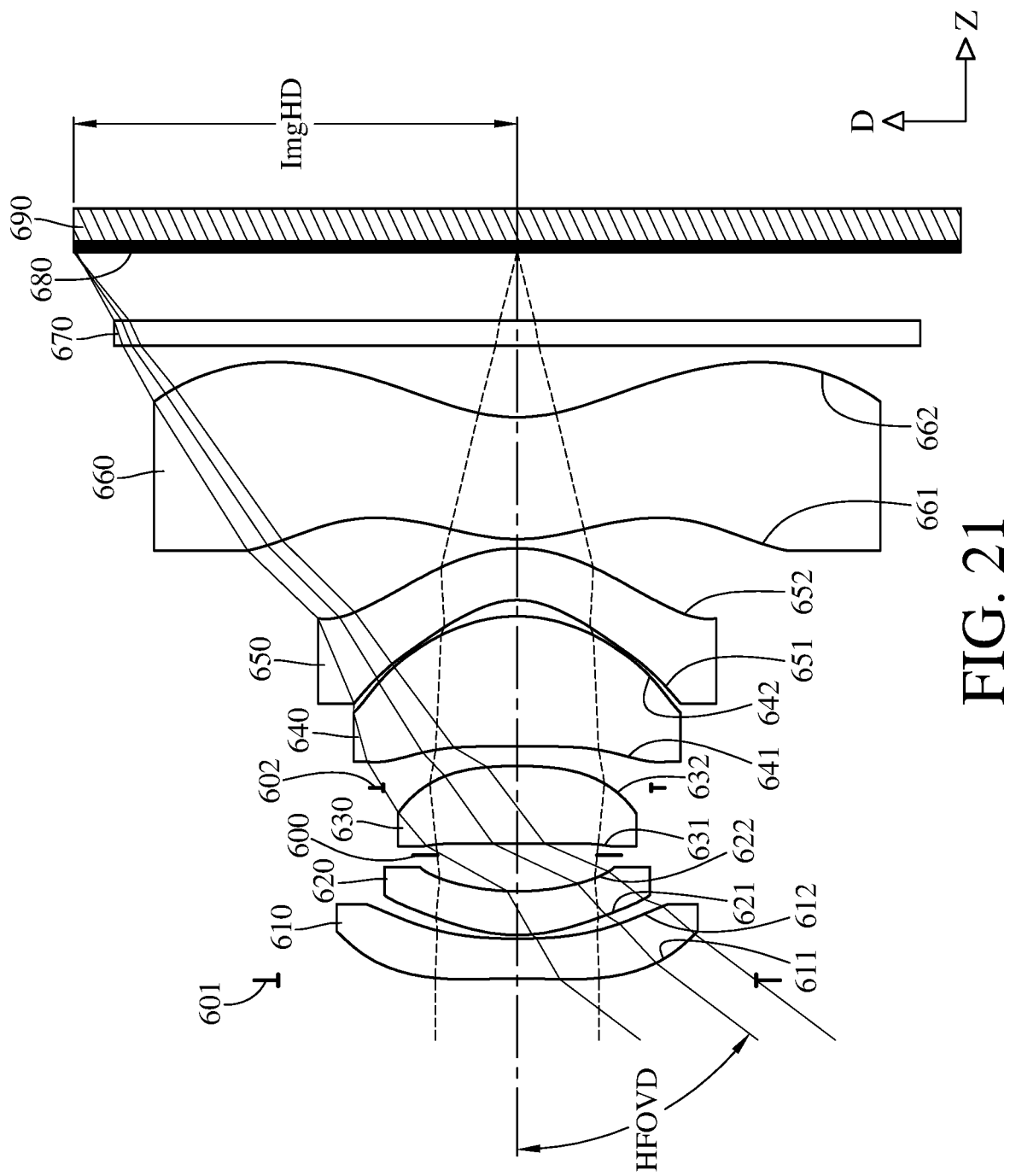
FIG. 21 is a cross-sectional view of an image capturing unit corresponding to a diagonal direction of a photosensitive area of an image sensor according to the 6th embodiment of the present disclosure.
Figure 22:
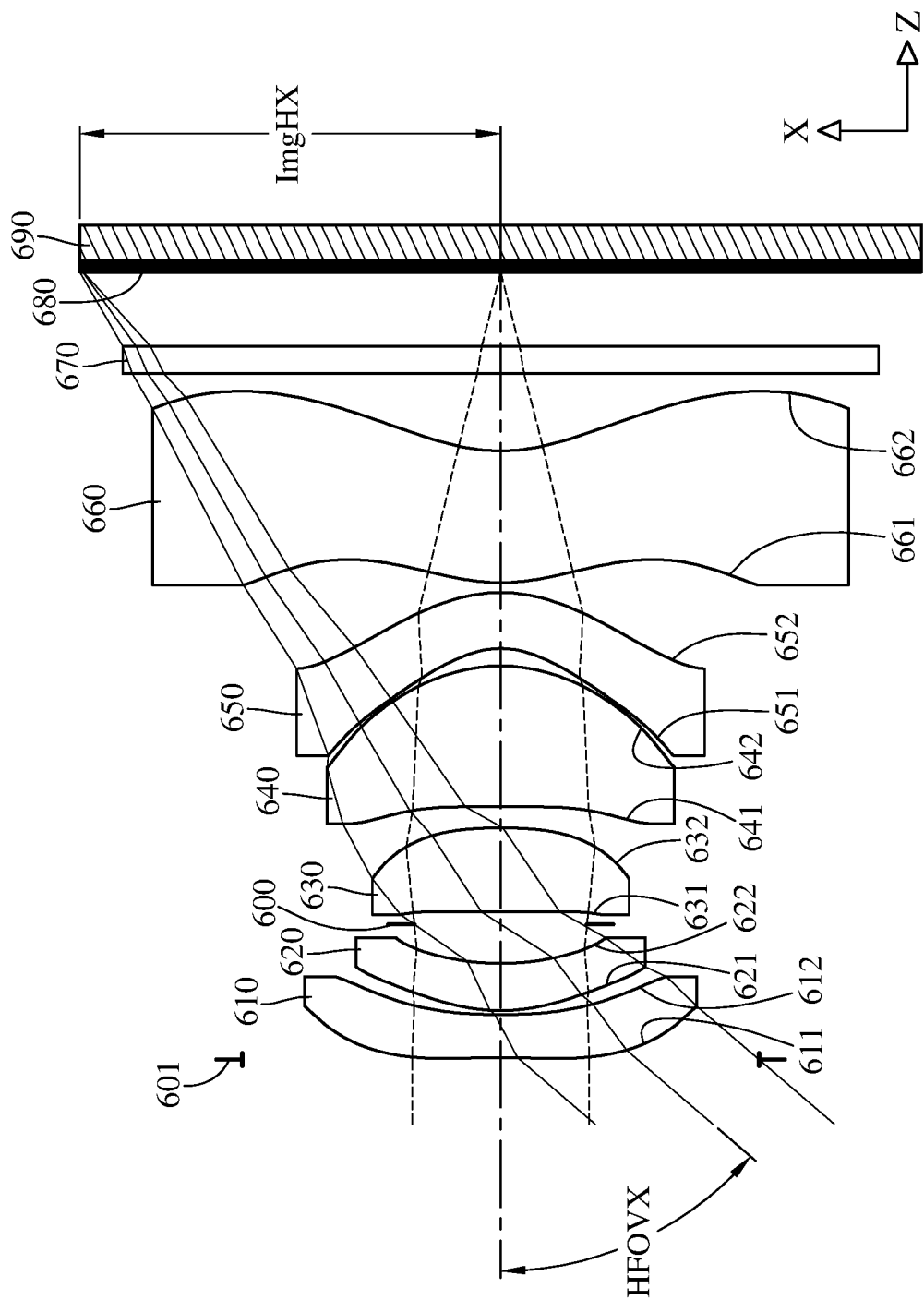
FIG. 22 is a cross-sectional view of the image capturing unit corresponding to a length direction of the photosensitive area of the image sensor according to the 6th embodiment of the present disclosure.
Figure 23:
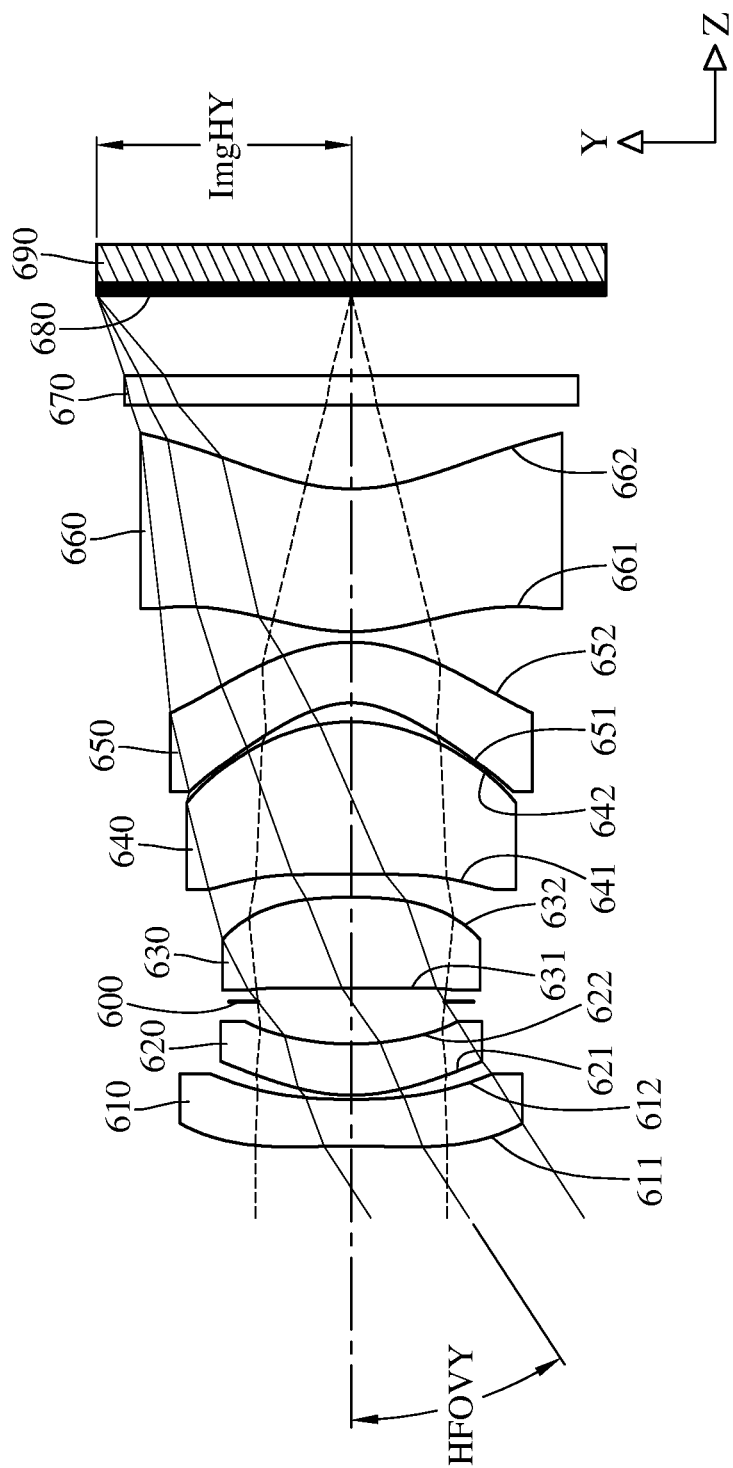
FIG. 23 is a cross-sectional view of the image capturing unit corresponding to a width direction of the photosensitive area of the image sensor according to the 6th embodiment of the present disclosure.
Figure 24:
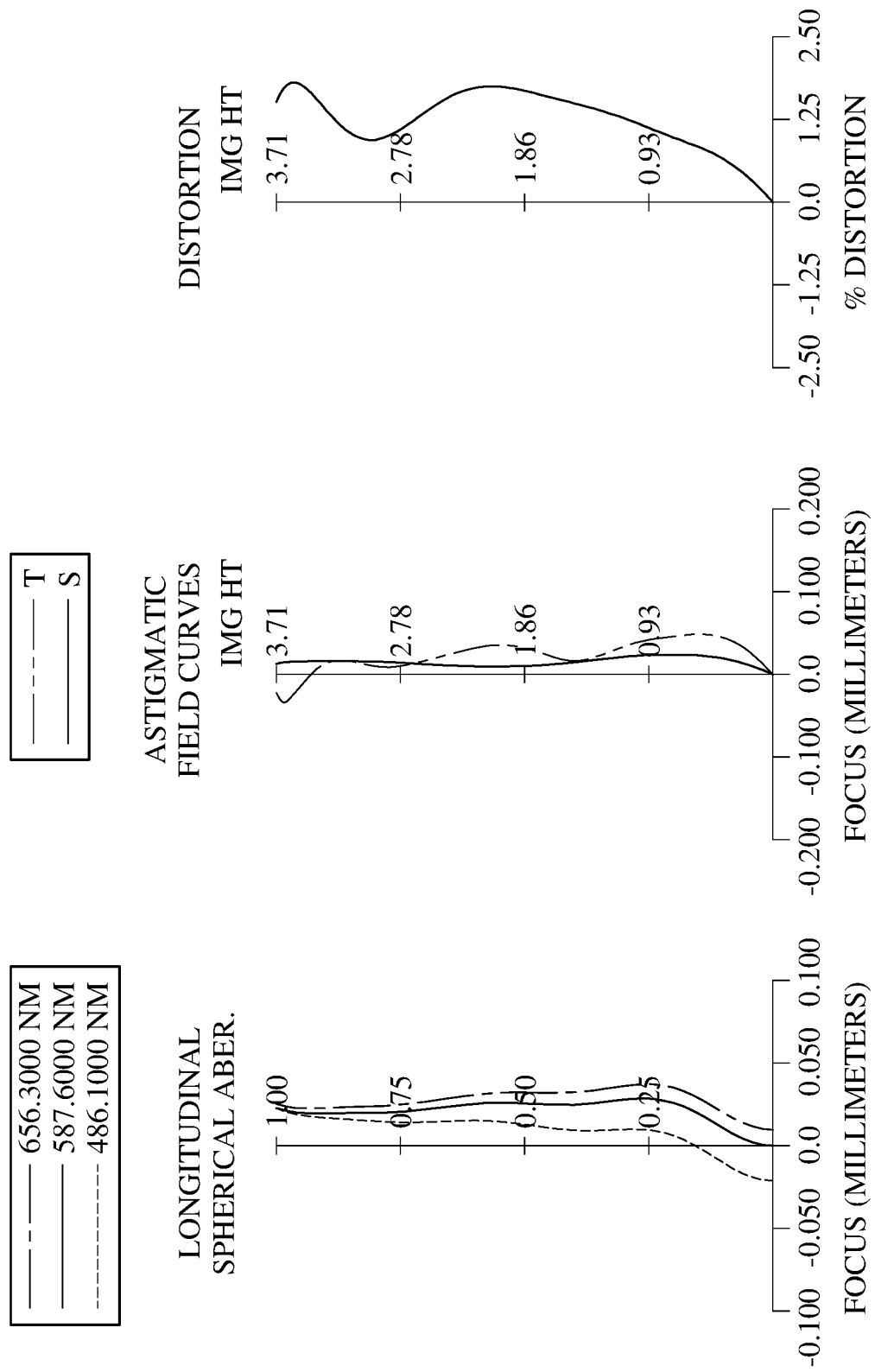
FIG. 24 shows spherical aberration curves, astigmatic field curves and a distortion curve of the image capturing unit according to the 6th embodiment.

FIG. 21 is a cross-sectional view of an image capturing unit corresponding to a diagonal direction of a photosensitive area of an image sensor according to the 6th embodiment of the present disclosure. FIG. 22 is a cross-sectional view of the image capturing unit corresponding to a length direction of the photosensitive area of the image sensor according to the 6th embodiment of the present disclosure. FIG. 23 is a cross-sectional view of the image capturing unit corresponding to a width direction of the photosensitive area of the image sensor according to the 6th embodiment of the present disclosure. FIG. 24 shows, in order from left to right, spherical aberration curves, astigmatic field curves and a distortion curve of the image capturing unit according to the 6th embodiment. In FIG. 21 to FIG. 23, the image capturing unit includes the imaging optical system (its reference numeral is omitted) of the present disclosure and an image sensor 690. The imaging optical system includes, in order from an object side to an image side, a stop 601, a first lens element 610, a second lens element 620, an aperture stop 600, a third lens element 630, a stop 602, a fourth lens element 640, a fifth lens element 650, a sixth lens element 660, a filter 670 and an image surface 680. The imaging optical system includes six lens elements (610, 620, 630, 640, 650 and 660) with no additional lens element disposed between each of the adjacent six lens elements.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has two inflection points. The image-side surface 612 of the first lens element 610 has one inflection point.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has two inflection points. The image-side surface 642 of the fourth lens element 640 has one inflection point.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has one inflection point.

The sixth lens element 660 with positive refractive power has an object-side surface 661 being convex in a paraxial region thereof and an image-side surface 662 being concave in a paraxial region thereof. The sixth lens element 660 is made of plastic material and has both the object-side surface 661 and the image-side surface 662 being freeform surfaces. The object-side surface 661 of the sixth lens element 660 has two inflection points. The image-side surface 662 of the sixth lens element 660 has one inflection point. The object-side surface 661 of the sixth lens element 660 has one critical point in an off-axis region thereof. The image-side surface 662 of the sixth lens element 660 has one critical point in an off-axis region thereof.

The filter 670 is made of glass material and located between the sixth lens element 660 and the image surface 680, and will not affect the focal length of the imaging optical system. The image sensor 690 is disposed on or near the image surface 680 of the imaging optical system.

The abovementioned inflection points and critical points of the lens elements refer to the inflection points and critical points on the lens surfaces in a maximum image height direction.

In this embodiment, the first lens element 610, the third lens element 630, the fourth lens element 640 and the fifth lens element 650 are axisymmetric, each of the object-side surfaces 611, 631 and 641 and the image-side surfaces 612, 642 and 652 has at least one inflection point in the maximum image height direction, the object-side surface 661 of the sixth lens element 660 has at least one critical point in the off-axis region thereof and in the maximum image height direction, and the image-side surface 662 of the sixth lens element 660 has at least one critical point in the off-axis region thereof and in the maximum image height direction. In this embodiment, the maximum image height direction corresponds to a diagonal direction D of a photosensitive area of the image sensor 690.

In this embodiment, the object-side surface 661 of the sixth lens element 660 satisfies the following condition: |ΔSAGmax|=0.24 [um], and the image-side surface 662 of the sixth lens element 660 satisfies the following condition: |ΔSAGmax|=2.26 [um].

The detailed optical data of the 6th embodiment are shown in Table 16, the aspheric surface data are shown in Table 17 and the freeform surface data are shown in Table 18 below.

TABLE 16

6th Embodiment
fD = 2.74 mm, fX = 2.74 mm, fY = 2.74 mm, Fno = 2.00
HFOVD = 53.0 deg., HFOVX = 49.3 deg., HFOVY = 33.0 deg.
ImgHD = 3.71 mm, ImgHX = 3.24 mm, ImgHY = 1.82 mm

| Surface # | | Curvature Radius | | | Thickness | Material | Index | Abbe # | Focal Length | |
|---|---|---|---|---|---|---|---|---|---|---|
| | | (Y-dir.) | (X-dir.) | | | | | | (Y-dir.) | (X-dir.) |
| 0 | Object | | Plano | | Infinity | | | | | |
| 1 | Stop | | Plano | | 0.016 | | | | | |
| 2 | Lens 1 | −5.407 | | (ASP) | 0.333 | Plastic | 1.584 | 28.2 | −4.76 | |
| 3 | | 5.855 | | (ASP) | 0.030 | | | | | |
| 4 | Lens 2 | 1.410 | | (ASP) | 0.366 | Plastic | 1.669 | 19.5 | 5.78 | |
| 5 | | 1.990 | | (ASP) | 0.303 | | | | | |
| 6 | Ape. Stop | | Plano | | 0.095 | | | | | |
| 7 | Lens 3 | 15.522 | | (ASP) | 0.653 | Plastic | 1.544 | 56.0 | 5.11 | |
| 8 | | −3.332 | | (ASP) | −0.184 | | | | | |
| 9 | Stop | | Plano | | 0.347 | | | | | |
| 10 | Lens 4 | 36.460 | | (ASP) | 1.092 | Plastic | 1.544 | 56.0 | 2.16 | |
| 11 | | −1.200 | | (ASP) | 0.135 | | | | | |
| 12 | Lens 5 | −0.622 | | (ASP) | 0.434 | Plastic | 1.669 | 19.5 | −3.30 | |
| 13 | | −1.107 | | (ASP) | 0.076 | | | | | |
| 14 | Lens 6 | 1.479 | 1.479 | (FFS) | 1.021 | Plastic | 1.614 | 26.0 | 11.40 | 11.40 |
| 15 | | 1.383 | 1.383 | (FFS) | 0.600 | | | | | |
| 16 | Filter | | Plano | | 0.210 | Glass | 1.517 | 64.2 | — | |
| 17 | | | Plano | | 0.574 | | | | | |
| 18 | Image | | Plano | | — | | | | | |

Note:
Reference wavelength is 587.6 nm (d-line).
An effective radius of the stop 601 (Surface 1) is 2.000 mm.
An effective radius of the stop 602 (Surface 9) is 1.122 mm.

TABLE 17

Aspheric Coefficients

| Surface # | 2 | 3 | 4 | 5 | 7 |
|---|---|---|---|---|---|
| k = | −9.6136E+01 | −2.3943E+01 | −1.1555E+00 | −1.9109E+00 | −6.9451E+01 |
| A4 = | 2.7764E−01 | 4.1704E−01 | −5.6176E−03 | 5.2735E−02 | −6.5221E−02 |
| A6 = | −4.6900E−01 | −1.6630E+00 | −5.0008E−01 | −1.6566E+00 | 4.9273E−02 |
| A8 = | 9.4697E−01 | 6.3942E+00 | −7.8191E−01 | 3.1543E+01 | −1.5724E+00 |
| A10 = | −1.7419E+00 | −1.8740E+01 | 2.3817E+01 | −3.5751E+02 | 1.2656E+01 |
| A12 = | 2.7184E+00 | 3.9681E+01 | −1.4654E+02 | 2.7042E+03 | −6.1874E+01 |
| A14 = | −3.4538E+00 | −6.0207E+01 | 5.1700E+02 | −1.4201E+04 | 1.9187E+02 |
| A16 = | 3.4872E+00 | 6.5624E+01 | −1.2074E+03 | 5.2828E+04 | −3.8650E+02 |
| A18 = | −2.7344E+00 | −5.1390E+01 | 1.9638E+03 | −1.3993E+05 | 5.0066E+02 |
| A20 = | 1.6245E+00 | 2.8637E+01 | −2.2660E+03 | 2.6143E+05 | −3.9741E+02 |
| A22 = | −7.1046E−01 | −1.1071E+01 | 1.8528E+03 | −3.3488E+05 | 1.7189E+02 |
| A24 = | 2.2002E−01 | 2.8193E+00 | −1.0514E+03 | 2.7675E+05 | −2.9492E+01 |
| A26 = | −4.5389E−02 | −4.2473E−01 | 3.9434E+02 | −1.2831E+05 | — |
| A28 = | 5.5656E−03 | 2.8634E−02 | −8.8006E+01 | 2.0267E+04 | — |
| A30 = | −3.0538E−04 | — | 8.8581E+00 | 3.7928E+03 | — |

| Surface # | 8 | 10 | 11 | 12 | 13 |
|---|---|---|---|---|---|
| k = | 3.7695E+00 | −7.2602E+01 | −5.3958E−01 | −1.0233E+00 | −9.7405E−01 |
| A4 = | −1.5595E−01 | −1.6051E−01 | 1.9318E−01 | 9.9167E−01 | 2.6697E−01 |
| A6 = | −1.4940E+00 | −1.4692E−01 | −3.6503E−01 | −2.5341E+00 | −6.3326E−01 |

TABLE 17-continued

Aspheric Coefficients

| | | | | | |
|---|---|---|---|---|---|
| A8 = | 1.7362E+01 | 9.1199E−01 | 5.7509E−01 | 5.9833E+00 | 1.5015E+00 |
| A10 = | −1.2616E+02 | −3.0691E+00 | −1.0483E+00 | −1.3180E+01 | −3.2771E+00 |
| A12 = | 6.1943E+02 | 6.7781E+00 | −1.6174E+00 | 2.3960E+01 | 6.1675E+00 |
| A14 = | −2.1448E+03 | −9.3297E+00 | 1.6392E+01 | −2.9827E+01 | −8.7829E+00 |
| A16 = | 5.3706E+03 | 8.2029E+00 | −4.2481E+01 | 2.1923E+01 | 9.0314E+00 |
| A18 = | −9.8402E+03 | −4.6759E+00 | 5.9887E+01 | −5.9881E+00 | −6.6732E+00 |
| A20 = | 1.3194E+04 | 1.7131E+00 | −5.3000E+01 | −4.4513E+00 | 3.5436E+00 |
| A22 = | −1.2792E+04 | −3.8723E−01 | 3.0878E+01 | 5.4703E+00 | −1.3410E+00 |
| A24 = | 8.7203E+03 | 4.8899E−02 | −1.1884E+01 | −2.6814E+00 | 3.5305E−01 |
| A26 = | −3.9590E+03 | −2.6270E−03 | 2.9164E+00 | 7.2495E−01 | −6.1483E−02 |
| A28 = | 1.0728E+03 | — | −4.1415E−01 | −1.0582E−01 | 6.3695E−03 |
| A30 = | −1.3100E+02 | — | 2.5918E−02 | 6.5297E−03 | −2.9734E−04 |

TABLE 18

Freeform Coefficients

| Surface # | 14 | 15 | Surface # | 14 | 15 |
|---|---|---|---|---|---|
| kx = | −7.7750E−01 | −1.0559E+00 | ky = | −7.5203E−01 | −1.0455E+00 |
| Ax4 = | −2.6393E−01 | −1.4493E−01 | Ay4 = | −2.6554E−01 | −1.4674E−01 |
| Ax6 = | 1.2736E−01 | 5.0180E−02 | Ay6 = | 1.2751E−01 | 5.0669E−02 |
| Ax8 = | −5.5546E−02 | −1.3979E−02 | Ay8 = | −5.5471E−02 | −1.4014E−02 |
| Ax10 = | 1.6395E−02 | 2.7808E−03 | Ay10 = | 1.6359E−02 | 2.7781E−03 |
| Ax12 = | −2.9507E−03 | −3.7707E−04 | Ay12 = | −2.9533E−03 | −3.7709E−04 |
| Ax14 = | 3.0937E−04 | 3.2785E−05 | Ay14 = | 3.1036E−04 | 3.2836E−05 |
| Ax16 = | −1.7264E−05 | −1.6286E−06 | Ay16 = | −1.7127E−05 | −1.6267E−06 |
| Ax18 = | 3.9113E−07 | 3.4571E−08 | Ay18 = | 3.6551E−07 | 3.3934E−08 |
| Ax20 = | −2.7143E−11 | 1.7547E−11 | Ay20 = | −1.5356E−10 | 3.5688E−11 |
| Ax22 = | −1.5574E−12 | 1.9551E−14 | Ay22 = | −2.1169E−11 | 3.4827E−13 |
| Ax24 = | 2.8608E−14 | −1.9836E−15 | Ay24 = | −2.1217E−13 | −2.0355E−14 |
| Ax26 = | 2.3304E−15 | −5.7314E−17 | Ay26 = | −1.0870E−13 | −2.9951E−16 |
| Ax28 = | 4.5976E−16 | 8.5659E−18 | Ay28 = | −2.8329E−14 | 1.7104E−17 |
| Ax30 = | 2.1545E−16 | 3.7561E−18 | Ay30 = | −5.9479E−15 | 2.7142E−17 |

In the 6th embodiment, the equations of the freeform surface profiles and the axisymmetric aspheric surface profiles of the aforementioned lens elements are the same as the equations of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 16, Table 17 and Table 18 as the following values and satisfy the following conditions:

| 6th Embodiment | |
|---|---|
| fD [mm] | 2.74 |
| fX [mm] | 2.74 |
| fY [mm] | 2.74 |
| Fno | 2.00 |
| HFOVD [deg.] | 53.0 |
| HFOVX [deg.] | 49.3 |
| HFOVY [deg.] | 33.0 |
| ImgHD [mm] | 3.71 |
| ImgHX [mm] | 3.24 |
| ImgHY [mm] | 1.82 |
| V5 + V6 | 45.4 |
| ΣCT/ΣAT | 4.87 |
| CT1/CT3 | 0.51 |
| CT1/CT4 | 0.30 |
| CT2/CT4 | 0.34 |
| CT5/ΣAT | 0.54 |
| CT5/CT3 | 0.67 |
| CT6/CT4 | 0.93 |
| T34/CT4 | 0.15 |
| TD/BL | 3.40 |
| TL [mm] | 6.08 |
| TL/EPD | 4.45 |
| TL/f | 2.22 |
| TL/ImgH | 1.64 |
| R6/R7 | −0.09 |
| R9/R10 | 0.56 |
| f/CT5 | 6.30 |
| f/f1234 | 1.51 |
| f/f34 | 1.57 |
| f/f56 | −0.75 |
| f4/CT4 | 1.98 |
| HFOV [deg.] | 53.0 |
| |ΔSAGmax| [um] | 0.24; 2.26 |

7th Embodiment

Figure 25:
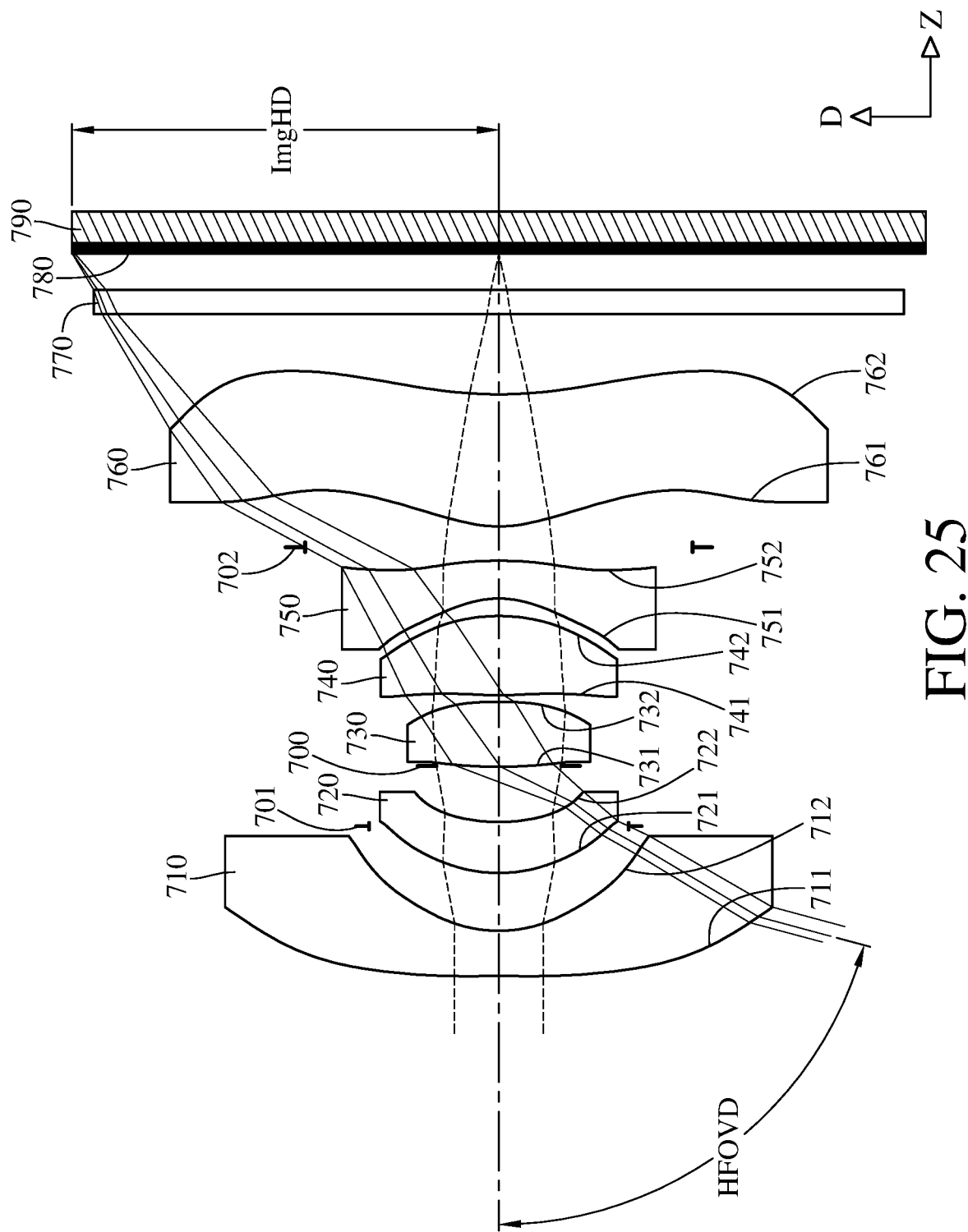
FIG. 25 is a cross-sectional view of an image capturing unit corresponding to a diagonal direction of a photosensitive area of an image sensor according to the 7th embodiment of the present disclosure.
Figure 26:
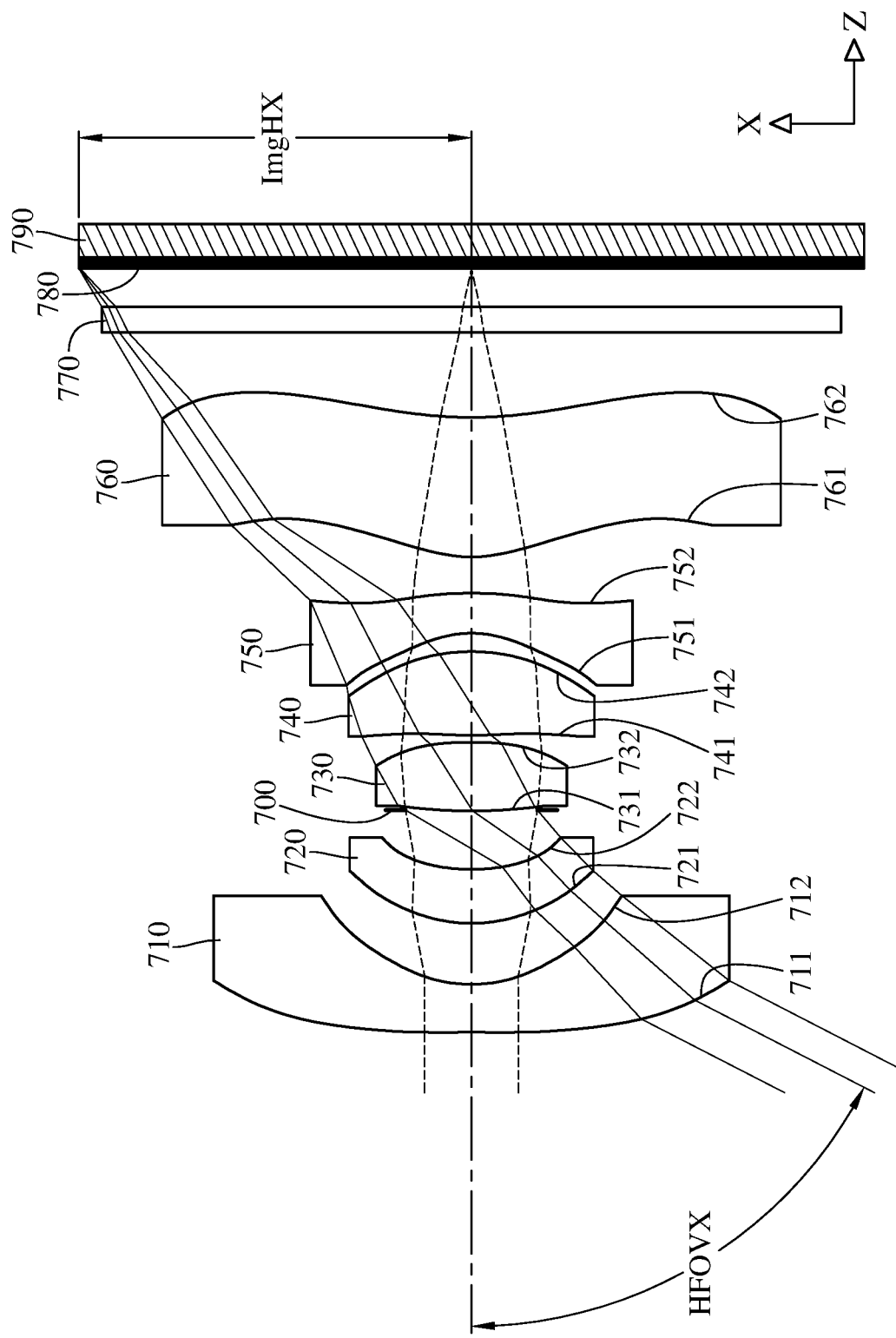
FIG. 26 is a cross-sectional view of the image capturing unit corresponding to a length direction of the photosensitive area of the image sensor according to the 7th embodiment of the present disclosure.
Figure 27:
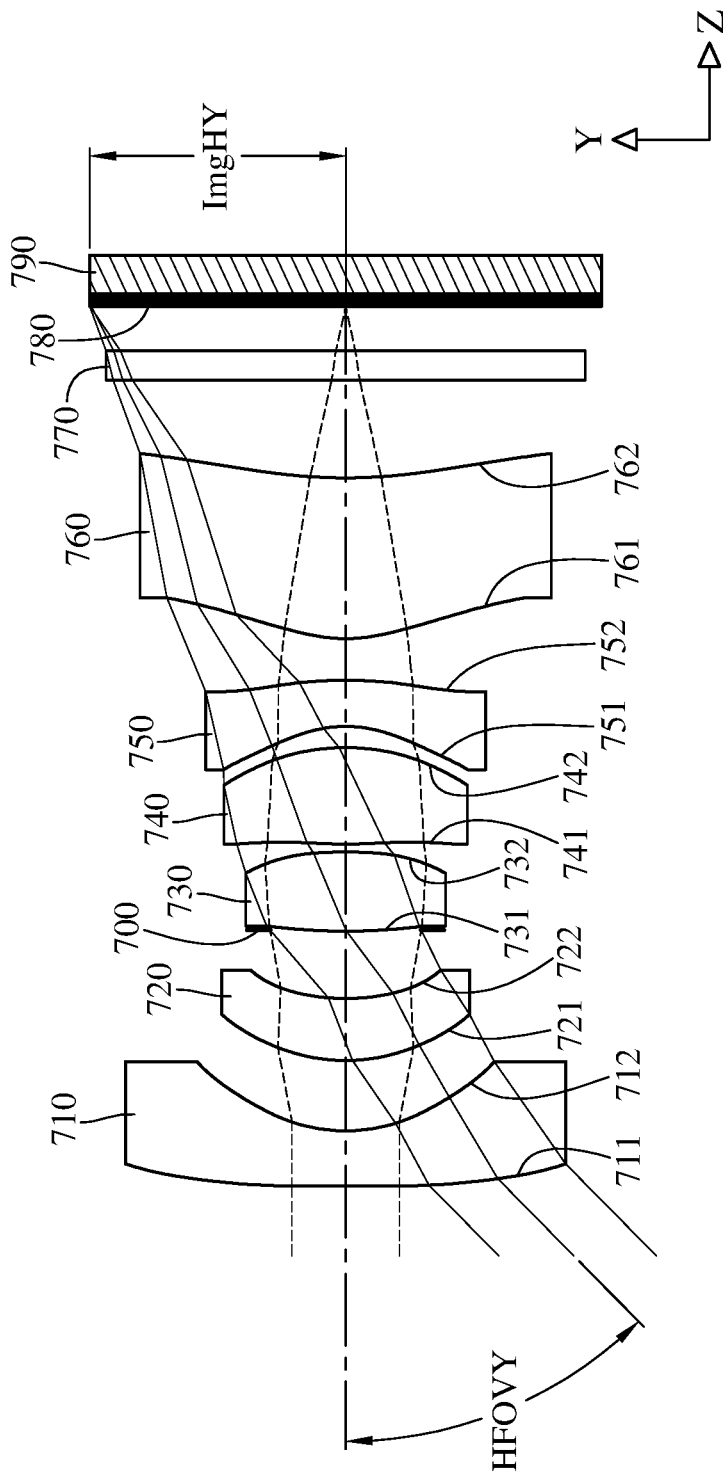
FIG. 27 is a cross-sectional view of the image capturing unit corresponding to a width direction of the photosensitive area of the image sensor according to the 7th embodiment of the present disclosure.
Figure 28:
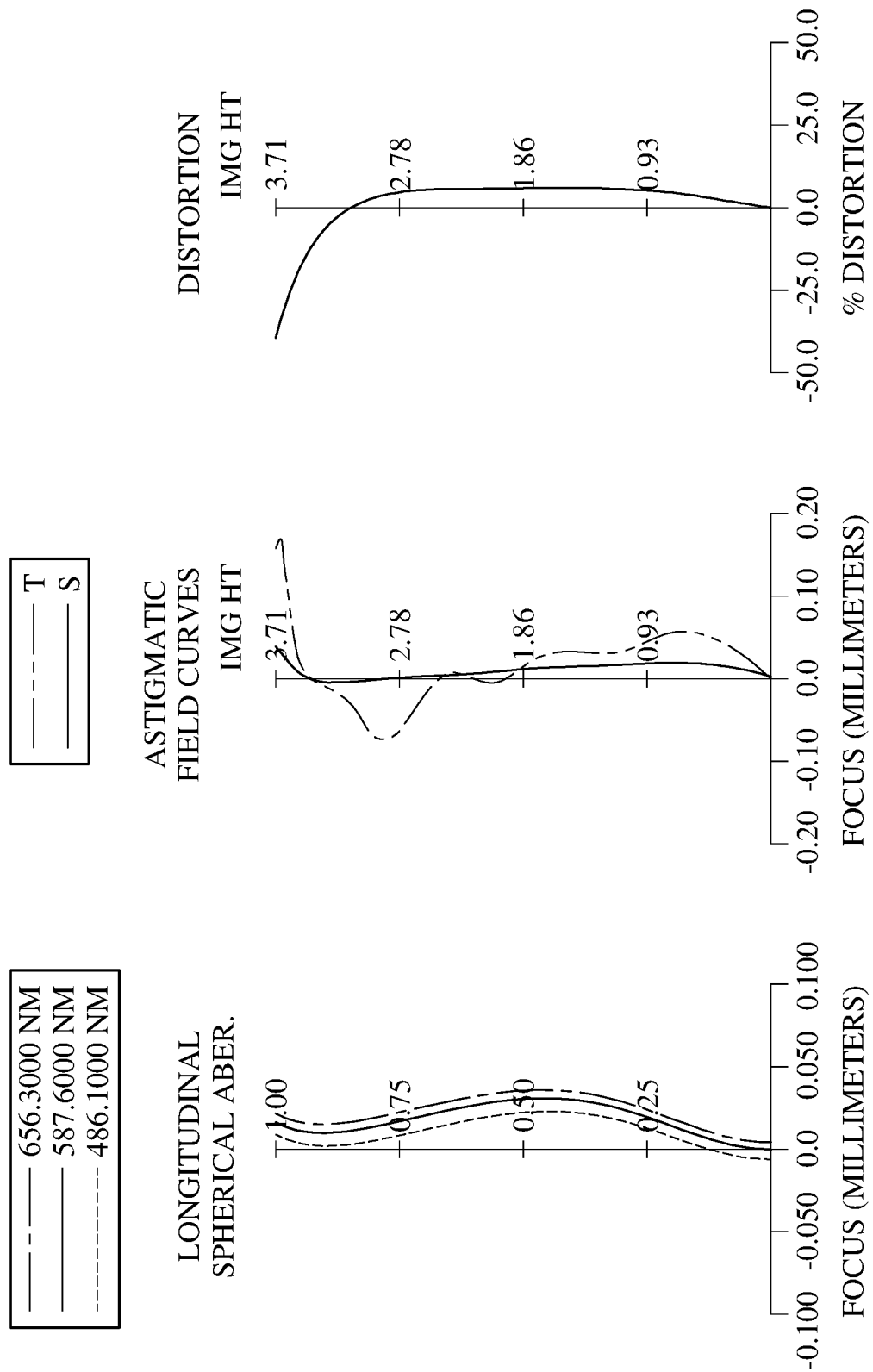
FIG. 28 shows spherical aberration curves, astigmatic field curves and a distortion curve of the image capturing unit according to the 7th embodiment.

FIG. 25 is a cross-sectional view of an image capturing unit corresponding to a diagonal direction of a photosensitive area of an image sensor according to the 7th embodiment of the present disclosure. FIG. 26 is a cross-sectional view of the image capturing unit corresponding to a length direction of the photosensitive area of the image sensor according to the 7th embodiment of the present disclosure. FIG. 27 is a cross-sectional view of the image capturing unit corresponding to a width direction of the photosensitive area of the image sensor according to the 7th embodiment of the present disclosure. FIG. 28 shows, in order from left to right, spherical aberration curves, astigmatic field curves and a distortion curve of the image capturing unit according to the 7th embodiment. In FIG. 25 to FIG. 27, the image capturing unit includes the imaging optical system (its reference numeral is omitted) of the present disclosure and an image sensor 790. The imaging optical system includes, in order from an object side to an image side, a first lens element 710, a stop 701, a second lens element 720, an aperture stop 700, a third lens element 730, a fourth lens element 740, a fifth lens element 750, a stop 702, a sixth lens element 760, a filter 770 and an image surface 780. The imaging optical system includes six lens elements (710, 720, 730, 740, 750 and 760) with no additional lens element disposed between each of the adjacent six lens elements.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has three inflection points. The image-side surface 712 of the first lens element 710 has two inflection points.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has one inflection point.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has two inflection points. The image-side surface 742 of the fourth lens element 740 has one inflection point.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has one inflection point. The image-side surface 752 of the fifth lens element 750 has one inflection point.

The sixth lens element 760 with positive refractive power has an object-side surface 761 being convex in a paraxial region thereof and an image-side surface 762 being concave in a paraxial region thereof. The sixth lens element 760 is made of plastic material and has both the object-side surface 761 and the image-side surface 762 being freeform surfaces. The object-side surface 761 of the sixth lens element 760 has two inflection points. The image-side surface 762 of the sixth lens element 760 has two inflection points. The object-side surface 761 of the sixth lens element 760 has one critical point in an off-axis region thereof. The image-side surface 762 of the sixth lens element 760 has one critical point in an off-axis region thereof.

The filter 770 is made of glass material and located between the sixth lens element 760 and the image surface 780, and will not affect the focal length of the imaging optical system. The image sensor 790 is disposed on or near the image surface 780 of the imaging optical system.

The abovementioned inflection points and critical points of the lens elements refer to the inflection points and critical points on the lens surfaces in a maximum image height direction.

In this embodiment, the first lens element 710, the second lens element 720, the fourth lens element 740 and the fifth lens element 750 are axisymmetric, each of the object-side surfaces 711, 721, 741 and 751 and the image-side surfaces 712, 742 and 752 has at least one inflection point in the maximum image height direction, the object-side surface 761 of the sixth lens element 760 has at least one critical point in the off-axis region thereof and in the maximum image height direction, and the image-side surface 762 of the sixth lens element 760 has at least one critical point in the off-axis region thereof and in the maximum image height direction. In this embodiment, the maximum image height direction corresponds to a diagonal direction D of a photosensitive area of the image sensor 790.

In this embodiment, the object-side surface 761 of the sixth lens element 760 satisfies the following condition: |ΔSAGmax|=1.83 [um], and the image-side surface 762 of the sixth lens element 760 satisfies the following condition: |ΔSAGmax|=13.49 [um].

The detailed optical data of the 7th embodiment are shown in Table 19, the aspheric surface data are shown in Table 20 and the freeform surface data are shown in Table 21 below.

TABLE 19

7th Embodiment
fD = 1.74 mm, fX = 1.74 mm, fY = 1.73 mm, Fno = 2.24
HFOVD = 74.9 deg., HFOVX = 62.7 deg., HFOVY = 44.6 deg.
ImgHD = 3.71 mm, ImgHX = 3.23 mm, ImgHY = 1.82 mm

| Surface # | | Curvature Radius | | Thickness | Material | Index | Abbe # | Focal Length | |
|---|---|---|---|---|---|---|---|---|---|
| | | (Y-dir.) | (X-dir.) | | | | | (Y-dir.) | (X-dir.) |
| 0 | Object | | Plano | Infinity | | | | | |
| 1 | Lens 1 | −22.033 | (ASP) | 0.395 | Plastic | 1.545 | 56.1 | −2.08 | |
| 2 | | 1.201 | (ASP) | 0.912 | | | | | |
| 3 | Stop | | Plano | −0.408 | | | | | |
| 4 | Lens 2 | 1.283 | (ASP) | 0.445 | Plastic | 1.654 | 20.6 | 5.89 | |
| 5 | | 1.660 | (ASP) | 0.489 | | | | | |
| 6 | Ape. Stop | | Plano | −0.007 | | | | | |

TABLE 19-continued

7th Embodiment
fD = 1.74 mm, fX = 1.74 mm, fY = 1.73 mm, Fno = 2.24
HFOVD = 74.9 deg., HFOVX = 62.7 deg., HFOVY = 44.6 deg.
ImgHD = 3.71 mm, ImgHX = 3.23 mm, ImgHY = 1.82 mm

| Surface # | | Curvature Radius (Y-dir.) | (X-dir.) | | Thickness | Material | Index | Abbe # | Focal Length (Y-dir.) | (X-dir.) |
|---|---|---|---|---|---|---|---|---|---|---|
| 7 | Lens 3 | 4.196 | | (ASP) | 0.567 | Plastic | 1.545 | 55.6 | 3.88 | |
| 8 | | −4.058 | | (ASP) | 0.057 | | | | | |
| 9 | Lens 4 | 2.996 | | (ASP) | 0.691 | Plastic | 1.538 | 55.9 | 1.98 | |
| 10 | | −1.514 | | (ASP) | 0.152 | | | | | |
| 11 | Lens 5 | −0.852 | | (ASP) | 0.330 | Plastic | 1.632 | 23.3 | −1.82 | |
| 12 | | −3.753 | | (ASP) | 0.118 | | | | | |
| 13 | Stop | | | Plano | 0.181 | | | | | |
| 14 | Lens 6 | 1.080 | 1.076 | (FFS) | 1.152 | Plastic | 1.545 | 56.0 | 2.42 | 2.44 |
| 15 | | 3.705 | 3.506 | (FFS) | 0.700 | | | | | |
| 16 | Filter | | | Plano | 0.210 | Glass | 1.517 | 64.2 | — | |
| 17 | | | | Plano | 0.318 | | | | | |
| 18 | Image | | | Plano | — | | | | | |

Note:
Reference wavelength is 587.6 nm (d-line).
An effective radius of the stop 701 (Surface 3) is 1.130 mm.
An effective radius of the stop 702 (Surface 13) is 1.688 mm.

TABLE 20

Aspheric Coefficients

| Surface # | 1 | 2 | 4 | 5 | 7 |
|---|---|---|---|---|---|
| k = | −9.2217E+01 | −1.0000E+00 | −1.0460E+00 | 1.4343E+00 | 6.0524E+00 |
| A4 = | 6.4513E+00 | 1.2308E−01 | 5.6336E−02 | 1.5465E−01 | −1.5261E−02 |
| A6 = | −5.4329E+01 | 5.0139E+00 | −1.0036E−01 | −1.5489E−01 | −2.2281E−02 |
| A8 = | 3.0147E+02 | −5.3095E+01 | −1.7920E−01 | 1.3090E−01 | 9.1967E−02 |
| A10 = | −1.1217E+03 | 2.5129E+02 | 7.5856E−01 | 2.9090E+00 | −2.0898E−01 |
| A12 = | 2.9063E+03 | −7.2040E+02 | −5.7929E−01 | −5.9290E+00 | 1.2348E−01 |
| A14 = | −5.2791E+03 | 1.3515E+03 | 8.4494E−02 | 4.0497E+00 | — |
| A16 = | 6.6575E+03 | −1.6747E+03 | — | — | — |
| A18 = | −5.6798E+03 | 1.3357E+03 | — | — | — |
| A20 = | 3.1113E+03 | −6.3814E+02 | — | — | — |
| A22 = | −9.8269E+02 | 1.5351E+02 | — | — | — |
| A24 = | 1.3535E+02 | −1.0676E+01 | — | — | — |

| Surface # | 8 | 9 | 10 | 11 | 12 |
|---|---|---|---|---|---|
| k = | 6.7794E+00 | −9.9000E+01 | −1.3596E+00 | −9.0859E−01 | −3.6857E+00 |
| A4 = | −7.4470E−01 | −3.1866E−01 | 1.0804E−01 | 4.6334E−01 | −2.9434E−01 |
| A6 = | 1.8255E+00 | 2.6047E−01 | −1.1338E+00 | −1.0279E+00 | 9.8143E−01 |
| A8 = | −3.5970E+00 | 5.2565E−01 | 2.7946E+00 | 3.0396E+00 | −1.1551E+00 |
| A10 = | 4.9840E+00 | −1.4093E+00 | −2.6787E+00 | −4.8800E+00 | 7.2182E−01 |
| A12 = | −4.4417E+00 | 1.2177E+00 | 2.3249E−01 | 3.9935E+00 | −2.4499E−01 |
| A14 = | 1.8147E+00 | −3.6606E−01 | 1.2416E+00 | −1.7109E+00 | 3.6758E−02 |
| A16 = | — | — | −7.2410E−01 | 3.2646E−01 | 7.8993E−04 |
| A18 = | — | — | 1.1992E−01 | — | −6.3269E−04 |

TABLE 21

Freeform Coefficients

| Surface # | 14 | 15 | Surface # | 14 | 15 |
|---|---|---|---|---|---|
| kx = | −7.3387E+00 | −9.0987E−01 | ky = | −7.5348E+00 | −1.6370E+00 |
| Ax4 = | −2.8694E−02 | −2.2419E−02 | Ay4 = | −2.8370E−02 | −2.2474E−02 |
| Ax6 = | −9.2335E−03 | −1.4954E−02 | Ay6 = | −8.8248E−03 | −1.3426E−02 |
| Ax8 = | 1.7418E−02 | 1.5866E−02 | Ay8 = | 1.7386E−02 | 1.5704E−02 |
| Ax10 = | −1.1723E−02 | −8.5252E−03 | Ay10 = | −1.1724E−02 | −8.5350E−03 |
| Ax12 = | 3.9822E−03 | 2.8736E−03 | Ay12 = | 3.9822E−03 | 2.8750E−03 |
| Ax14 = | −7.3670E−04 | −6.3607E−04 | Ay14 = | −7.3683E−04 | −6.3607E−04 |
| Ax16 = | 7.4542E−05 | 9.2329E−05 | Ay16 = | 7.4542E−05 | 9.2348E−05 |

TABLE 21-continued

Freeform Coefficients

| Surface # | 14 | 15 | Surface # | 14 | 15 |
|---|---|---|---|---|---|
| Ax18 = | −3.7647E−06 | −8.4606E−06 | Ay18 = | −3.7680E−06 | −8.4606E−06 |
| Ax20 = | 6.9400E−08 | 4.4269E−07 | Ay20 = | 6.9400E−08 | 4.4263E−07 |
| Ax22 = | −4.6651E−11 | −1.0040E−08 | Ay22 = | −1.0640E−11 | −1.0040E−08 |
| Ax24 = | 6.4539E−12 | 2.3808E−12 | Ay24 = | 1.5562E−11 | −5.7251E−13 |
| Ax26 = | −1.3471E−12 | 1.5850E−13 | Ay26 = | 1.9469E−12 | −1.0590E−14 |
| Ax28 = | 6.5753E−23 | −1.1518E−16 | Ay28 = | 9.2516E−14 | −3.7008E−15 |
| Ax30 = | 5.5920E−24 | −3.8811E−15 | Ay30 = | −7.4353E−14 | 1.0946E−16 |

In the 7th embodiment, the equations of the freeform surface profiles and the axisymmetric aspheric surface profiles of the aforementioned lens elements are the same as the equations of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 19, Table 20 and Table 21 as the following values and satisfy the following conditions:

| 7th Embodiment | |
|---|---|
| fD [mm] | 1.74 |
| fX [mm] | 1.74 |
| fY [mm] | 1.73 |
| Fno | 2.24 |
| HFOVD [deg.] | 74.9 |
| HFOVX [deg.] | 62.7 |
| HFOVY [deg.] | 44.6 |
| ImgHD [mm] | 3.71 |
| ImgHX [mm] | 3.23 |
| ImgHY [mm] | 1.82 |
| V5 + V6 | 79.3 |
| ΣCT/ΣAT | 2.40 |
| CT1/CT3 | 0.70 |
| CT1/CT4 | 0.57 |
| CT2/CT4 | 0.64 |
| CT5/ΣAT | 0.22 |
| CT5/CT3 | 0.58 |
| CT6/CT4 | 1.67 |
| T34/CT4 | 0.08 |
| TD/BL | 4.13 |
| TL [mm] | 6.30 |
| TL/EPD | 8.13 |
| TL/f | 3.63 |
| TL/ImgH | 1.70 |
| R6/R7 | −1.35 |
| R9/R10 | 0.23 |
| f/CT5 | 5.27 |
| f/f1234 | 1.31 |
| f/f34 | 1.20 |
| f/f56 | −0.13 |
| f4/CT4 | 2.86 |
| HFOV [deg.] | 74.9 |
| \|ΔSAGmax\| [um] | 1.83; 13.49 |

8th Embodiment

Figure 29:
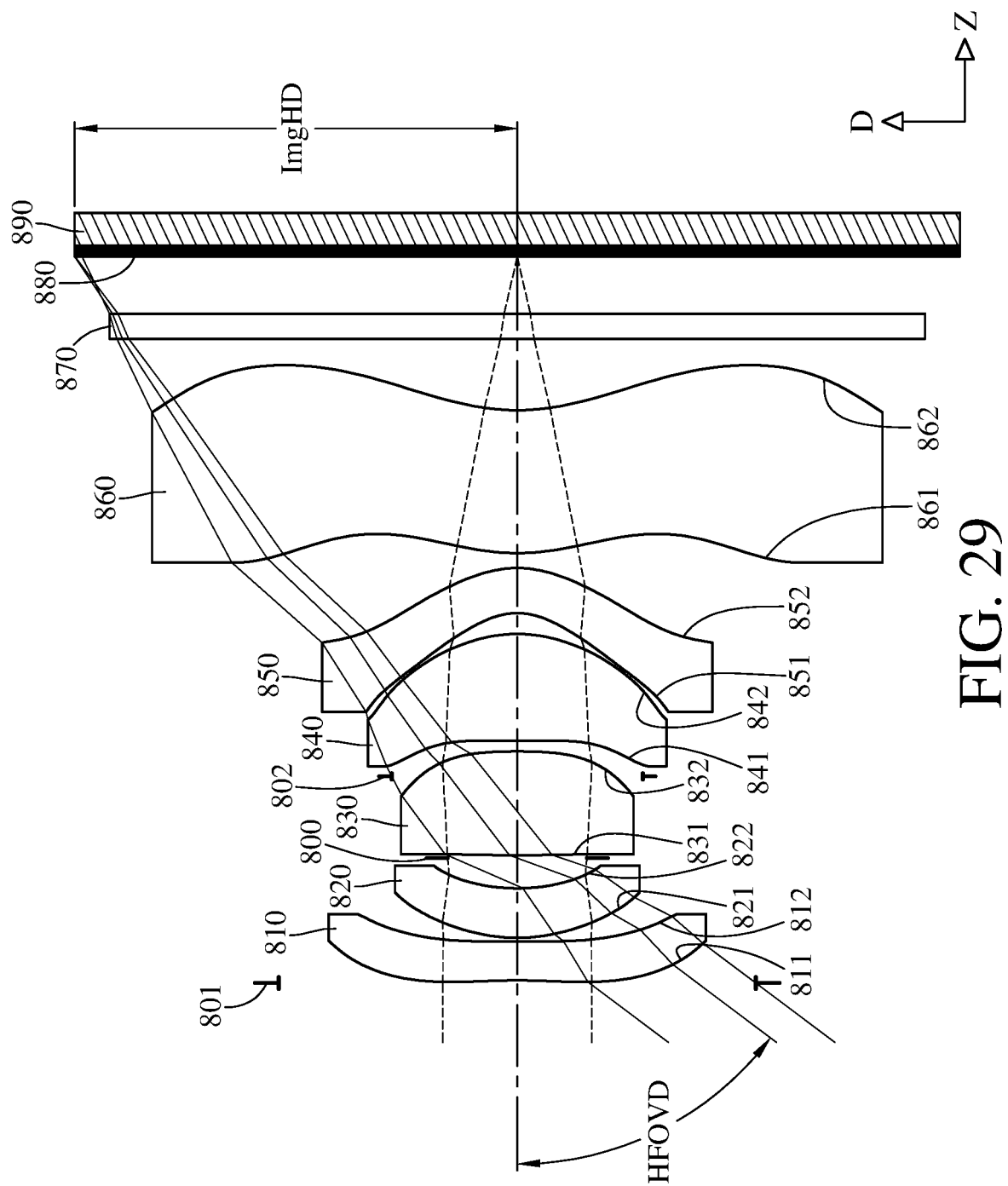
FIG. 29 is a cross-sectional view of an image capturing unit corresponding to a diagonal direction of a photosensitive area of an image sensor according to the 8th embodiment of the present disclosure.
Figure 30:
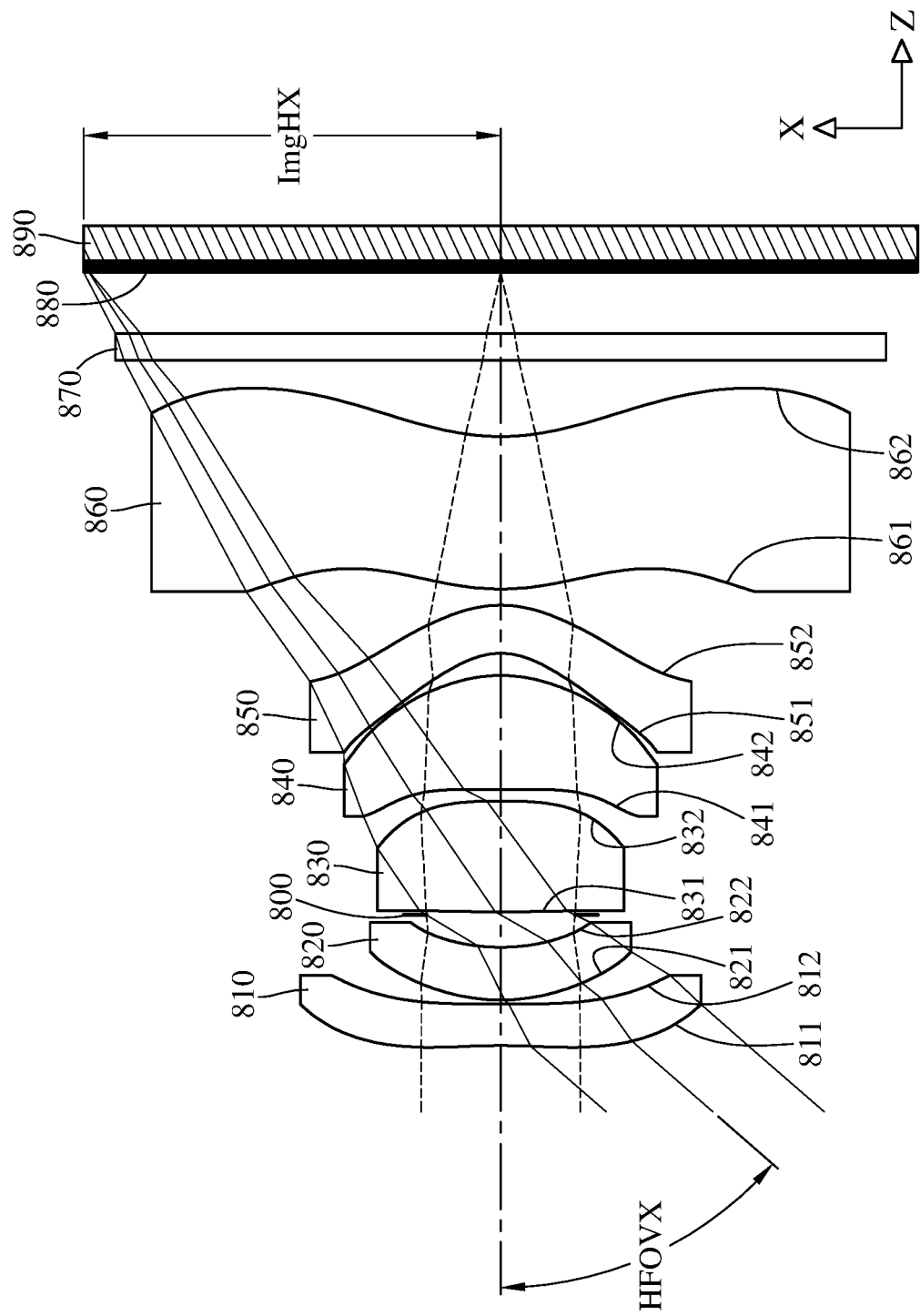
FIG. 30 is a cross-sectional view of the image capturing unit corresponding to a length direction of the photosensitive area of the image sensor according to the 8th embodiment of the present disclosure.
Figure 31:
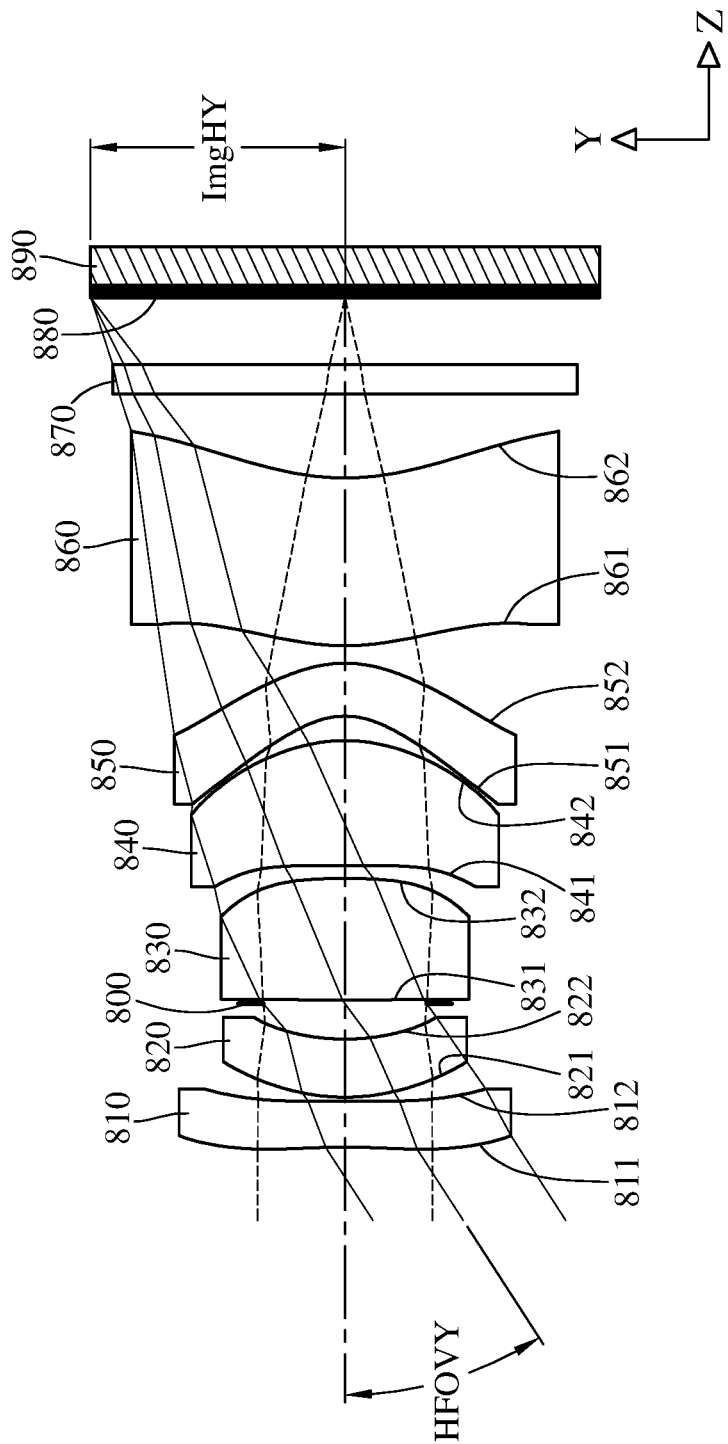
FIG. 31 is a cross-sectional view of the image capturing unit corresponding to a width direction of the photosensitive area of the image sensor according to the 8th embodiment of the present disclosure.
Figure 32:
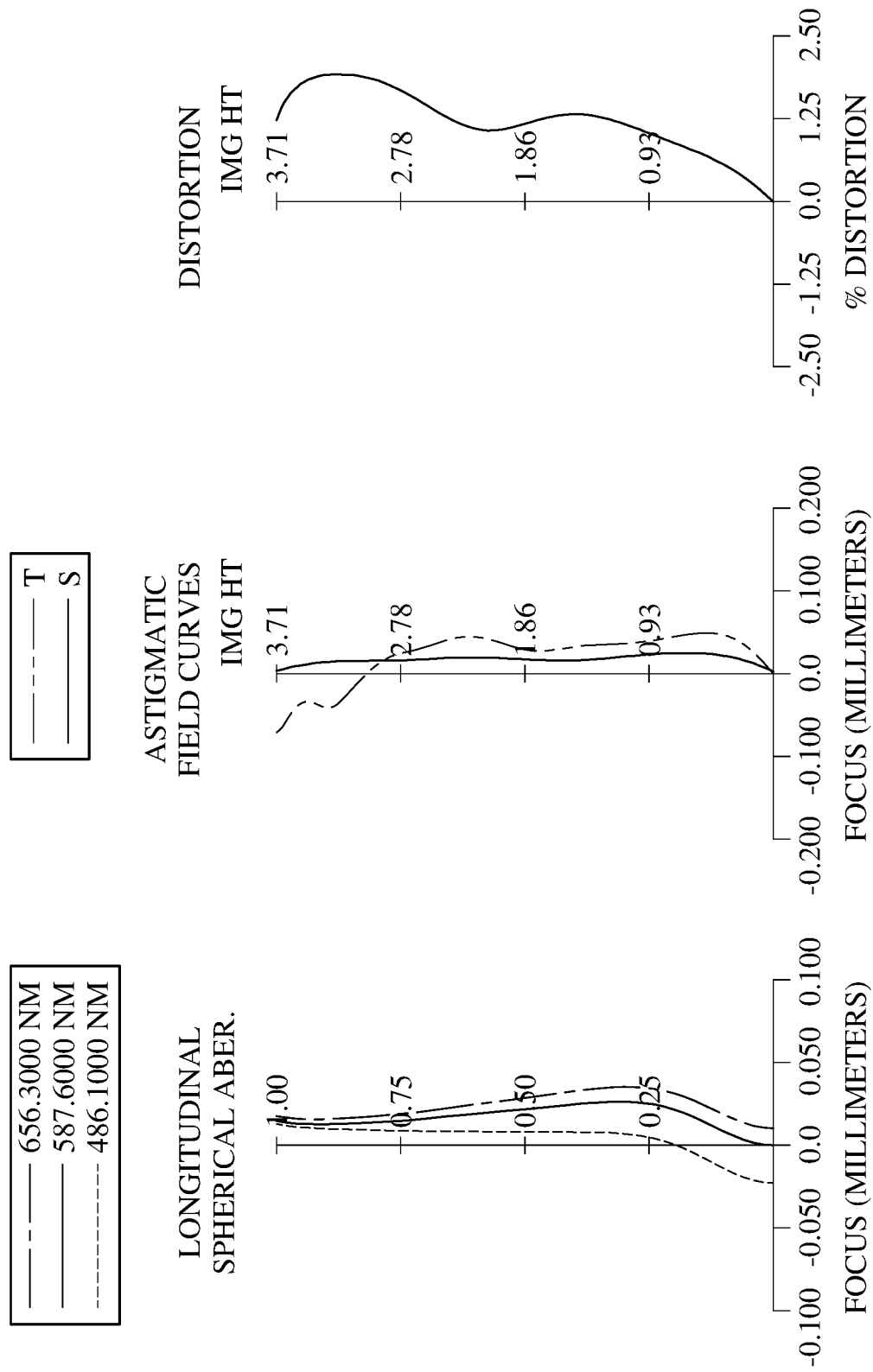
FIG. 32 shows spherical aberration curves, astigmatic field curves and a distortion curve of the image capturing unit according to the 8th embodiment.

FIG. 29 is a cross-sectional view of an image capturing unit corresponding to a diagonal direction of a photosensitive area of an image sensor according to the 8th embodiment of the present disclosure. FIG. 30 is a cross-sectional view of the image capturing unit corresponding to a length direction of the photosensitive area of the image sensor according to the 8th embodiment of the present disclosure. FIG. 31 is a cross-sectional view of the image capturing unit corresponding to a width direction of the photosensitive area of the image sensor according to the 8th embodiment of the present disclosure. FIG. 32, in order from left to right, shows spherical aberration curves, astigmatic field curves and a distortion curve of the image capturing unit according to the 8th embodiment. In FIG. 29 to FIG. 31, the image capturing unit includes the imaging optical system (its reference numeral is omitted) of the present disclosure and an image sensor 890. The imaging optical system includes, in order from an object side to an image side, a stop 801, a first lens element 810, a second lens element 820, an aperture stop 800, a third lens element 830, a stop 802, a fourth lens element 840, a fifth lens element 850, a sixth lens element 860, a filter 870 and an image surface 880. The imaging optical system includes six lens elements (810, 820, 830, 840, 850 and 860) with no additional lens element disposed between each of the adjacent six lens elements.

The first lens element 810 with negative refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has two inflection points. The image-side surface 812 of the first lens element 810 has two inflection points.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The object-side surface 831 of the third lens element 830 has one inflection point.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has two inflection points. The image-side surface 842 of the fourth lens element 840 has one inflection point.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has two inflection points. The image-side surface 852 of the fifth lens element 850 has two inflection points.

The sixth lens element 860 with positive refractive power has an object-side surface 861 being convex in a paraxial region thereof and an image-side surface 862 being concave in a paraxial region thereof. The sixth lens element 860 is made of plastic material and has both the object-side surface 861 and the image-side surface 862 being freeform surfaces. The object-side surface 861 of the sixth lens element 860 has two inflection points. The image-side surface 862 of the sixth lens element 860 has two inflection points. The object-side surface 861 of the sixth lens element 860 has two critical points in an off-axis region thereof. The image-side surface 862 of the sixth lens element 860 has one critical point in an off-axis region thereof.

The filter 870 is made of glass material and located between the sixth lens element 860 and the image surface 880, and will not affect the focal length of the imaging optical system. The image sensor 890 is disposed on or near the image surface 880 of the imaging optical system.

The abovementioned inflection points and critical points of the lens elements refer to the inflection points and critical points on the lens surfaces in a maximum image height direction.

In this embodiment, the first lens element 810, the third lens element 830, the fourth lens element 840 and the fifth lens element 850 are axisymmetric, each of the object-side surfaces 811, 831, 841 and 851 and the image-side surfaces 812, 842 and 852 has at least one inflection point in the maximum image height direction, the object-side surface 861 of the sixth lens element 860 has at least one critical point in the off-axis region thereof and in the maximum image height direction, and the image-side surface 862 of the sixth lens element 860 has at least one critical point in the off-axis region thereof and in the maximum image height direction. In this embodiment, the maximum image height direction corresponds to a diagonal direction D of a photosensitive area of the image sensor 890.

The equation of the freeform surface profiles of the aforementioned freeform lens elements of this embodiment, which is different from that of the 1st to 7th embodiments and can be referred to as the anamorphic asphere equation, is expressed as follows:

$$z(x, y) = \frac{\frac{x^2}{Rx} + \frac{y^2}{Ry}}{1 + \sqrt{1 - (1+kx)\left(\frac{x}{Rx}\right)^2 - (1+ky)\left(\frac{y}{Ry}\right)^2}} + \sum_i ARi\{(1 - APi)x^2 + (1 + APi)y^2\}^i,$$

where,
z is a displacement in parallel with the optical axis from an intersection point between the freeform surface and the optical axis to a point at (x, y) on the freeform surface;
x is the x-coordinate of the point on the freeform surface;
y is the y-coordinate of the point on the freeform surface;
Rx is the curvature radius in the X-axis direction in a paraxial region of the freeform surface;
Ry is the curvature radius in the Y-axis direction in the paraxial region of the freeform surface;
kx is the conic coefficient in the X-axis direction;
ky is the conic coefficient in the Y-axis direction;
ARi is the i-th rotational symmetric component, and in the embodiments, i may be, but is not limited to, 2, 3, 4 and 5; and
APi is the i-th non-rotational symmetric component, and in the embodiments, i may be, but is not limited to, 2, 3, 4 and 5.

In this and aforementioned embodiments, the equations of the freeform surface profiles applied to the design of the freeform lens elements are not intended to limit the present disclosure. In other configurations, other equations of the freeform surface profiles, such as Zernike or x-y polynomials, can also be applied to the design of freeform lens elements according to actual requirements.

In this embodiment, a direction of light travelling into the image surface 880 on the optical axis is the positive Z-axis direction, a direction corresponding to a length direction of a photosensitive area of the image sensor 890 is the X-axis direction, and a direction corresponding to a width direction of the photosensitive area of the image sensor 890 is the Y-axis direction, but the present disclosure is not limited thereto.

In this embodiment, the object-side surface 861 of the sixth lens element 860 satisfies the following condition: |ΔSAGmax|=1.37 [um], and the image-side surface 862 of the sixth lens element 860 satisfies the following condition: |ΔSAGmax|=7.57 [um].

The detailed optical data of the 8th embodiment are shown in Table 22, the aspheric surface data are shown in Table 23 and the freeform surface data are shown in Table 24 below.

TABLE 22

8th Embodiment
fD = 2.77 mm, fX = 2.77 mm, fY = 2.77 mm, Fno = 2.22
HFOVD = 53.1 deg., HFOVX = 48.9 deg., HFOVY = 32.9 deg.
ImgHD = 3.71 mm, ImgHX = 3.24 mm, ImgHY = 1.82 mm

| Surface # | | Curvature Radius | | | Thickness | Material | Index | Abbe # | Focal Length | |
|---|---|---|---|---|---|---|---|---|---|---|
| | | (Y-dir.) | (X-dir.) | | | | | | (Y-dir.) | (X-dir.) |
| 0 | Object | | Plano | | Infinity | | | | | |
| 1 | Stop | | Plano | | 0.024 | | | | | |
| 2 | Lens 1 | −4.578 | | (ASP) | 0.327 | Plastic | 1.566 | 37.4 | −9.33 | |
| 3 | | −35.162 | | (ASP) | 0.030 | | | | | |
| 4 | Lens 2 | 1.475 | | (ASP) | 0.415 | Plastic | 1.669 | 19.5 | 12.24 | |
| 5 | | 1.595 | | (ASP) | 0.254 | | | | | |
| 6 | Ape. Stop | | Plano | | 0.024 | | | | | |

TABLE 22-continued

8th Embodiment
fD = 2.77 mm, fX = 2.77 mm, fY = 2.77 mm, Fno = 2.22
HFOVD = 53.1 deg., HFOVX = 48.9 deg., HFOVY = 32.9 deg.
ImgHD = 3.71 mm, ImgHX = 3.24 mm, ImgHY = 1.82 mm

| Surface # | | Curvature Radius (Y-dir.) | (X-dir.) | | Thickness | Material | Index | Abbe # | Focal Length (Y-dir.) | (X-dir.) |
|---|---|---|---|---|---|---|---|---|---|---|
| 7 | Lens 3 | 13.738 | | (ASP) | 0.872 | Plastic | 1.544 | 56.0 | 6.49 | |
| 8 | | −4.643 | | (ASP) | −0.210 | | | | | |
| 9 | Stop | | Plano | | 0.299 | | | | | |
| 10 | Lens 4 | 14.733 | | (ASP) | 0.897 | Plastic | 1.544 | 56.0 | 2.05 | |
| 11 | | −1.178 | | (ASP) | 0.175 | | | | | |
| 12 | Lens 5 | −0.550 | | (ASP) | 0.378 | Plastic | 1.669 | 19.5 | −3.64 | |
| 13 | | −0.905 | | (ASP) | 0.126 | | | | | |
| 14 | Lens 6 | 1.854 | 1.863 | (FFS) | 1.199 | Plastic | 1.584 | 28.2 | 13.84 | 13.73 |
| 15 | | 1.832 | 1.850 | (FFS) | 0.600 | | | | | |
| 16 | Filter | | Plano | | 0.210 | Glass | 1.517 | 64.2 | — | |
| 17 | | | Plano | | 0.479 | | | | | |
| 18 | Image | | Plano | | — | | | | | |

Note:
Reference wavelength is 587.6 nm (d-line).
An effective radius of the stop 801 (Surface 1) is 2.000 mm.
An effective radius of the stop 802 (Surface 9) is 1.053 mm.

TABLE 23

Aspheric Coefficients

| Surface # | 2 | 3 | 4 | 5 | 7 |
|---|---|---|---|---|---|
| k = | −5.9193E+01 | 7.9543E+01 | −8.0997E−02 | −6.8337E−02 | 9.7054E+01 |
| A4 = | 2.0403E−01 | 2.0948E−01 | −1.1689E−01 | 6.6699E−02 | −1.4034E−02 |
| A6 = | −2.6923E−01 | −1.9593E−01 | 6.0832E−01 | −3.0973E+00 | −8.3531E−01 |
| A8 = | 4.6141E−01 | −2.2367E−01 | −6.2301E+00 | 9.2502E+01 | 1.8924E+01 |
| A10 = | −8.3439E−01 | 2.0548E+00 | 4.7681E+01 | −1.5975E+03 | −2.7621E+02 |
| A12 = | 1.4282E+00 | −6.2577E+00 | −2.5443E+02 | 1.8385E+04 | 2.6289E+03 |
| A14 = | −2.0346E+00 | 1.2137E+01 | 9.6320E+02 | −1.4746E+05 | −1.6894E+04 |
| A16 = | 2.2340E+00 | −1.6635E+01 | −2.6207E+03 | 8.4584E+05 | 7.4475E+04 |
| A18 = | −1.8236E+00 | 1.6622E+01 | 5.1592E+03 | −3.5161E+06 | −2.2518E+05 |
| A20 = | 1.0849E+00 | −1.2167E+01 | −7.3404E+03 | 1.0613E+07 | 4.5835E+05 |
| A22 = | −4.6122E−01 | 6.4451E+00 | 7.4619E+03 | −2.3033E+07 | −5.9962E+05 |
| A24 = | 1.3589E−01 | −2.3992E+00 | −5.2772E+03 | 3.5020E+07 | 4.5496E+05 |
| A26 = | −2.6275E−02 | 5.9342E−01 | 2.4635E+03 | −3.5410E+07 | −1.5209E+05 |
| A28 = | 2.9900E−03 | −8.7272E−02 | −6.8169E+02 | 2.1387E+07 | — |
| A30 = | −1.5134E−04 | 5.7559E−03 | 8.4597E+01 | −5.8388E+06 | — |

| Surface # | 8 | 10 | 11 | 12 | 13 |
|---|---|---|---|---|---|
| k = | 8.8339E+00 | −8.4668E+01 | −6.3957E−01 | −1.0456E+00 | −1.0498E+00 |
| A4 = | −2.2663E−01 | −2.5184E−01 | 1.4593E−02 | 5.8582E−01 | 2.3632E−01 |
| A6 = | −1.8602E+00 | −5.9588E−02 | 4.7095E−01 | 9.0591E−01 | −4.3245E−02 |
| A8 = | 2.4179E+01 | 4.9117E−01 | −1.3028E+00 | −9.0273E+00 | 4.8850E−02 |
| A10 = | −2.0044E+02 | −3.0787E+00 | 3.4565E+00 | 3.9005E+01 | −1.2389E+00 |
| A12 = | 1.1252E+03 | 9.9769E+00 | −1.2829E+01 | −1.2133E+02 | 3.4444E+00 |
| A14 = | −4.4525E+03 | −1.7777E+01 | 2.6389E+01 | 2.6765E+02 | −4.4988E+00 |
| A16 = | 1.2729E+04 | 1.9053E+01 | −1.7097E+01 | −4.0970E+02 | 3.2391E+00 |
| A18 = | −2.6579E+04 | −1.2599E+01 | −2.7822E+01 | 4.3588E+02 | −1.1259E+00 |
| A20 = | 4.0521E+04 | 5.1084E+00 | 6.9757E+01 | −3.2378E+02 | −9.8254E−02 |
| A22 = | −4.4569E+04 | −1.2248E+00 | −6.9101E+01 | 1.6719E+02 | 2.9358E−01 |
| A24 = | 3.4409E+04 | 1.5807E−01 | 3.8786E+01 | −5.8778E+01 | −1.4144E−01 |
| A26 = | −1.7679E+04 | −8.4001E−03 | −1.2857E+01 | 1.3409E+01 | 3.5149E−02 |
| A28 = | 5.4256E+03 | — | 2.3507E+00 | −1.7884E+00 | −4.6639E−03 |
| A30 = | −7.5208E+02 | — | −1.8310E−01 | 1.0576E−01 | 2.6243E−04 |

TABLE 24

Freeform Coefficients

| Surface # | 14 | 15 | Surface # | 14 | 15 |
|---|---|---|---|---|---|
| kx = | −6.3224E−01 | −9.2270E−01 | ky = | −7.0483E−01 | −9.1496E−01 |
| AP2 = | 1.9560E−03 | 1.2766E−02 | AR2 = | −1.4547E−01 | −7.7185E−02 |
| AP3 = | 7.4551E−03 | 8.3802E−03 | AR3 = | 2.1753E−02 | 1.1166E−02 |

TABLE 24-continued

| Freeform Coefficients | | | | | |
|---|---|---|---|---|---|
| Surface # | 14 | 15 | Surface # | 14 | 15 |
| AP4 = | 4.4458E−03 | 2.5986E−03 | AR4 = | −1.0873E−03 | −1.0187E−03 |
| AP5 = | 6.7055E−03 | 9.8362E−04 | AR5 = | −1.0802E−05 | 3.7779E−05 |

In the 8th embodiment, the equation of the axisymmetric aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 22, Table 23 and Table 24 as the following values and satisfy the following conditions:

| 8th Embodiment | | | |
|---|---|---|---|
| fD [mm] | 2.77 | CT6/CT4 | 1.34 |
| fX [mm] | 2.77 | T34/CT4 | 0.10 |
| fY [mm] | 2.77 | TD/BL | 3.71 |
| Fno | 2.22 | TL [mm] | 6.08 |
| HFOVD [deg.] | 53.1 | TL/EPD | 4.87 |
| HFOVX [deg.] | 48.9 | TL/f | 2.19 |
| HFOVY [deg.] | 32.9 | TL/ImgH | 1.64 |
| ImgHD [mm] | 3.71 | R6/R7 | −0.32 |
| ImgHX [mm] | 3.24 | R9/R10 | 0.61 |
| ImgHY [mm] | 1.82 | f/CT5 | 7.32 |
| V5 + V6 | 47.7 | f/f1234 | 1.50 |
| ΣCT/ΣAT | 5.86 | f/f34 | 1.62 |
| CT1/CT3 | 0.38 | f/f56 | −0.68 |
| CT1/CT4 | 0.37 | f4/CT4 | 2.28 |
| CT2/CT4 | 0.46 | HFOV [deg.] | 53.1 |
| CT5/ΣAT | 0.54 | |ΔSAGmax| [um] | 1.37; 7.57 |
| CT5/CT3 | 0.43 | — | — |

9th Embodiment

Figure 33:
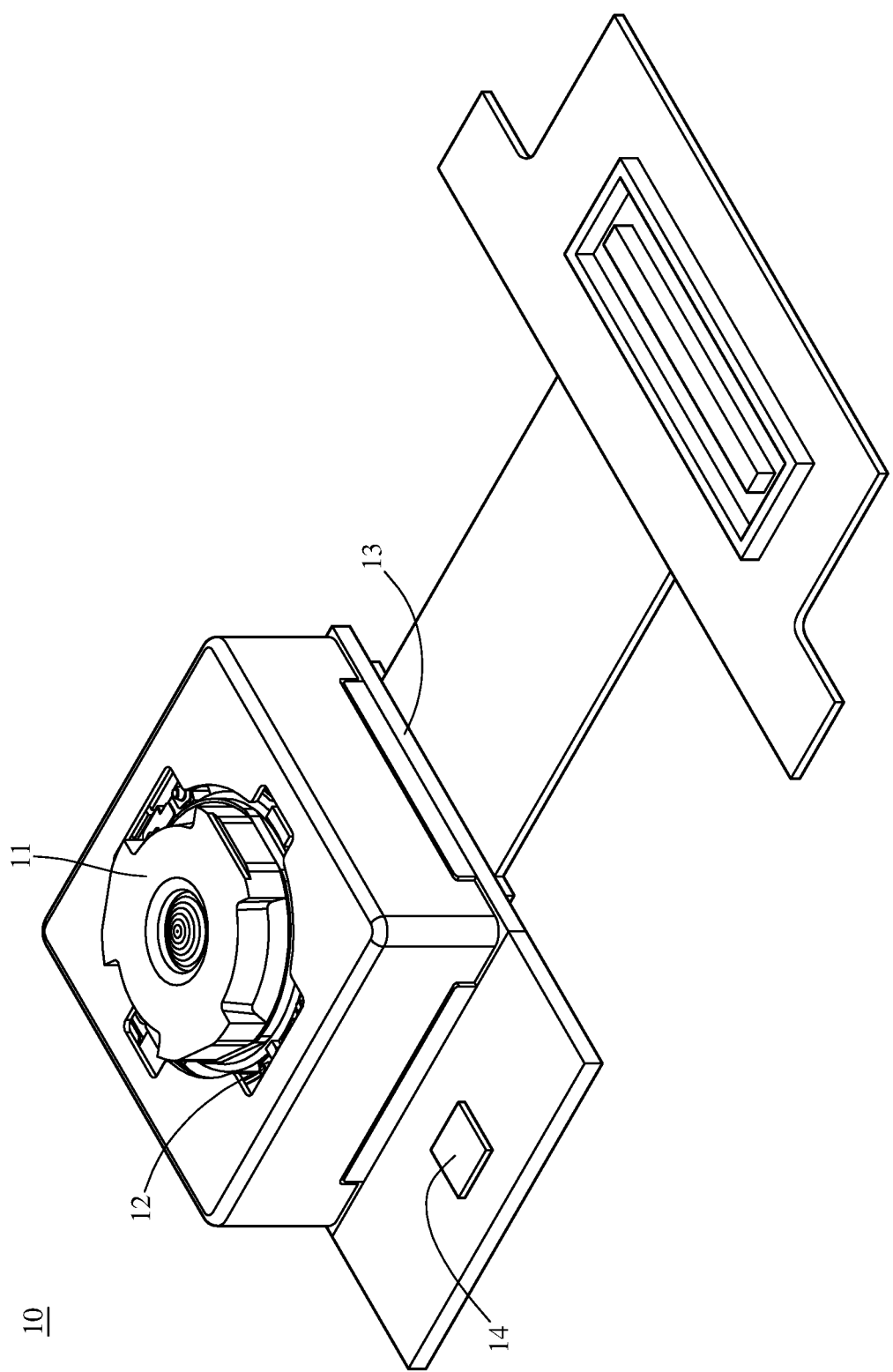
FIG. 33 is a perspective view of an image capturing unit according to the 9th embodiment of the present disclosure.

FIG. 33 is a perspective view of an image capturing unit according to the 9th embodiment of the present disclosure. In this embodiment, an image capturing unit 10 is a camera module including a lens unit 11, a driving device 12, an image sensor 13 and an image stabilizer 14. The lens unit 11 includes the imaging optical system of the present disclosure, a barrel and a holder member (their reference numerals are omitted) for holding the imaging optical system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 34:
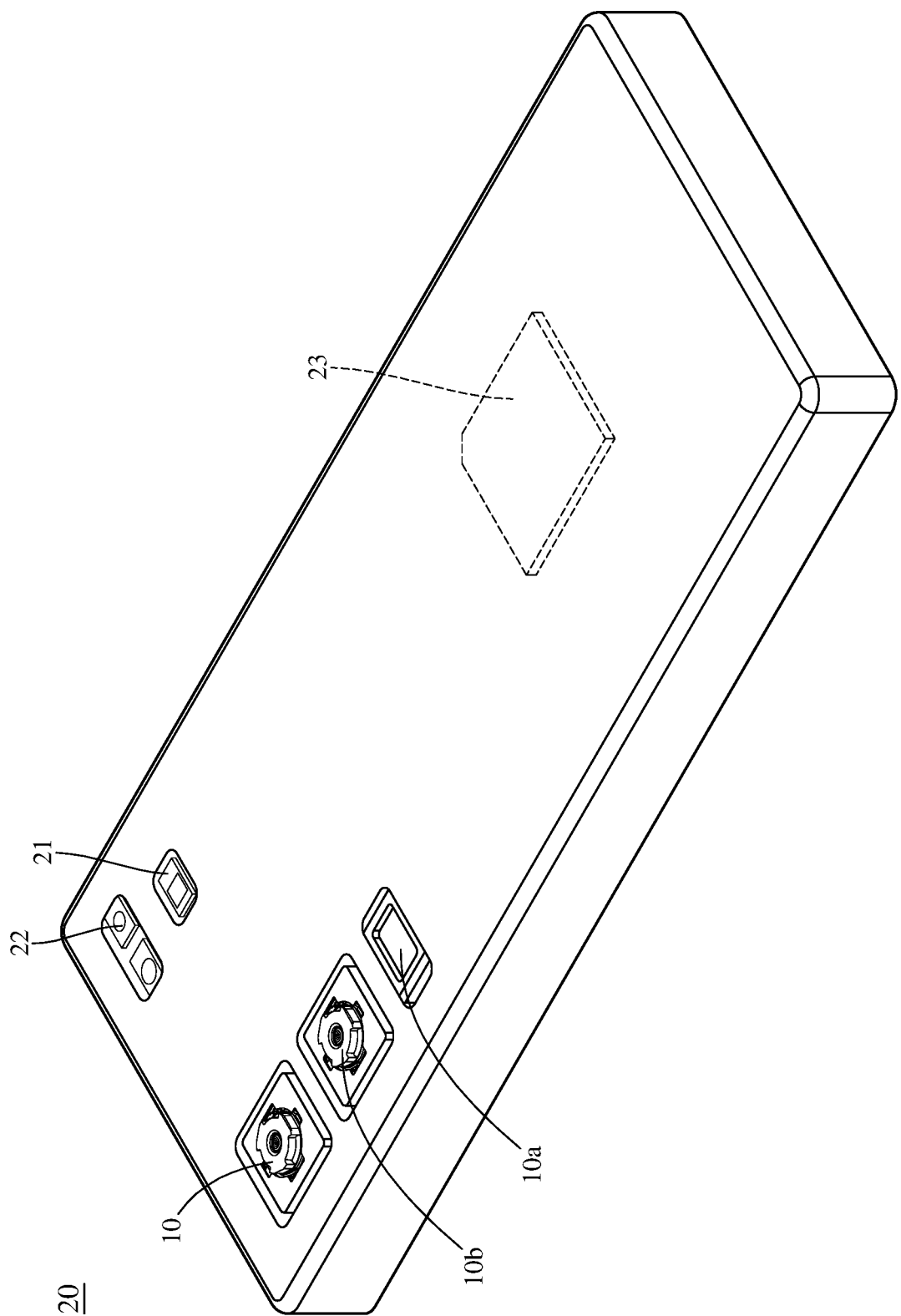
FIG. 34 is one perspective view of an electronic device according to the 10th embodiment of the present disclosure.
Figure 35:
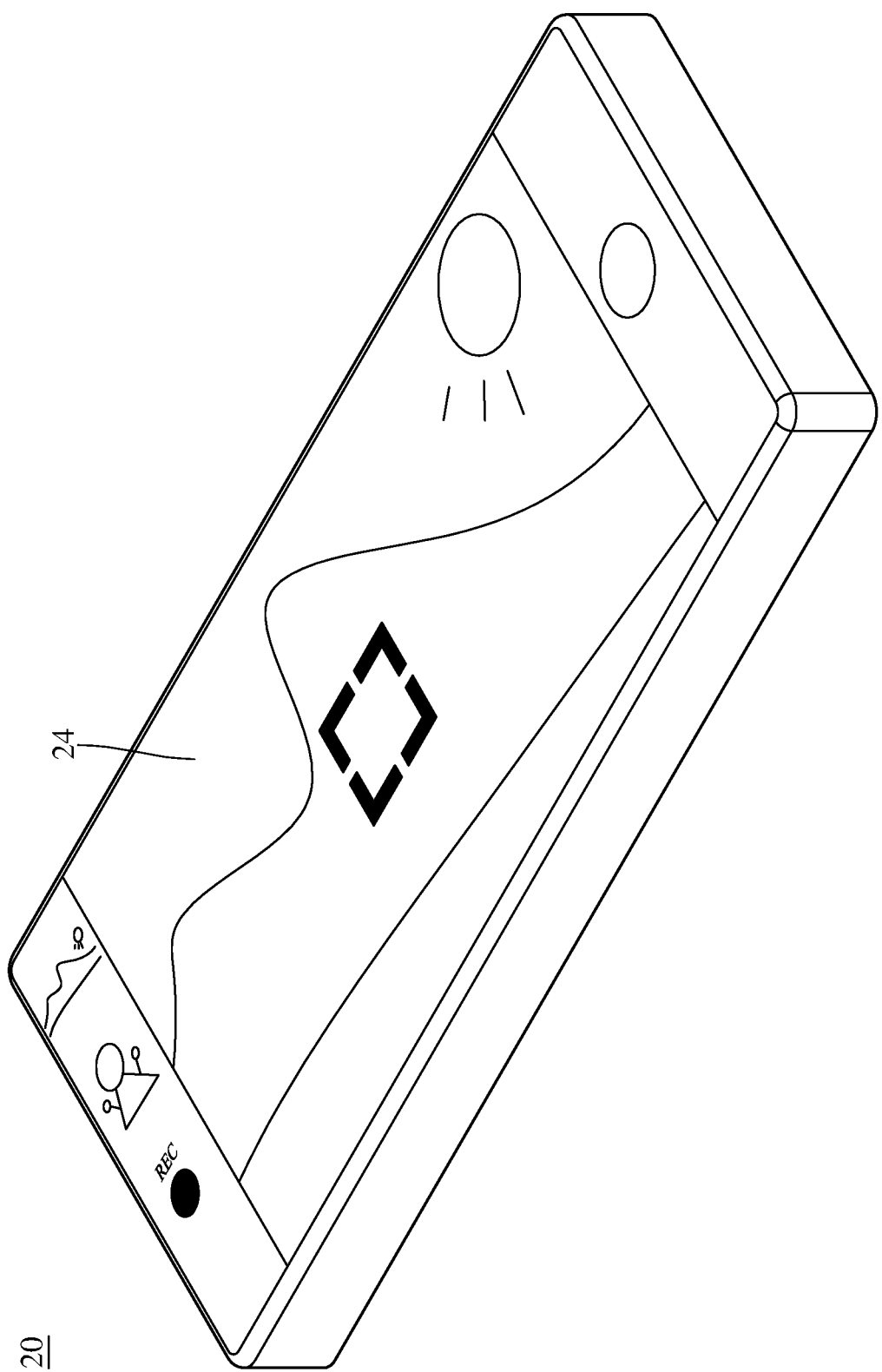
FIG. 35 is another perspective view of the electronic device in FIG. 34.
Figure 36:
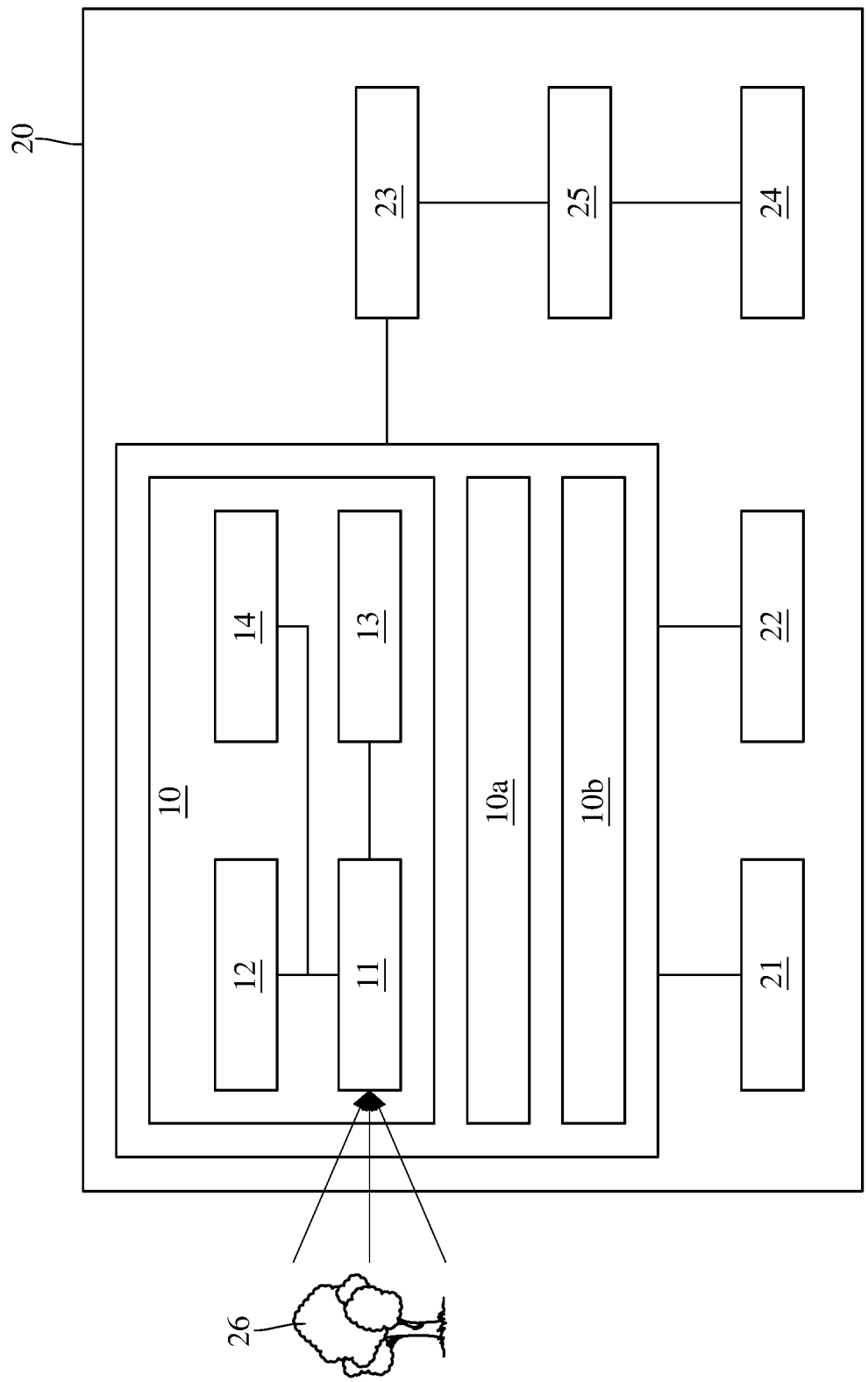
FIG. 36 is a block diagram of the electronic device in FIG. 34.

FIG. 34 is one perspective view of an electronic device according to the 10th embodiment of the present disclosure. FIG. 35 is another perspective view of the electronic device in FIG. 34. FIG. 36 is a block diagram of the electronic device in FIG. 34.

In this embodiment, an electronic device 20 is a smartphone including the image capturing unit 10 disclosed in the 9th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b are located on the opposite side of the electronic device 20 with respect to the user interface 24 and all face the same direction. Furthermore, each of the image capturing unit 10a and the image capturing unit 10b has a configuration similar to that of the image capturing unit 10. In detail, each of the image capturing unit 10a and the image capturing unit 10b includes a lens unit, a driving device, an image sensor and an image stabilizer, and the lens unit includes a lens system assembly, a barrel and a holder member for holding the lens system assembly.

In this embodiment, the image capturing unit 10 is a wide angle image capturing unit, the image capturing unit 10a is a telephoto image capturing unit and the image capturing unit 10b has a maximum field of view ranging between that of the image capturing unit 10 and that of the image capturing unit 10a. The image capturing units 10, 10a and 10b have different fields of view, such that the electronic device 20 has various magnification ratios so as to meet the requirement of optical zoom functionality. In this embodiment, the electronic device 20 includes multiple image capturing units 10, 10a and 10b, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging optical system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;

wherein the fourth lens element has positive refractive power, at least one of the six lens elements is a freeform lens element, and at least one of the object-side surface and the image-side surface of the at least one freeform lens element is a freeform surface;

wherein an axial distance between the object-side surface of the first lens element and an image surface is TL, a maximum image height of the imaging optical system is ImgH, half of a maximum field of view of the imaging optical system is HFOV, a central thickness of the fifth lens element is CT5, a sum of axial distances between each of all adjacent lens elements of the imaging optical system is ΣAT, a minimum value among distances between an optical axis and an edge of an optically effective area of the at least one freeform surface of the at least one freeform lens element is Ymin, a maximum value among displacements in parallel with the optical axis from an intersection point between the at least one freeform surface and the optical axis to a point at a distance of Ymin from the optical axis is SAG_MAX, a minimum value among displacements in parallel with the optical axis from the intersection point between the at least one freeform surface and the optical axis to a point at a distance of Ymin from the optical axis on the at least one freeform surface is SAG_MIN, an absolute difference between SAG_MAX and SAG_MIN is |ΔSAGmax|, a focal length of the imaging optical system in a maximum image height direction is f, a composite focal length of the first lens element, the second lens element, the third lens element and the fourth lens element in the maximum image height direction is f1234, and the following conditions are satisfied:

$0.80 < TL/ImgH < 6.0;$ $50.0[deg.] \leq HFOV;$ $0 < CT5/\Sigma AT < 1.1;$ $1.0\ [um] < |\Delta SAGmax|;$ and $0.53 < f/f1234 < 2.0.$ 2. The imaging optical system of claim 1, wherein the axial distance between the object-side surface of the first lens element and the image surface is TL, the maximum image height of the imaging optical system is ImgH, the central thickness of the fifth lens element is CT5, the sum of axial distances between each of all adjacent lens elements of the imaging optical system is ΣAT, and the following conditions are satisfied:

$1.0 < TL/ImgH < 4.5;$ and $0.15 < CT5/\Sigma AT < 0.75.$

3. The imaging optical system of claim 1, wherein an Abbe number of the fifth lens element is V5, an Abbe number of the sixth lens element is V6, a central thickness of the first lens element is CT1, a central thickness of the third lens element is CT3, and the following conditions are satisfied:

$20.0 < V5 + V6 < 100.0;$ and $0.15 < CT1/CT3 < 1.0.$

4. The imaging optical system of claim 1, wherein a sum of central thicknesses of all lens elements of the imaging optical system is ΣCT, the sum of axial distances between each of all adjacent lens elements of the imaging optical system is ΣAT, and the following condition is satisfied:

$1.6 < \Sigma CT/\Sigma AT < 7.0.$

5. The imaging optical system of claim 1, wherein the focal length of the imaging optical system in the maximum image height direction is f, a composite focal length of the third lens element and the fourth lens element in the maximum image height direction is f34, and the following condition is satisfied:

$0.70 \leq f/f34 < 2.0.$

6. The imaging optical system of claim 1, wherein a focal length of the fourth lens element in the maximum image height direction is f4, a central thickness of the fourth lens element is CT4, and the following condition is satisfied:

$0 < f4/CT4 < 250.$

7. The imaging optical system of claim 1, wherein the first lens element has negative refractive power, the second lens element has positive refractive power, the image-side surface of the fourth lens element is convex in a paraxial region thereof, the image-side surface of the fifth lens element is convex in a paraxial region thereof, and the image-side surface of the sixth lens element is concave in a paraxial region thereof.

8. The imaging optical system of claim 1, wherein the minimum value among distances between the optical axis and the edge of the optically effective area of the at least one freeform surface of the at least one freeform lens element is Ymin, the maximum value among displacements in parallel with the optical axis from the intersection point between the at least one freeform surface and the optical axis to a point at a distance of Ymin from the optical axis on the at least one freeform surface is SAG_MAX, the minimum value among displacements in parallel with the optical axis from the intersection point between the at least one freeform surface and the optical axis to a point at a distance of Ymin from the optical axis on the at least one freeform surface is SAG_MIN, the absolute difference between SAG_MAX and SAG_MIN is |ΔSAGmax|, and the following condition is satisfied:

2.0 [um]<|ΔSAGmax|.

9. An imaging optical system comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;
  wherein at least one of the six lens elements is a freeform lens element, at least one of the object-side surface and the image-side surface of the at least one freeform lens element is a freeform surface, and each of at least three of the six lens elements has an Abbe number smaller than 50.0;
  wherein an axial distance between the object-side surface of the first lens element and an image surface is TL, a maximum image height of the imaging optical system is ImgH, half of a maximum field of view of the imaging optical system is HFOV, a minimum value among distances between an optical axis and an edge of an optically effective area of the at least one freeform surface of the at least one freeform lens element is Ymin, a maximum value among displacements in parallel with the optical axis from an intersection point between the at least one freeform surface and the optical axis to a point at a distance of Ymin from the optical axis on the at least one freeform surface is SAG_MAX, a minimum value among displacements in parallel with the optical axis from the intersection point between the at least one freeform surface and the optical axis to a point at a distance of Ymin from the optical axis on the at least one freeform surface is SAG_MIN, an absolute difference between SAG_MAX and SAG_MIN is |ΔSAGmax|, a curvature radius of the image-side surface of the third lens element in a paraxial region thereof and in a maximum image height direction is R6, a curvature radius of the object-side surface of the fourth lens element in a paraxial region thereof and in the maximum image height direction is R7, and the following conditions are satisfied:

0.80<TL/ImgH<6.0;

50.0[deg.]<HFOV;

1.0 [um]<|ΔSAGmax|; and

−2.0<R6/R7<0.

10. The imaging optical system of claim 9, wherein the axial distance between the object-side surface of the first lens element and the image surface is TL, the maximum image height of the imaging optical system is ImgH, an entrance pupil diameter of the imaging optical system is EPD, and the following conditions are satisfied:

1.2<TL/ImgH<3.5;

3.5 [mm]<TL<8.0 [mm]; and 3.0<TL/EPD<11.

11. The imaging optical system of claim 9, wherein each of at least three of the six lens elements has an Abbe number smaller than 30.0.

12. The imaging optical system of claim 9, wherein a central thickness of the third lens element is CT3, a central thickness of the fourth lens element is CT4, a central thickness of the fifth lens element is CT5, an axial distance between the third lens element and the fourth lens element is T34, and the following conditions are satisfied:

0.20<CT5/CT3<2.0; and

0<T34/CT4≤0.70.

13. The imaging optical system of claim 9, wherein the curvature radius of the image-side surface of the third lens element in the paraxial region thereof and in the maximum image height direction is R6, the curvature radius of the object-side surface of the fourth lens element in the paraxial region thereof and in the maximum image height direction is R7, and the following condition is satisfied:

−1.0<R6/R7<0.

14. The imaging optical system of claim 9, wherein a focal length of the imaging optical system in the maximum image height direction is f, a composite focal length of the first lens element, the second lens element, the third lens element and the fourth lens element in the maximum image height direction is f1234, and the following condition is satisfied:

0.53<f/f1234<2.0.

15. The imaging optical system of claim 9, wherein the first lens element has negative refractive power, the object-side surface of the third lens element is convex in a paraxial region thereof, the object-side surface of the fifth lens element is concave in a paraxial region thereof, and the image-side surface of the sixth lens element is concave in a paraxial region thereof.

16. The imaging optical system of claim 9, wherein the minimum value among distances between the optical axis and the edge of the optically effective area of the at least one freeform surface of the at least one freeform lens element is Ymin, the maximum value among displacements in parallel with the optical axis from the intersection point between the at least one freeform surface and the optical axis to a point at a distance of Ymin from the optical axis on the at least one freeform surface is SAG_MAX, the minimum value among displacements in parallel with the optical axis from the intersection point between the at least one freeform surface and the optical axis to a point at a distance of Ymin from the optical axis on the at least one freeform surface is SAG_MIN, the absolute difference between SAG_MAX and SAG_MIN is |ΔSAGmax|, and the following condition is satisfied:

2.0 [um]<|ΔSAGmax|.

17. An imaging optical system comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;
wherein at least one of the six lens elements is a freeform lens element, and at least one of the object-side surface and the image-side surface of the at least one freeform lens element is a freeform surface;
wherein an axial distance between the object-side surface of the first lens element and an image surface is TL, a maximum image height of the imaging optical system is ImgH, half of a maximum field of view of the imaging optical system is HFOV, a central thickness of the first lens element is CT1, a central thickness of the second lens element is CT2, a central thickness of the fourth lens element is CT4, a central thickness of the sixth lens element is CT6, a minimum value among distances between an optical axis and an edge of an optically effective area of the at least one freeform surface of the at least one freeform lens element is Ymin, a maximum value among displacements in parallel with the optical axis from an intersection point between the at least one freeform surface and the optical axis to a point at a distance of Ymin from the optical axis on the at least one freeform surface is SAG_MAX, a minimum value among displacements in parallel with the optical axis from the intersection point between the at least one freeform surface and the optical axis to a point at a distance of Ymin from the optical axis on the at least one freeform surface is SAG_MIN, an absolute difference between SAG_MAX and SAG_MIN is |ΔSAGmax|, a focal length of the imaging optical system in a maximum image height direction is f, a composite focal length of the third lens element and the fourth lens element in the maximum image height direction is f34, and the following conditions are satisfied:

0.80<$TL/ImgH$<6.0;

50.0[deg.]<$HFOV$;

0<$CT2/CT4$<1.5;

0<$CT6/CT4$<2.0;

0<$CT1/CT4$<1.5;

1.0 [um]<|Δ$SAG$max|; and 0.70<$f/f34$<2.0.

18. The imaging optical system of claim 17, wherein the axial distance between the object-side surface of the first lens element and the image surface is TL, the maximum image height of the imaging optical system is ImgH, half of the maximum field of view of the imaging optical system is HFOV, the central thickness of the fourth lens element is CT4, the central thickness of the sixth lens element is CT6, and the following conditions are satisfied:

1.0<$TL/ImgH$<4.5;

60.0[deg.]<$HFOV$<90.0[deg.]; and 0.10<$CT6/CT4$<1.8.

19. The imaging optical system of claim 17, wherein the central thickness of the second lens element is CT2, the central thickness of the fourth lens element is CT4, and the following condition is satisfied:

0.10<$CT2/CT4$<0.90.

20. The imaging optical system of claim 17, wherein the central thickness of the first lens element is CT1, the central thickness of the fourth lens element is CT4, and the following condition is satisfied:

0.10<$CT1/CT4$<0.80.

21. The imaging optical system of claim 17, wherein an axial distance between the object-side surface of the first lens element and the image-side surface of the sixth lens element is TD, an axial distance between the image-side surface of the sixth lens element and the image surface is BL, the axial distance between the object-side surface of the first lens element and the image surface is TL, the focal length of the imaging optical system in the maximum image height direction is f, an f-number of the imaging optical system is Fno, and the following conditions are satisfied:

2.0<$TD/BL$<20.0;

1.5<$TL/f$<6.5; and 1.0<$Fno$<3.5.

22. The imaging optical system of claim 17, wherein the focal length of the imaging optical system in the maximum image height direction is f, a central thickness of the fifth lens element is CT5, and the following condition is satisfied:

4.0<$f/CT5$.

23. The imaging optical system of claim 17, wherein the focal length of the imaging optical system in the maximum image height direction is f, a composite focal length of the fifth lens element and the sixth lens element in the maximum image height direction is f56, and the following condition is satisfied:

−2.0<$f/f56$<0.55.

24. The imaging optical system of claim 17, wherein the object-side surface of the fifth lens element is concave in a paraxial region thereof, the image-side surface of the fifth lens element is convex in a paraxial region thereof, a curvature radius of the object-side surface of the fifth lens element in the paraxial region thereof and in the maximum image height direction is R9, a curvature radius of the image-side surface of the fifth lens element in the paraxial region thereof and in the maximum image height direction is R10, and the following condition is satisfied:

0<$R9/R10$<20.

25. The imaging optical system of claim 17, wherein the first lens element has negative refractive power, the object-side surface of the second lens element is convex in a paraxial region thereof, and the object-side surface of the third lens element is convex in a paraxial region thereof.

26. The imaging optical system of claim 17, wherein at least three of the six lens elements are axisymmetric, at least one of the object-side surface and the image-side surface of each of the at least three lens elements has at least one inflection point in the maximum image height direction, the image-side surface of the sixth lens element is concave in a paraxial region thereof, and the image-side surface of the sixth lens element has at least one critical point in an off-axis region thereof and in the maximum image height direction.

27. The imaging optical system of claim 17, wherein at least one of the first lens element and the sixth lens element is a freeform lens element, and at least one of the object-side surface and the image-side surface of the at least one freeform lens element is a freeform surface.

28. The imaging optical system of claim 17, wherein the minimum value among distances between the optical axis and the edge of the optically effective area of the at least one freeform surface of the at least one freeform lens element is Ymin, the maximum value among displacements in parallel with the optical axis from the intersection point between the at least one freeform surface and the optical axis to a point at a distance of Ymin from the optical axis on the at least one freeform surface is SAG_MAX, the minimum value among displacements in parallel with the optical axis from the intersection point between the at least one freeform surface and the optical axis to a point at a distance of Ymin from the optical axis on the at least one freeform surface is SAG_MIN, the absolute difference between SAG_MAX and SAG_MIN is |ASAGmax|, and the following condition is satisfied:

$2.0 \ [um] < |\Delta SAGmax|$.

29. An image capturing unit, comprising:
the imaging optical system of claim 17; and
an image sensor disposed on the image surface of the imaging optical system.

30. An electronic device, comprising:
the image capturing unit of claim 29.

* * * * *